(12) United States Patent
Will et al.

(10) Patent No.: US 6,201,364 B1
(45) Date of Patent: Mar. 13, 2001

(54) MOTORIZED WINDOW SHADE SYSTEM

(75) Inventors: Gary E. Will, Macungi; Mark A. Cieri; Tony W. Azar, both of Allentown; Charles J. Digney, Jr., Holland; Donald F. Hausman, Jr., Emmaus; David L. Kates, Alburtis; Stephen W. Lynn, Hatfield, all of PA (US); Gregory R. Martin, Pearland, TX (US); Noel Mayo, Philadelphia, PA (US); Robin C. Moseley, Allentown, PA (US); Robert C. Newman, Jr., Emmaus, PA (US); Timothy R. Reinhard, Bethlehem, PA (US)

(73) Assignee: Lutron Electronics Company, Inc., Coopersburg, PA (US)

( * ) Notice: Subject to any disclaimer, the term of this patent is extended or adjusted under 35 U.S.C. 154(b) by 0 days.

(21) Appl. No.: 09/610,066

(22) Filed: Jul. 5, 2000

Related U.S. Application Data

(62) Division of application No. 09/175,708, filed on Oct. 20, 1998, now Pat. No. 6,100,659, which is a division of application No. 08/773,184, filed on Dec. 27, 1996, now Pat. No. 5,848,634.

(51) Int. Cl.[7] ........................................... H02P 7/00
(52) U.S. Cl. ...................... 318/466; 318/469; 318/468; 160/1; 160/310
(58) Field of Search ........................ 318/254, 16, 14, 318/17, 460–468, 439, 480; 160/DIG. 17, 168.1, 176.1, 1, 5, 176 R, 91, 178 C, 310, 168 R; 364/167.01, 188

(56) References Cited

U.S. PATENT DOCUMENTS

| | | | |
|---|---|---|---|
| 4,644,990 | * 2/1987 | Webb, Sr. et al. | 160/5 |
| 5,467,266 | * 11/1995 | Jacobs et al. | 364/167.01 |
| 5,495,153 | * 2/1996 | Domel et al. | 318/17 |
| 5,698,958 | * 12/1997 | Domel et al. | 318/480 |
| 5,714,855 | * 2/1998 | Domel et al. | 318/280 |
| 5,729,103 | * 3/1998 | Domel et al. | 318/283 |
| 5,793,174 | * 8/1998 | Kovach et al. | 318/468 |
| 5,883,480 | * 3/1999 | Domel et al. | 318/282 |
| 5,907,227 | * 5/1999 | Domel et al. | 318/480 |
| 5,990,646 | * 11/1999 | Kovach et al. | 318/468 |
| 6,057,658 | * 5/2000 | Kovach et al. | 318/16 |
| 6,060,852 | * 5/2000 | Domel et al. | 318/480 |
| 6,082,433 | * 7/2000 | Vafaie et al. | 160/310 |

* cited by examiner

*Primary Examiner*—Paul Ip
(74) *Attorney, Agent, or Firm*—Ostrolenk, Faber, Gerb & Soffen, LLP

(57) ABSTRACT

An elongated reelable shade, first and second spaced support brackets removably connected to first and second and opposite ends of said elongated reelable shade for supporting said reelable shade from a fixed support, an electrical drive motor having an output shaft for rotating said elongated reelable shade around its axis to selectively reel and unreel said shade, an electrical circuit for energizing and operating said motor, the electrical circuit including a controller coupled to and controlling the operation of said drive motor, and a coupler for removably coupling said output shaft of said motor to said first end of said elongated reelable shade, a single housing having said first bracket fixed thereto, said single housing containing and supporting said motor, said electrical circuit and said coupler, said coupler comprising an output driver which removably receives said first end of said shade with rotatable driving relationship.

6 Claims, 40 Drawing Sheets

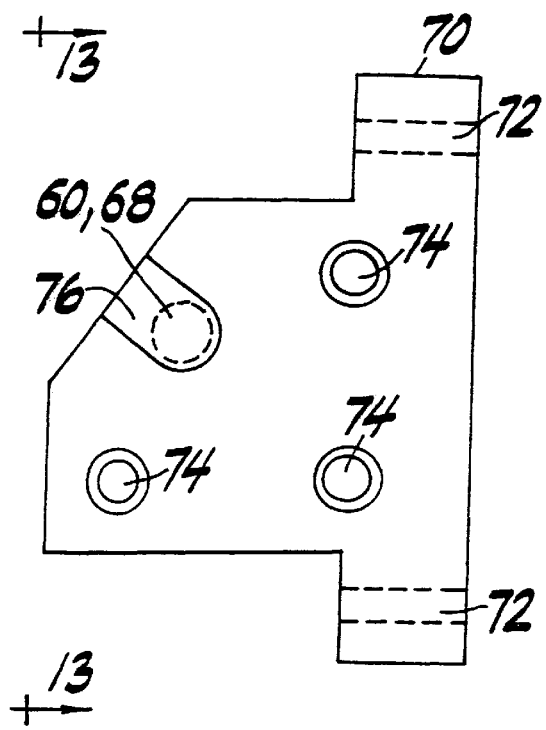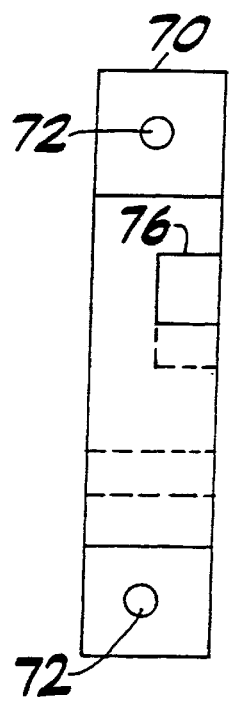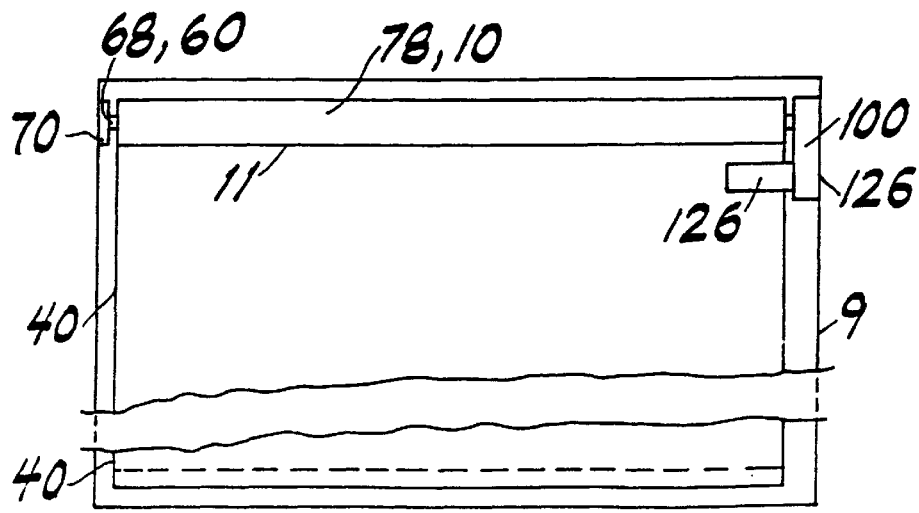
FIG. 12   FIG. 13
FIG. 13A

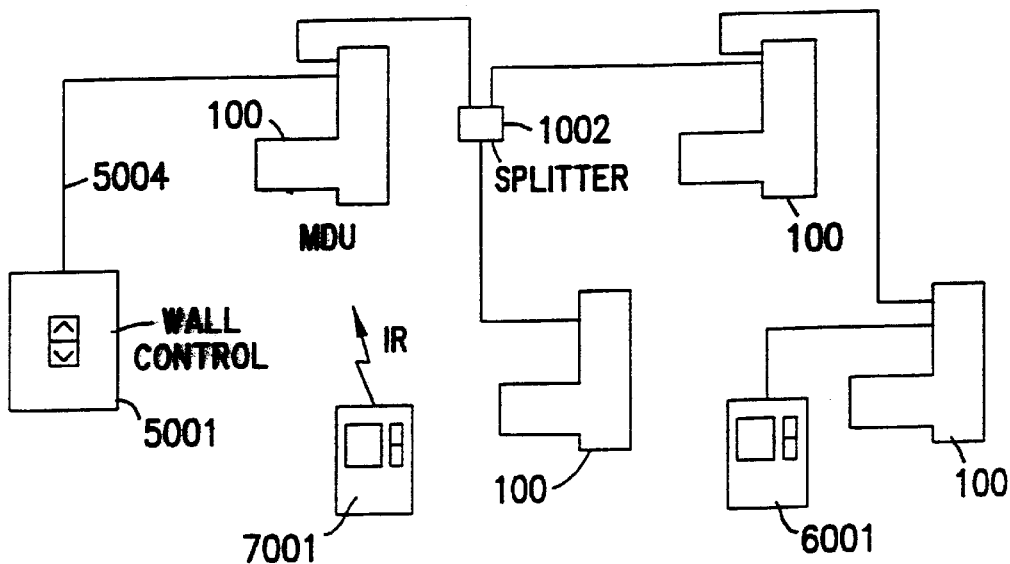
FIG. 29
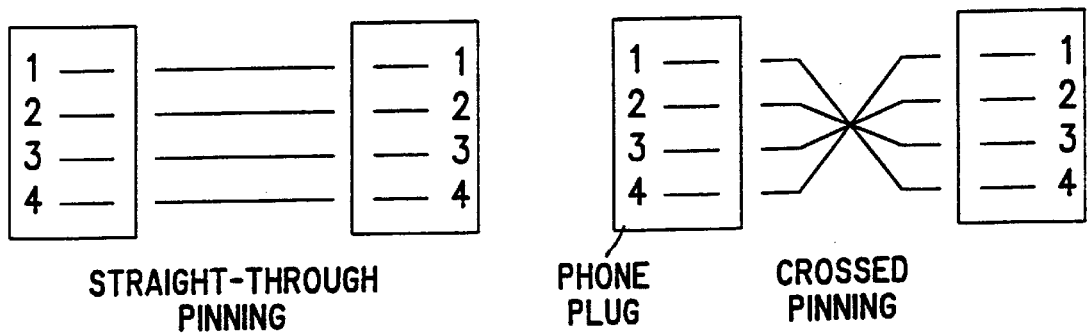
FIG. 31  FIG. 32
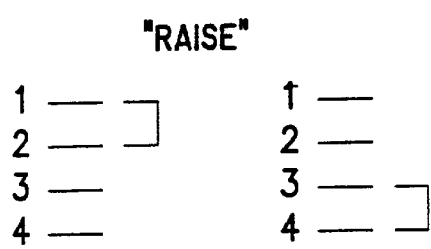 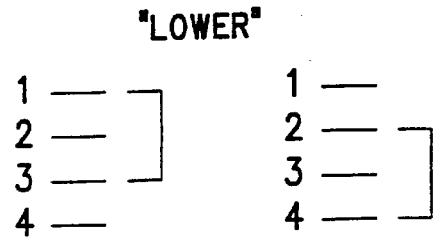
FIG. 33  FIG. 34

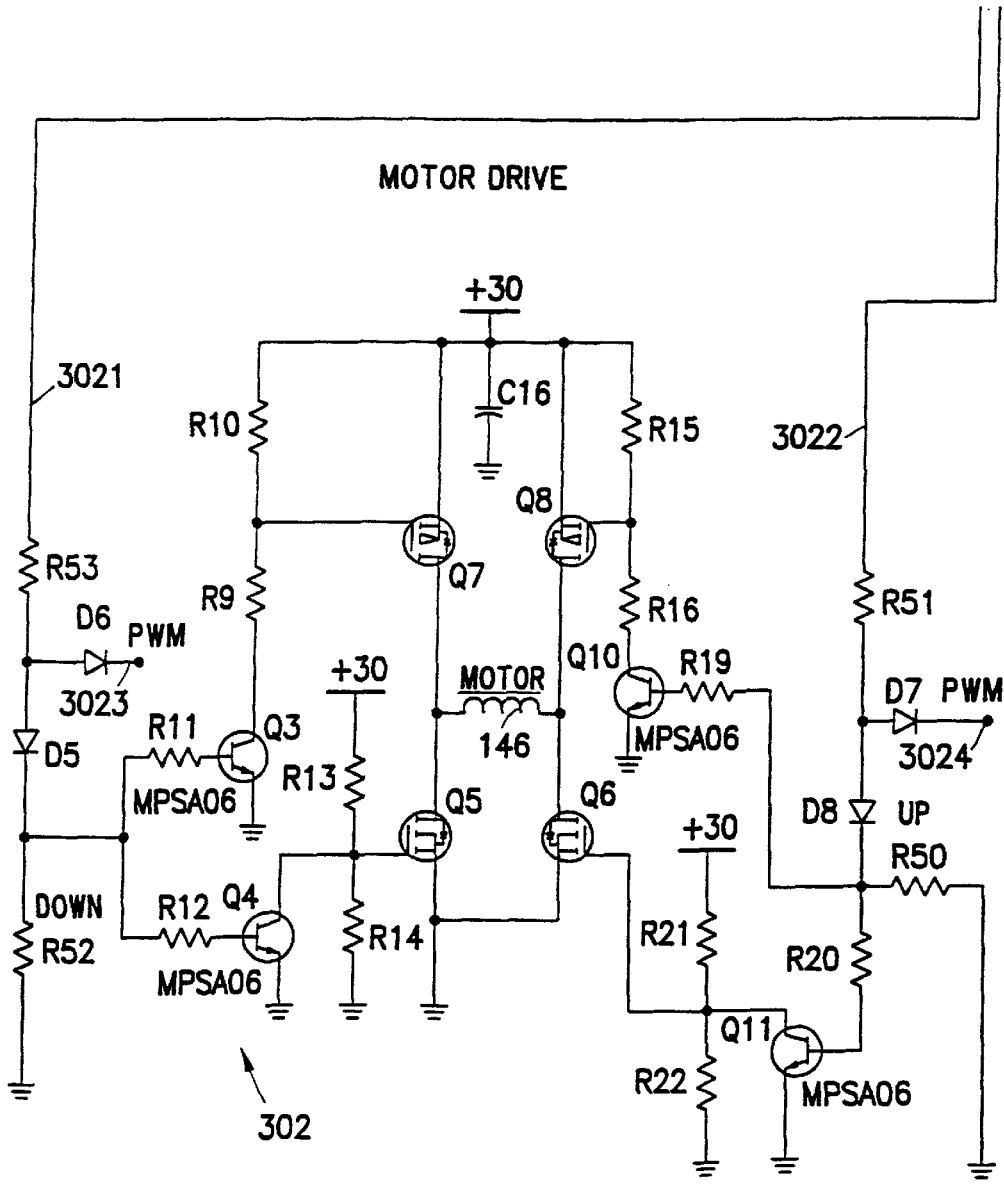
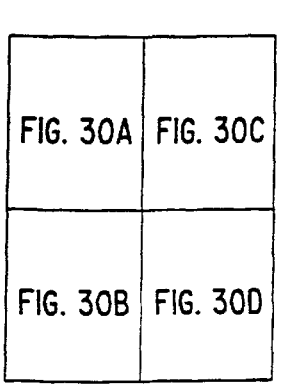
FIG. 30B
FIG. 30

| | S1 | S2 | S1 | S2 | S1 | S2 | S1 | S2 |
|---|---|---|---|---|---|---|---|---|
| UP | 0 | 0 | 0 | 0 | 1 | 0 | 1 | 0 |
| DOWN | 1 | 0 | 1 | 0 | 0 | 0 | 0 | 0 |
| SAMPLE → | 1 | | 2 | | 3 | | 4 | |
FIG. 37
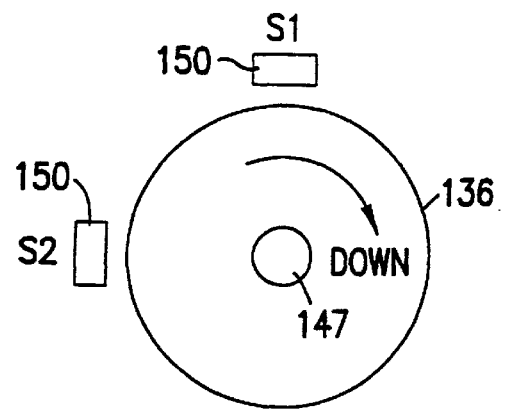
FIG. 38
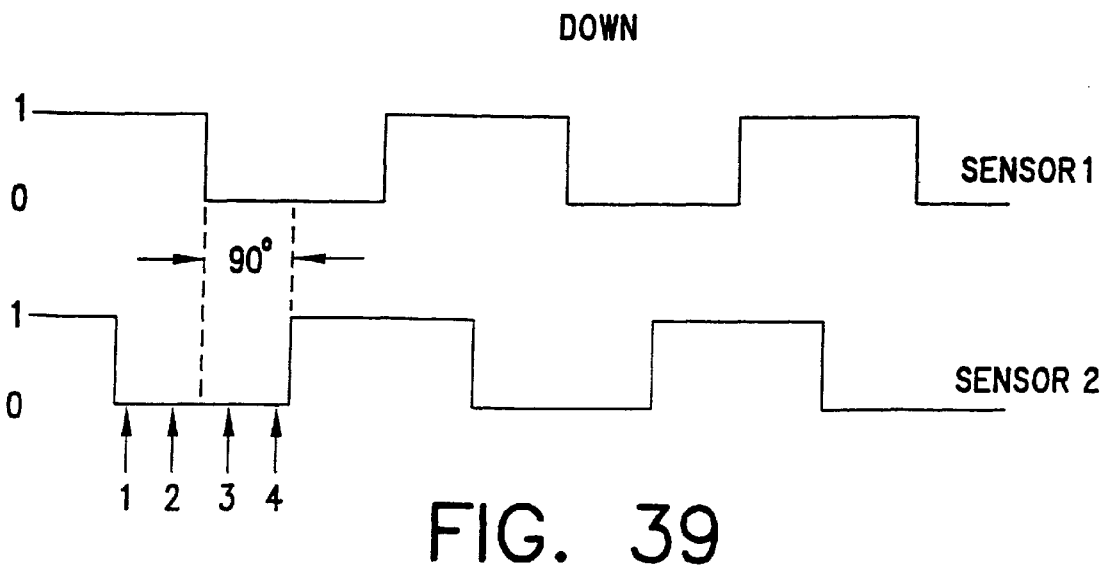
FIG. 39

| BUTTON PRESS | | |
|---|---|---|
| FLUSH MOUNT T * WALL CONTROL | SURFACE MOUNT WALL CONTROL | IR TRANSMITTER |
| TAP BOTH BUTTONS | TAP TOGGLE BUTTON | TAP TOGGLE BUTTON |
| PRESS RAISE BUTTON | PRESS RAISE BUTTON | PRESS RAISE BUTTON |
| PRESS LOWER BUTTON | PRESS LOWER BUTTON | PRESS LOWER BUTTON |

FIG. 42A

— IF SHADE IS MOVING DOWN AND LOWER LIMIT IS REACHED, STOP SHADE

2) DIRECTION-SET OUTPUTS 3021 AND 3022 ON MICRO

3) UPDATE SPEED
- CALCULATE MOTION OF SHADE FROM CURRENT POSITION AND LAST POSITION
- IF MOTION IS LESS THAN 29 COUNTS, INCREMENT DUTY CYCLE BY 8
- IF MOTION IS BETWEEN 30 AND 33 COUNTS, INCREMENT DUTY CYCLE BY 1
- IF MOTION IS BETWEEN 34 AND 36 COUNTS, DO NOTHING
- IF MOTION IS BETWEEN 37 AND 40 COUNTS, DECREMENT DUTY CYCLE BY 1
- IF MOTION IS GREATER 41 COUNTS, DECREMENT DUTY CYCLE BY 8

MOTORIZED WINDOW SHADE SYSTEM

This is a division of application Ser. No. 09/175,708, filed Oct. 20, 1998, now U.S. Pat. No. 6,100,659 which is a division of application Ser. No. 08/773,184, filed Dec. 27, 1996, now U.S. Pat. No. 5,848,634.

BACKGROUND OF THE INVENTION

1. Field of the Invention

The present invention relates to motor operated window shade systems. More particularly, the present invention relates to a motor driven window shade system incorporating a slim design housing for mounting adjacent a window jamb and which includes a circuit to control the operation of the drive motor and the motor itself. Even more particularly, the invention relates to a microprocessor controlled motorized window shade system. Furthermore, the invention relates to a motor operated window shade system that allows retrofitting of manual shades or which can be used with shades specially designed for use with motorized systems.

A conventional reelable window shade is well known. The shade can be moved manually up or down in front of a window to control e.g., the light level, temperature, air flow, or to provide privacy. The known reelable shade is fairly inexpensive and is easy to install. If the shade is damaged, a new shade can be replaced very easily. These types of shades are sold in retail stores and do-it-yourself centers across the U.S. The shades are typically stocked in 3, 4, 5 and 6 foot widths. The shade can easily be cut to the proper width with a cutting device either at the point of sale or at installation time. The installer can measure and install the shade on the same site visit.

The conventional reelable shade has a first pin end and a second spring end with a rectangular barb extending outwardly. The pin end is inserted into a circular hole in a bracket. The spring end is mounted in a similar shaped bracket with a slot designed to keep the barb from rotating. The brackets are designed to be mounted inside a window frame i.e., inside the jamb, or along the outside of a window frame. The user pulls the reelable shade down by a hem bar located along the bottom edge of the shade until the desired amount of shade material is showing. The user then eases up on the hem bar until the pawl mechanism in the spring end of the shade locks the shade into position. As the shade is being pulled down, the spring is being wound up.

When the user wants to put the shade up, the user pulls down on the hem bar slightly to disengage the pawl mechanism and then guides the hem bar upward as the spring pulls the fabric upward. If the user lets go of the shade as the shade is travelling upward the spring in the shade will cause the shade to travel upward out of control. The hem bar will continue to rotate around the roller until it stops. The setting of multiple shades at the same relative position can be a very time consuming process.

The known shades are not capable of receiving inputs from time clocks, photo sensors, occupant sensors or infrared hand held transmitters.

It is known to make a window covering from a plurality of diverse panels which can be moved selectively in front of a window to control the light level, temperature or air flow, or to provide privacy. Such a system is described in U.S. Pat. No. 5,467,266 entitled "Motor Operated Window Cover." It is commonly owned by Lutron Electronics, Inc., the owner of the present application. This system has an upper and a lower roller. The motor is located in the upper roller and a spring is located in the lower roller. The system allows the user to choose different fabrics, colors and sun blocking materials to be combined together to form a series of different panels. The fabric is wound or unwound onto either the upper or lower roller to display the different panels. The different panels can be recalled at the touch of a button. Each shade is made to order which can result in a long lead time. The two rollers and fabric are sold as a unit. If the unit ever fails, the unit must be returned to the manufacturer or a technician must visit the job site.

Installation of these systems often requires a skilled craftsman. The installer usually will need to make one visit to measure the window and another separate visit to install the system.

The hem bar located at the bottom of the shade travels in channels secured to the sides of the window opening, thus decreasing the amount of light that can enter through the window when the shade is up. The motor is connected to a nearby power source with line voltage wiring.

These systems according to U.S. Pat. No. 5,467,266 are capable of receiving inputs from time clocks, photo sensors, and occupant sensors. They are also capable of receiving inputs from infrared hand held transmitters through accessory devices. Multiple units are capable of working together as a system.

A single motorized roller shade is made by Somfy of Cluses, France. The roller is secured to the window opening with two mounting brackets. The single roller shade is custom made with a fabric of choice. The motor is installed inside the roller tube at the factory and line or low voltage wiring connects the motor to a nearby power source. The unit is not capable of receiving inputs from time clocks, photo sensors or occupant sensors. If the unit ever fails, the unit must be returned to the manufacturer or a technician must visit the job site.

Another system, the Makita Automatic Drapery Opener System is designed to open and close standard drapes. Line voltage wiring connects the unit to a nearby power source. The units have dedicated input and output jacks for connection between multiple units and wall controls. Multiple units can be grouped together although different mother and daughter units are required. One mother unit can be wired to two daughter units using standard phone cables which have crossed wires. The unit will not work properly if non standard straight-through wiring telephone type cables are used to connect the units. Splitters are required when using both timers and wall switches. When using more than one system per room, multiple frequency transmitters are required to control each shade independently. The infrared sensor is approximately 1"×1", in size and black and white in color. This makes the sensor difficult to locate in front of the window dressing without detracting from the look while still allowing the sensor to work properly.

These units are capable of receiving inputs from timers and infrared hand held transmitters. They can not accept inputs from occupant sensors and photo sensors. A number of patents for motor driven window treatments are known. For example, U.S. Pat. No. 5,540,269 to Plumer discloses a motor driven roller blind. This system uses a means provided alongside the window capable of providing an electrical signal representative of the movement of the roller blind.

U.S. Pat. No. 5,414,334 to Cheron discloses a control device for an asynchronous roller blind motor. This patent is assigned to Somfy of Cluses, France.

U.S. Pat. No. 5,372,173 to Horner discloses a window having motorized shades. The mechanism described in this patent utilizes separate motors with belt driven pulleys and does not provide a neat and simple installation.

U.S. Pat. No. 5,351,743 to Jackson discloses a roller shutter assembly intended for use as a garage door.

Although not relating to window shades, U.S. Pat. No. 5,303,972 to Heider et al. discloses a remote control for a rectangular box top closure including a tarpaulin. This device is used to enclose the top of a rectangular enclosure, for example, the top of a trailer truck.

U.S. Pat. No. 5,249,616 to Yen discloses a double layer window with shade roller units for regulating light. This system utilizes reversible motors provided at the bottom or bottom and top of the window opening and does not provide a simple and convenient installation.

U.S. Pat. No. 5,198,974 to Orsat discloses a safety device for a motorized roller shutter comprising means supplying an electrical signal representing the displacement of the rolling shutter. The system comprises a pulley on which is wound a flexible element whose free end is connected to the end of the rolling shutter such that the unrolling of the rolling shutter causes the unrolling of the flexible element.

U.S. Pat. No. 5,105,871 to Baud et al. discloses a tubular motor winding device for a blind, roller shutters or the like. The winding device comprises a winding tube inside of which is a tubular motor.

U.S. Pat. No. 5,088,543 to Bilbrey discloses a skylight shade which utilizes a motor winding a cord that moves the window shade to adjust the skylight opening.

U.S. Pat. No. 5,044,417 to Bresson discloses a roller assembly for automatically winding and unwinding closures such as blinds, shades and similar devices in which the drive mechanism and all the accessories thereof are housed inside the drum on which the shade is wound.

U.S. Pat. No. 5,042,866 to Cody discloses an automotive sunscreen for the windshield of an automobile.

U.S. Pat. No. 5,038,087 to Archer et al. discloses an apparatus for controlling window blinds and awnings wherein the drive motor is located within the shade spool or within a horizontal element disposed above the shade element.

U.S. Pat. No. 4,951,730 to Hsu discloses a window blind system comprising a member which is mounted horizontally above the window opening and having means at each end for holding the window blinds in position.

U.S. Pat. No, 4,766,941 to Sloop et al. discloses a window shade with selectively variable shading characteristics.

U.S. Pat. No. 4,712,104 to Kobayashi discloses a remote control blind system wherein the blind includes rotatable slats.

U.S. Pat. No. 4,683,932 to Bubendorff discloses a rolling shutter of the type comprising a first shaft for winding and/or unwinding a sectional structure consisting of blades provided with catch means adapted to be engaged by driving means mounted on and rotatable with a second shaft located downstream of the winding shaft and mounted in lateral flanges of the shutter housing with guide rails slidably engaged by the side ends of the shutter blades.

U.S. Pat. No. 4,665,965 to Pasquier et al. discloses a control system for roller blinds or the like with swivel blades.

U.S. Pat. No. 4,444,363 to Jacquel et al., and assigned to Somfy of Cluses France, discloses a device for driving a flexible protection web rolled up on a shaft. The device includes two shafts at either end of the flexible protection web.

U.S. Pat. No. 4,417,185 to Bullat assigned to Somfy discloses a driving system for roll-up shades, blinds, rolling shutters and the like.

U.S. Pat. No. 4,411,348 to Fillion assigned to Somfy discloses a control device for an electric motor reducing unit of the type intended for driving a winding rod, drum or tubular coil, a rolling shutter, roller blinds or the like.

U.S. Pat. No. 4,372,367 to Baldanello et al. discloses a roller blind including a reversible electric motor disposed in the winding roller of the roller blind.

U.S. Pat. No. 4,347,886 to Von Knorring discloses a roller blind having a motor which engages with the window blind to raise and lower the blind and such that when the blind is lowered, the blind moves closer to the window frame and when it is raised it moves further away from the window frame.

U.S. Pat. No. 4,042,028 to Ennes et al. discloses an adjustable tube shade roller which can be operated by an electric motor.

U.S. Pat. No. 1,795,745 to Twiss discloses a remote control having an electrical actuating mechanism for operating a window shade.

U.S. Pat. No. 3,337,992 to Tolson discloses remotely controlled closures such as windows, doors and the like which can be operated from one or more remotely located sensing devices.

The devices described in the above patents suffer from at least one of a number of disadvantages including inability to communicate with other devices, lack of intelligent control, e.g. by a microprocessor, and thus having inability to be programmed easily, bulky size causing difficulty in installation, an unattractive appearance and maintenance problems as well as inability to easily retrofit to existing manually actuated shades.

There is, thus, a need for a small, easy to install, attractive, single unit, intelligent device for controlling the motorized operation of window shades.

SUMMARY OF THE INVENTION

It is an object of the present invention to provide a motorized window shade system that is simple to install.

It is also an object of the present invention to provide a motorized window shade system that is neat and attractive in appearance and which does not intrude into the window opening area.

It is yet still a further object of the present invention to provide a motorized window shade system that is mechanically simple and thus reliable.

It is yet still another object of the present invention to provide a motorized window shade system that is microprocessor controlled and easily programmed by a user to set desired upper position and lower position limit values.

It is yet still a further object of the invention to provide a motorized window shade system that can be connected with other units to allow control of a plurality of motorized window shade units in a predefined synchronism.

It is yet still another object of the invention to provide a motorized window shade system that can be used with remote control devices and/or wall mounted controls.

It is still yet a further object of the invention to provide a motorized window shade system that utilizes modular telephone wires for interconnection with other window shade units and that is polarity insensitive so that it will operate with cross-pinned or straight-through type telephone wires, thus simplifying installation.

It is yet still a further object of the invention to provide a motorized window shade system that can be retrofitted to existing manually actuated shades.

The above and other objects are achieved by a combination comprising an elongated reelable shade having first and second opposite ends, first and second spaced support brackets, the second bracket being removably connected to the second end of said elongated reelable shade for supporting said reelable shade from a fixed support, an electrical drive motor having an output shaft for rotating said elongated reelable shade around its axis to selectively reel and unreel said shade, an electrical circuit for energizing and operating said motor, the electrical circuit including a controller coupled to and controlling the operation of said motor, and a coupler for removably coupling said output shaft of said motor to said first end of said elongated reelable shade, a single housing having said first bracket fixed thereto, said single housing containing and supporting said motor, said electrical circuit and said coupler, said coupler removably receiving said first end of said shade with rotatable driving relationship.

The invention further encompasses an elongated reelable window shade adapted for motor operation by an external motor drive; said shade comprising an elongated rigid tubular barrel having an elongated shade reeled thereon; one end of said barrel having a drive coupler is connected thereto for removable connection to a motor drive; the opposite end of said barrel containing an interior elongated torsion spring having an exterior rectangular barb connector for connection to the slot of a conventional shade mounting bracket; and a circular pin with a low friction outer surface and having a slot in one end surface thereof which is force-fitted onto the end of said barb; said circular pin being coaxial with said barrel and said spring.

The invention also encompasses a control switch for determining at least one of the reeling end limits of a reelable shade by being operated when an end limit is reached; said control switch including a switch, a pivotally mounted shade rise limit lever arm; said shade rise limit lever arm having end disposed adjacent the path of movement of said shade; a free end of said shade having an enlarged hem liner along its edge whereby, when said hem liner at the free end of said shade reaches and contacts said end of said rise limit lever arm, said rise limit lever arm is rotated to operate said switch to indicate that said shade has been fully reeled to an end limit.

Another embodiment of the invention includes a control switch for determining at least one of the end limits of a reelable shade by being operated when an end limit is reached; said control switch including a switch, a pivotally mounted shade lower limit lever arm; said shade lower limit lever arm having an end disposed adjacent to but spaced from the outer periphery of said reelable shade and being removed from the path of said shade when said shade is being unreeled from over one side of the shade reel, but being disposed in the path of said shade after said shade has been fully unreeled and when continuous unreeling causes said shade to reel in an opposite direction over the shade reel, thereby to activate said switch to indicate that a fully unreeled position of said shade has been reached.

The invention is also directed to a unitary bracket and motor drive for an elongated reelable shade; said motor drive comprising a reversible DC motor, a DC power source therefor, a control circuit for coupling said DC power source and said motor, a microprocessor for controlling the sequence and operation of said motor, a motor operation sensor coupled to said microprocessor, and an input control signal sensor connected to said microprocessor; a gear reduction train assembly having an input shaft end connected to the output shaft of said motor and an output shaft end connected to an output drive shaft which is connectable to one end of said shade; and a unitary housing for enclosing said motor, DC source, control circuit, microprocessor, motor operation sensor, and gear reduction train; said bracket being fastened to said unitary housing.

The invention also encompasses novel processes including a process of installing a motor-operated window shade comprising the steps of fixing a pin in a first end of said shade, fixing a connector socket in a second end of said shade, fixing a first bracket to a shade support surface for rotatably receiving said first end of said shade, fixing a second bracket carrying a motor driven shaft stub in a location spaced from said first bracket, inserting said motor driven shaft stub into said connector socket and inserting said pin for rotation in said first bracket.

Also included is a process of retrofitting with a motor operated mechanism, a reelable window shade of the type having a pin end and a spring mounted barb end, the process comprising the steps of fixing a second pin to the barb end of said shade, replacing said pin of said shade with a connector socket, fixing a first bracket to a shade support surface for rotatably receiving said second pin attached to said barb end of said shade, fixing a second bracket carrying a motor driven shaft stub in a location spaced from said first bracket, inserting said motor driven shaft stub into said connector socket and inserting said second pin for rotation in said first bracket.

The invention includes the combination of a plurality of spaced reelable shades, a plurality of reversible drive motors separate from and connected to one end of respective ones of each of said shades, a control circuit for operating each of said drive motors from a common power source; and a communication circuit for interconnecting each of said control circuits to operate each of said plurality of reversible motors so that their respective shades are reeled and unreeled in a predetermined synchronism with one another; a respective unitary housing for each of said reversible drive motors and their respective control circuits; each of said housings containing at least first and second four-wire jacks coupled to their respective communication circuit; each said four-wire jacks having first, second, third and fourth lateral connectors disposed side by side and extending therefrom wherein the application of a signal connecting the first and second or third and fourth connectors causes the drive of said motor in a first direction and the application of a signal connecting said first and third or said second and fourth connectors causes the drive of said motor in an opposite direction; a four-wire cable connected from a-four-wire jack of a first of said jacks in a first of said housings to a four-wire jack of a first of said jacks in a second of said housings; the connection of said four wire cable being polarity insensitive.

A further embodiment of the invention is directed to a communication circuit for supplying at least two control signals to a control circuit, the control circuit controlling the state of operation of a controlled device, the communication circuit including at least one communication port, the communication port containing a plurality of connectors disposed side-by-side, the communication circuit being polarity insensitive so that the connection of selected ones of said connectors in pairs will control said control circuit to operate said controlled device in a predetermined manner even if a cable containing lines coupled to respective ones of said connectors has cross- pinned wires.

Yet another embodiment of the invention includes an apparatus for controlling operation of a motorized window shade, the apparatus comprising a drive circuit for driving an electric motor operating the window shade; a control circuit for controlling the operation of said drive circuit, said control circuit including a microprocessor, the microprocessor being coupled to first and second switches for enabling driving of the electric motor in respective first and second directions corresponding to upward and downward movement of the window shade, and further comprising a program switch, the microprocessor of the control circuit being programmed to allow setting of the upper and lower limits of travel of said window shade, said microprocessor being programmed with a program whereby to set a first of said limits of travel, the window shade is adjusted to a desired upper or lower level limit position using at least one of said first and second switches, said program switch is then actuated followed by the actuation of one of said first and second switches to set a first of said limits; said window shade is then adjusted to a desired position for a second of said limits using at least one of said first and second switches; said program switch is again actuated, and the other of said first and second switches is actuated to set said second of said limits.

Presented below are further definitions of the invention, which are set forth in separate paragraphs. These inventions include:

A. A method for setting upper and lower limits of travel of a motorized window shade, the motorized window shade having a control circuit including a microprocessor for controlling the direction of movement of the window shade and having a first switch for allowing control of the window shade in an upward direction, a second switch for allowing control of the window shade in a downward direction and a program switch for enabling setting of the limits, the method comprising: adjusting the shade to a desired upper limit position using at least one of said first and second switches; actuating said program switch to command said microprocessor to a program mode; thereafter actuating said first switch controlling upward movement of said window shade to set the upper limit position to the current shade position; adjusting the window shade to a desired lower level position using at least one of said first and second switches; actuating said program switch to command said microprocessor to said program mode; and thereafter actuating said second switch controlling downward movement of said window shade to set said lower limit to the current position of the window shade.

B. Apparatus for detecting if a reelable window shade of a motorized window shade control system has exceeded a preset upper limit level for the window shade, the apparatus comprising a drive circuit for driving an electric motor controlling upward and downward movement of the window shade; a control circuit including a microprocessor for controlling the operation of said drive circuit; a switch actuated by movement of said window shade when said window shade moves upwardly past a desired upper level limit of said window shade; said microprocessor comprising a program operating in response to a change of state of said switch when said window shade is traveling upward so as to:
  stop the operation of said drive motor;
  reverse the direction of said drive motor;
  set a counter of said control circuit when said switch again changes state to a preset number corresponding to a home position of said window shade; and
  thereafter stop said motor when said window shade reaches a preset upper limit.

C. A process for detecting when a window shade of a motorized window shade system has exceeded an upper limit level, the window shade system including a drive circuit controlling an electric motor driving the window shade in upward and downward directions, a control circuit including a programmed microprocessor controlling the operation of said drive circuit and a switch activated when said window shade is traveling upwardly, the method comprising the steps of: changing the state of said switch when said shade is traveling upwardly and has exceeded the upper limit level; stopping said drive motor; reversing the direction of said motor so that said window shade travels downwardly; setting a counter in said control circuit when said switch again changes state as said window shade is traveling downwardly; and thereafter stopping said motor when said shade reaches the upper limit.

D. Apparatus for detecting when a window shade of a motorized window shade system has reached full downward extension and is beginning to wrap around a reel for said window shade in an opposite direction to a desired direction of wrap around the reel, the motorized window shade system comprising a drive circuit for driving an electric motor that moves the shade in upward and downward directions, a control circuit controlling the operation of said drive circuit and having a programmed microprocessor and a switch actuated by said window shade as said window shade is traveling downwardly and then begin to wrap around the reel in the opposite direction, the programmed microprocessor being programmed to detect the change of state of said switch by said window shade as said window shade is traveling downwardly, the programmed microprocessor being programmed to:
  respond to the change of state of said switch so as to stop said motor;
  reverse the direction of said motor so that said window shade travels upwardly changing the state of the switch until said window shade is fully wrapped around the window shade reel and another change of state of said switch by said shade occurs;
  stop said motor again;
  again reverse the motor direction so that said window shade travels downwardly;
  set a counter of said control circuit to a preset number corresponding to a home position of said window shade when a change of state of said switch again occurs; and
  stop said motor when said shade reaches a preset upper limit.

E. A method for detecting when a window shade of a motorized window shade system has reached full downward extension and is beginning to wrap around a reel for said window shade in an opposite direction to a desired direction of wrap around the reel, the motorized window shade system comprising a drive circuit for driving an electric motor that moves the shade in upward and downward directions, a control circuit controlling the operation of said drive circuit and having a programmed microprocessor and a switch actuated by said window shade as said window shade is traveling downwardly and then begins to wrap around the reel in the opposite direction, the programmed microprocessor being programmed to detect the change of state of said switch by said window shade as said window shade is traveling downwardly, the programmed microprocessor being programmed to respond to the change of state of said switch, the method comprising:
  stopping said motor in response to actuation of said switch;

reversing the direction of said motor so that said window shade travels upwardly changing the state of the switch until said window shade is fully wrapped around the window shade reel and another change of state of said switch by said shade occurs;

stopping said motor again;

again reversing the motor direction so that said window shade travels downwardly;

setting a counter of said control circuit to a preset number corresponding to a home position of said window shade when a change of state of said switch again occurs; and stopping said motor when said shade reaches a preset upper limit.

Other features and advantages of the present invention will become apparent from the following description of the invention which refers to the accompanying drawings.

BRIEF DESCRIPTION OF THE DRAWINGS

FIG. 12 is an elevation view of a bracket for the pin or left side of the rollers of FIGS. 5 and 8.

FIG. 13 is a side view of the bracket of FIG. 12.

FIG. 13A shows the shade of the invention (FIGS. 5 or 8) installed in a window opening "inside" the window jambs.

FIG. 17 shows the assembly during winding;

FIG. 18 shows the assembly when the shade has been wound on the reel to its maximum extent and has pivoted a rise limit lever paddle;

FIG. 19 shows the assembly at the "upper limit" level, which is a user programmed level associated with the particular window opening;

FIG. 20 shows the assembly during unwinding when the shade has fully unwound;

FIG. 21 shows the assembly during unwinding when the shade has fully unwound and is beginning to wind on the roller in the reverse direction; and FIG. 22 shows the assembly again during upward winding.

FIG. 29 is a schematic circuit diagram of an exemplary interconnection of a plurality of electrical motor drive units, according to the invention.

FIG. 31 shows two telephone jacks with straight-through pinning.

FIG. 32 is like FIG. 31, but shows crossed pinning.

FIG. 33 shows the position closures of FIG. 31 or 32 needed to produce a shade "raise" operation.

FIG. 34 shows the position closures of FIG. 31 or 32 needed to produce a shade "lower" operation.

FIG. 37 is a table of the sample values for upward and downward shade motion derived from the pulse trains of FIGS. 36 and 39.

FIG. 38 schematically shows the motor shaft and sensors during downward shade movement.

FIG. 39 is a timing diagram of the pulse trains from the sensors of FIG. 38 during downward movement of the window shade.

FIGS. 44A, 44B and 44C show flow charts which illustrate in more detail a portion of the flow chart of FIG. 43.

DETAILED DESCRIPTION OF THE DRAWINGS

Figure 1:
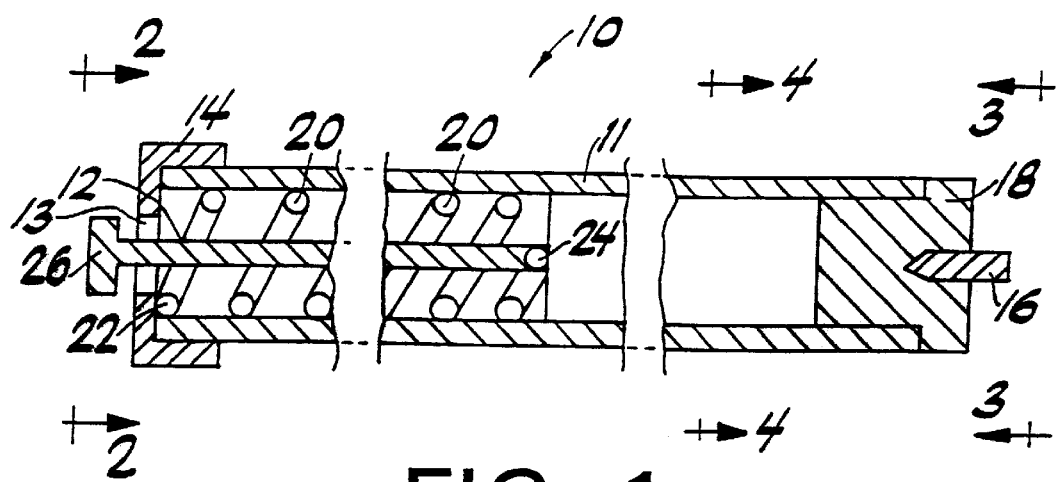
FIG. 1 is an axial cross-sectional view of a conventional window shade roller with the shade material not shown.
Figure 4:
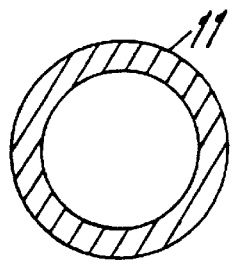
FIG. 4 is a cross-sectional view of FIG. 1 taken across section line 4—4 in FIG. 1.

Referring first to FIG. 1, there is shown a sectional view of a prior art manually reelable shade, generally designated 10. The shade 10 has a first end cap 14 and a second end cap 18 inserted into or otherwise secured to the opposing ends of a tube 11. The tube 11 is typically made from either cardboard, plastic, metal or wood. The shade fabric, (not shown) is attached to the tube 11. The first end cap 14 is permanently attached to an end of the tube 11; that is, it is made not to be easily removed. Tube 11 and cap 14 together house a spring 20 and a shaft 12. As seen best in FIG. 2, end cap 14 also carries a latch mechanism 13 which consists of a conventional pawl latch 13A and projections 13B to hold the roller in a set position. End cap 14 also has a spring attachment point 22 to fix the left hand end of spring 20 to the end cap 14.

Shaft 12 has a barbed end 26 and an attachment point 24 for the other end of spring 20. Thus, one end of the spring 20 is connected to the spring attachment end 24 of shaft 12 while the other end of the spring is connected to the spring attachment point 22 of end cap 14 and thus the roller tube 11. The latch mechanism 13 allows the spring 20 to be wound as the tube 11 rotates, and then lock into position when rotation is stopped.

Figure 3D:
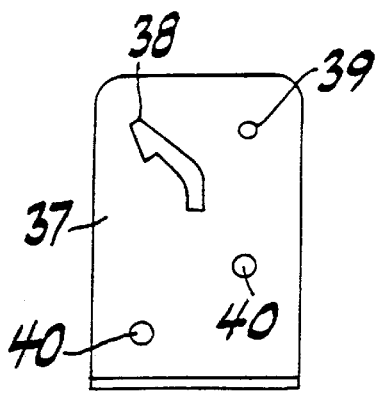
FIGS. 3C, 3D and 3E show a typical universal bracket to mount the roller of FIG. 1, on the inside or outside of a window frame.
Figure 3E:
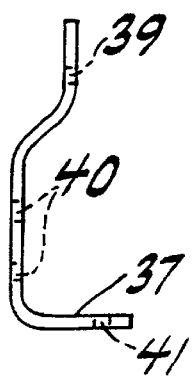
Figure 3C:
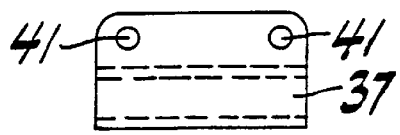
Figure 3A:
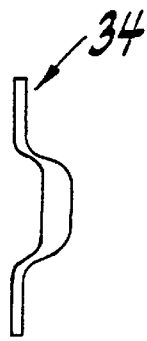
FIGS. 3A and 3B show a typical inside jamb mounting bracket to mount the pin side of the roller of FIG. 1.
Figure 3B:
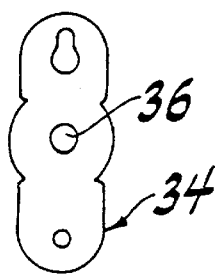
Figure 3:
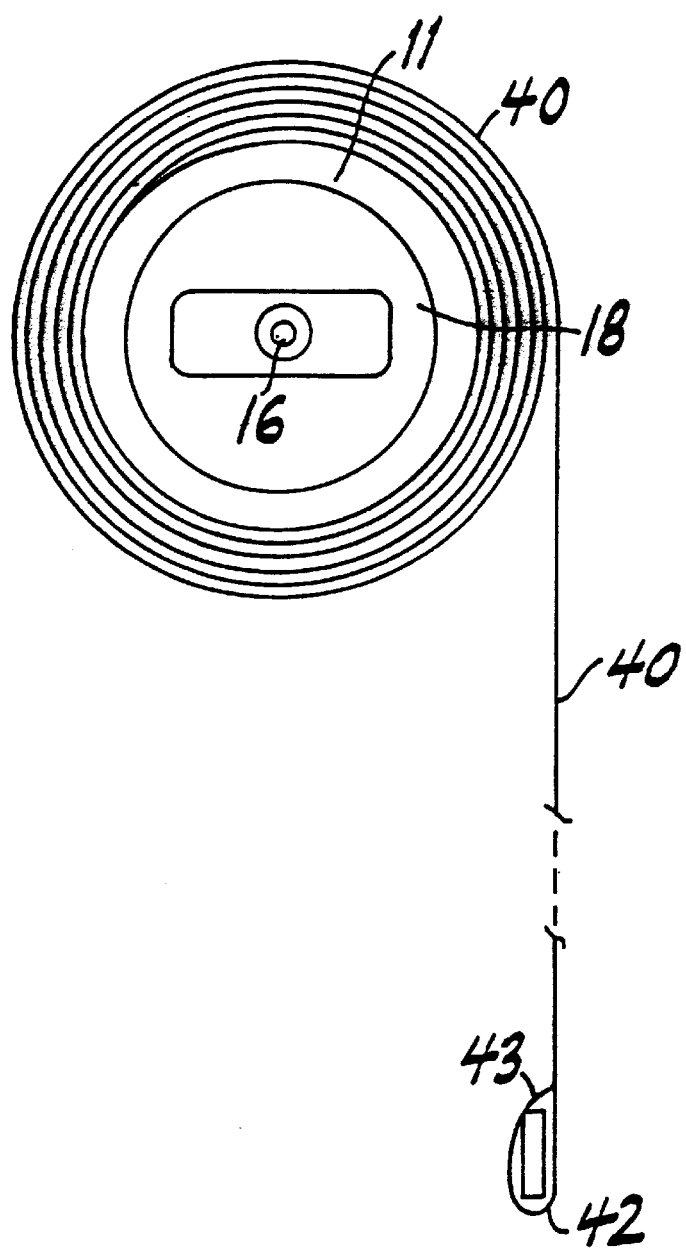
FIG. 3 is an end view of FIG. 1 as seen from arrows 3—3 in FIG. 1.

The second end cap 18 houses a supporting pin 16, as best seen in FIG. 3. The supporting pin 16 allows the roller to rotate in a suitable bracket. The entire end cap 18 is easily removable to enable adjustment of the length of the roller 11. Such shades are commercially available and are stocked by suppliers in standard lengths.

Figure 2:
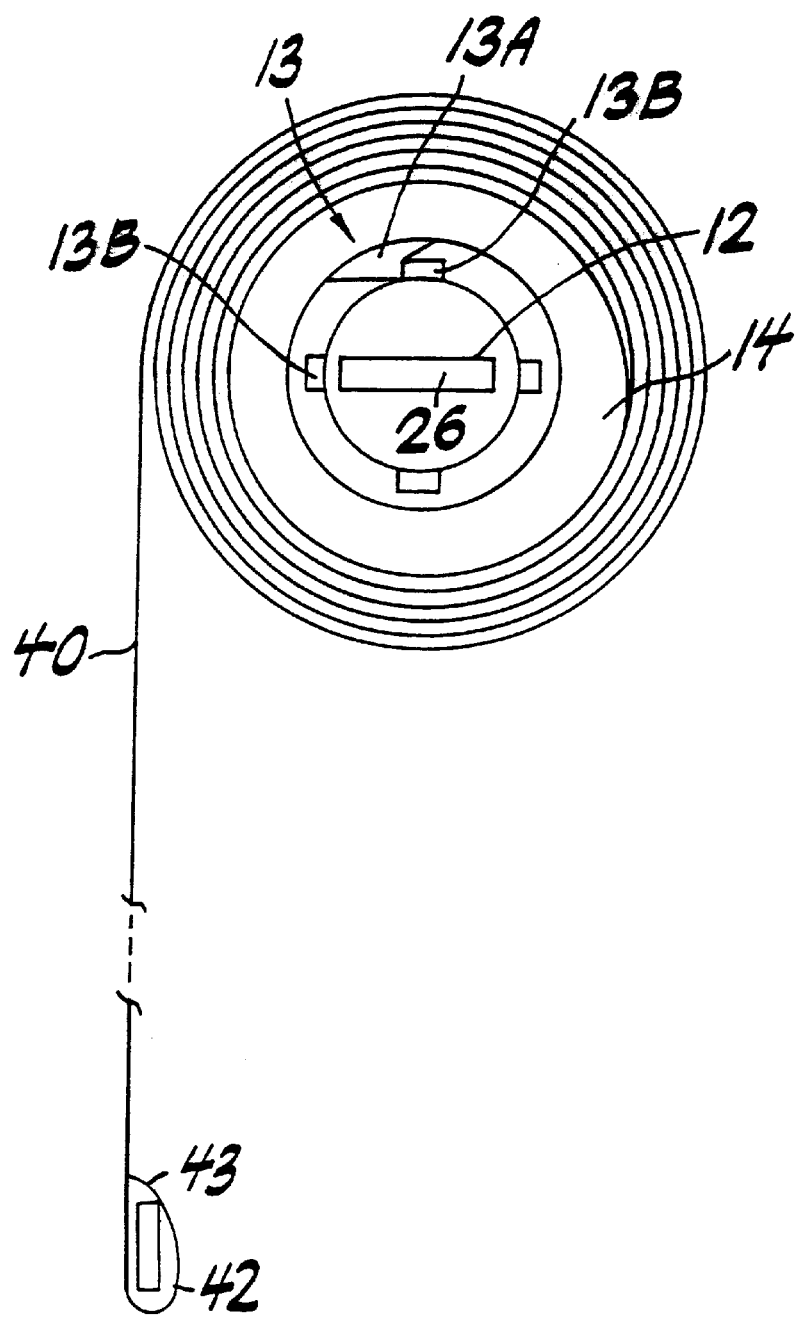
FIG. 2 is an end view of FIG. 1 as seen from arrows 2—2 in FIG. 1, but also showing the shade material wrapped on the roller and a typical locking mechanism.
Figure 2A:
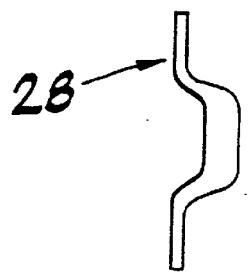
FIGS. 2A and 2B show a typical prior art inside jamb mounting bracket to mount the barb side of the roller of FIG. 1.
Figure 2B:
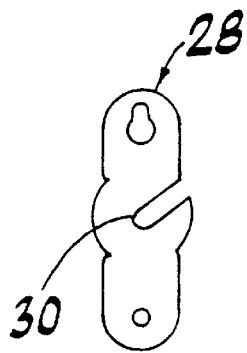

The reelable shade 10 is installed in mounting brackets of the type shown in FIGS. 2A, 2B, 3A and 3B, or an alternative, as shown in FIGS. 3C, 3D and 3E, which are each mounted by screws or nails or the like to the area, such as the jamb of a window to be covered or uncovered by the shade. If the brackets 28 and 34 of FIGS. 2A, 2B, 3A and 3B are used, the supporting pin 16 is first inserted in the hole 36 of mounting bracket 34. The barb end 26 of the shade is then inserted into its bracket, e.g., bracket 28 by inserting the barb 26 into the slot 30 (FIG. 2B). The shade can then be unwound. While unwinding, the spring 20 winds. The latch mechanism 13 allows the shade to be extended to the desired amount and held in place against the force of the spring 20. To rewind the shade, the latch mechanism is disengaged by pulling the shade down slightly and then allowing the spring 20 to rotate the roller to rewind the shade. In order to prevent the shade from rotating too quickly, the user holds the shade as the spring rewinds it.

FIGS. 3C, 3D and 3E show a prior art universal mounting bracket 37 that can be used at either the left or right hand sides of the shade roller. If used at the left hand side (viewed from the room interior), the barb 26 is received in opening 38. The pin 16 end of the roller is received in opening 39 of a bracket 37 mounted on the right side. The bracket can be mounted to the window jambs (inside mounting) via holes 40 or outside the window jambs via holes 41.

Figure 10:
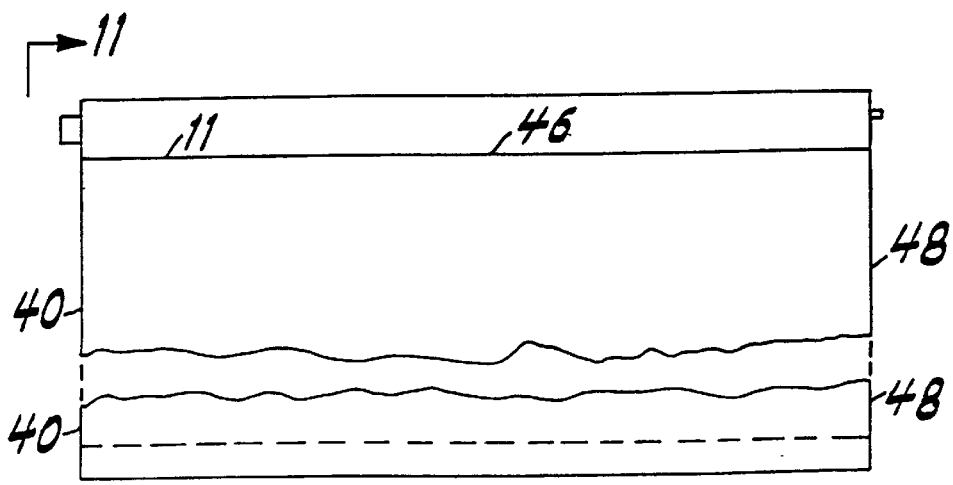
FIG. 10 shows the shade roller of FIGS. 5 or 8 with the shade in place.

FIG. 10 shows the conventional reelable shade of FIGS. 1, 2 and 3 with the shade fabric 40 attached to the tube 11, using staples 46. The shade fabric 40 can be attached to the tube 11 with other kinds of mechanical fasteners, e.g., tape or glue or the like.

Figure 11:
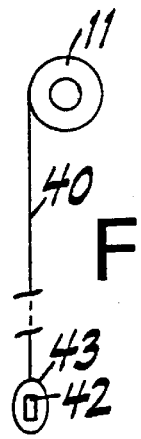
FIG. 11 is a side view of FIG. 10.

The lower end of shade fabric 40 is folded back upon itself and either glued or sewn, forming a loop 43 for receiving a conventional wooden or plastic hem bar 42. See FIG. 11. Hem bar 42 is inserted into the loop 43 to add strength and rigidity to the bottom edge of the shade. Such shades are typically manufactured in 3, 4, 5, and 6 foot widths. If the required width of the shade for a particular application is different from these widths, the shade width must be modified. This is accomplished by removing the end cap 18 from the end of the tube 11. The fabric 40, the tube 11, and the hem bar 42 are then cut to the required length forming a trimmed edge 48. The end cap 18 is then reinstalled in the end of the tube 11 and the shade assembly 10 can be installed in its mounting brackets.

In normal operation of the shade of FIG. 1, the user pulls the shade fabric 40 down by grasping the hem bar 42. As the shade fabric 40 is unreeled, the spring 20 is wound. When the appropriate amount of shade fabric is unreeled, the hem bar 42 is gently released and the latching mechanism 13 locks the shade 10 in position.

Figure 6:
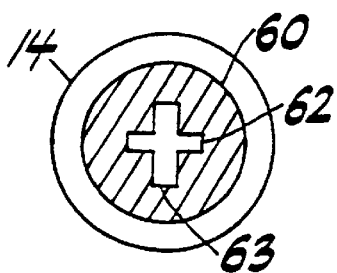
FIG. 6 is a cross-sectional view of FIG. 5, taken across section line 6—6 in FIG. 5.
Figure 7:
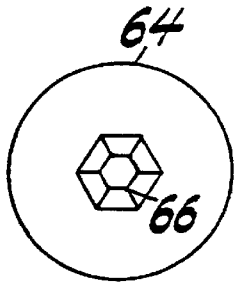
FIG. 7 is an end view of FIGS. 5 and 8 as seen from arrows 7—7 in FIG. 5.
Figure 5:
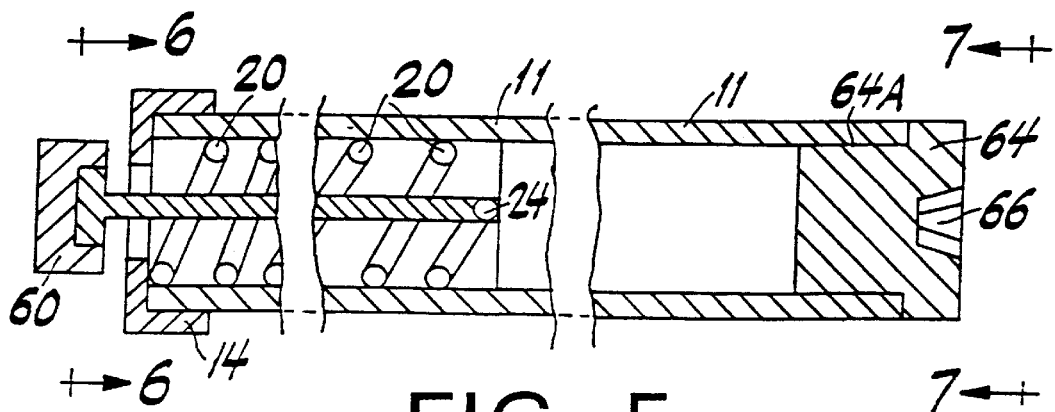
FIG. 5 is a cross-section of the shade of FIG. 1, after its end connectors have been modified in accordance with the invention to enable it to be used as a part of the motorized system of the invention.

FIGS. 5, 6, and 7 show the conventional reelable shade 10 of FIG. 1 modified in accordance with the present invention so that it can be controlled by a motorized arrangement of the invention. Thus, a disk 60 with two different sized and orthogonal rectangular cut outs 62 and 63 is pressed on to the barb 26. The different sized rectangular cutouts 62 and 63 are sized to accommodate different sized conventional barbs with a press fit. The second end cap 18 of FIG. 1 is removed and replaced with a drive plug 64 as shown in FIGS. 5 and 7. The drive plug 64 has a drive receptacle 66 adapted to receive the output shaft of a drive motor as will be later described. The receptacle can take a variety of shapes, but preferably is a concentric hex drive socket 66. The drive plug 64 preferably has suitable serrations around its periphery 64A so as to frictionally grip the inside of the tube 11.

The hex drive socket 66 is removably installed onto a hex ball output shaft 102 of a motor control unit 100 according to the invention (FIGS. 14, 15, 16, 26, 27) during installation of the reelable shade, while the disk 60 is inserted into a pivot slot 76 of an idler mounting bracket 70 shown in FIGS. 12 and 13. The idler mounting bracket 70 is attached to the wall or woodwork surrounding the window (or other surface) to be covered or uncovered with screws or nails inserted through the inside jamb mounting holes 74 or outside jamb mounting holes 72. The inside diameter of the pivot slot 76 is sized slightly larger than the outside diameter of the disk 60 to allow the disk 60 to rotate freely. This disables the latching mechanism 13 and spring 20 of the conventional reelable shade 10, thus adapting it to motorized use. FIG. 13A shows the retrofitted shade of FIG. 5 installed in a window opening 9 for motorized use in accordance with the invention. As shown there, the shade is installed "inside" the window jamb, but can also be installed outside the jamb.

Figure 8:
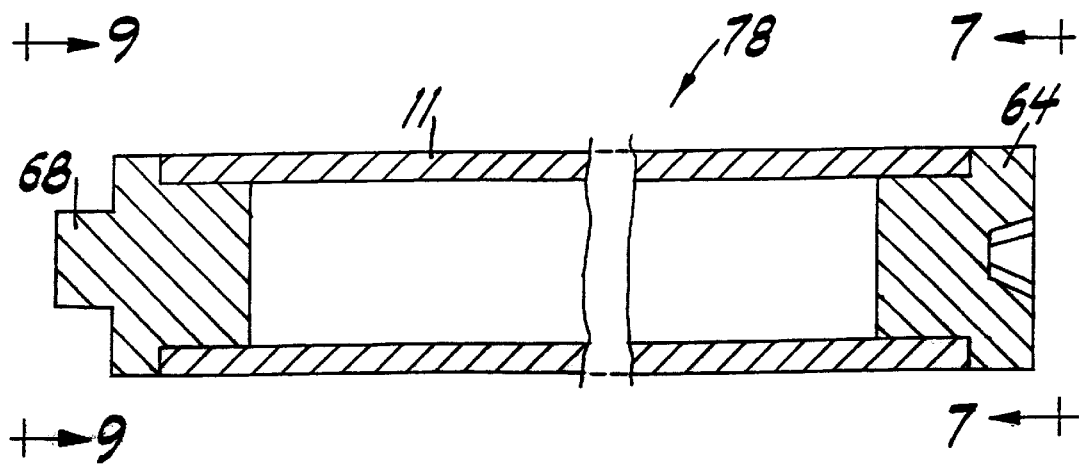
FIG. 8 is an axial cross-section of a shade roller made in accordance with the invention for use as part of the motorized system of the invention.
Figure 9:
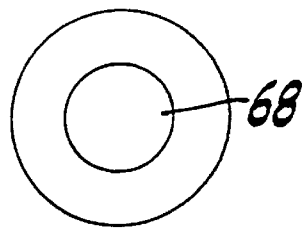
FIG. 9 is an end view of FIG. 8 as seen from arrows 9—9 in FIG. 8.

FIGS. 8 and 9 show a further embodiment of a reelable shade 78 made according to the invention. The shades of FIGS. 1 to 7 are conventional, retrofitted for motorized use in accordance with the invention, while the shade of FIG. 8 is made expressly in accordance with the invention for use with and as a part of the motorized system of the invention. In FIG. 8, the shade 78 comprises a shade tube 11 which may be of conventional design, but has a drive plug 64 (as previously described) and an idler plug 68 at its opposite ends inserted into shade tube 11. A shade fabric 40 (not shown) is conventionally fixed to the surface of the roller 11 of FIG. 8, as in FIG. 10.

With reference again to FIG. 13A, shade 78 is fixed in place by installing the drive plug 64 onto hexball 102 of combined bracket and motor assembly 100, as described. Plug 68 is installed on bracket 70 of FIGS. 12 and 13 which rotatably receive the plug 68.

Figure 14:
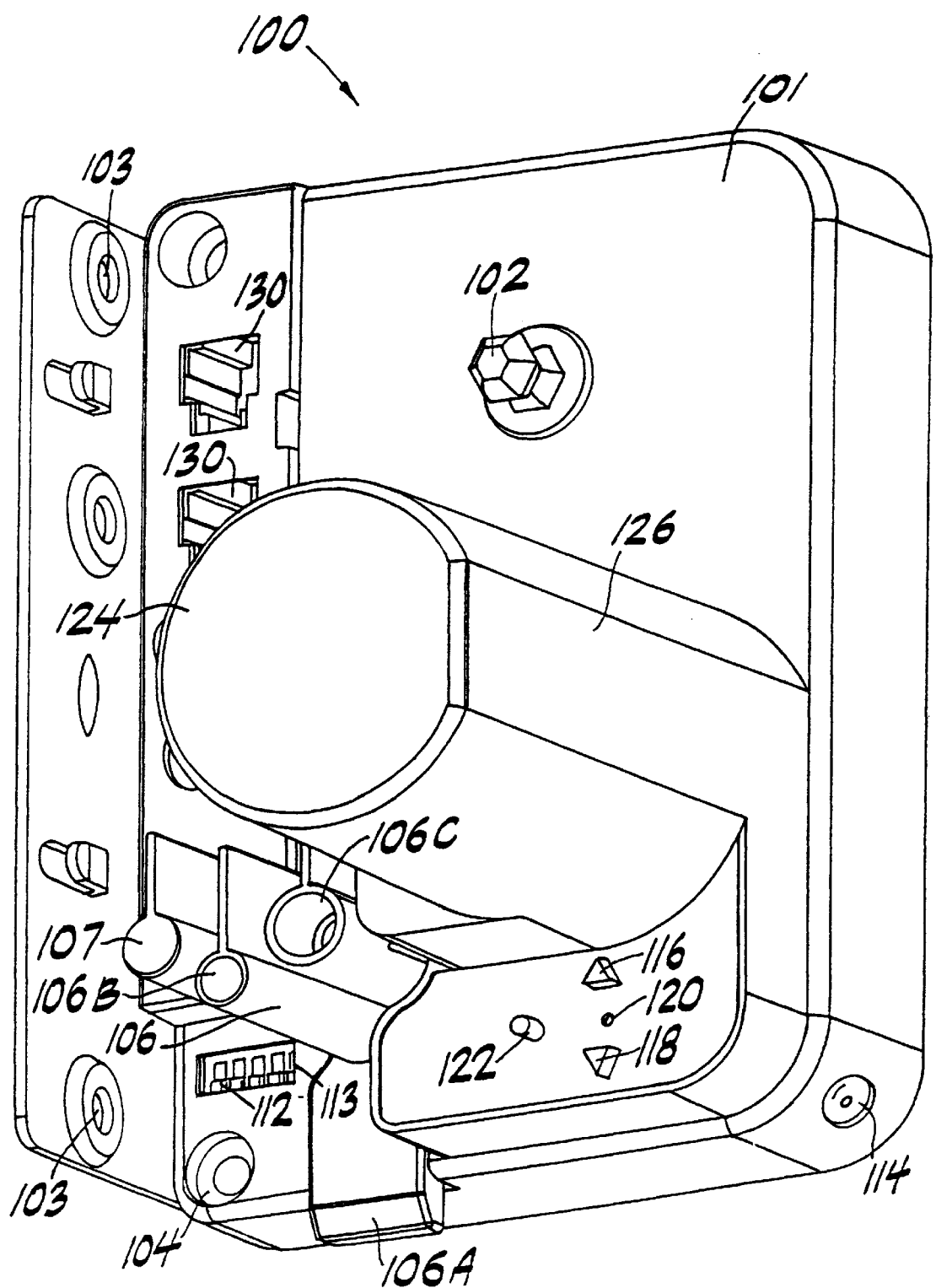
FIG. 14 is an isometric view of the combined mounting bracket and motor drive assembly of the present invention, viewed from below and to the left of where the assembly would typically be mounted, i.e., the upper right side of a window jamb as viewed from the interior of a room.
Figure 15:
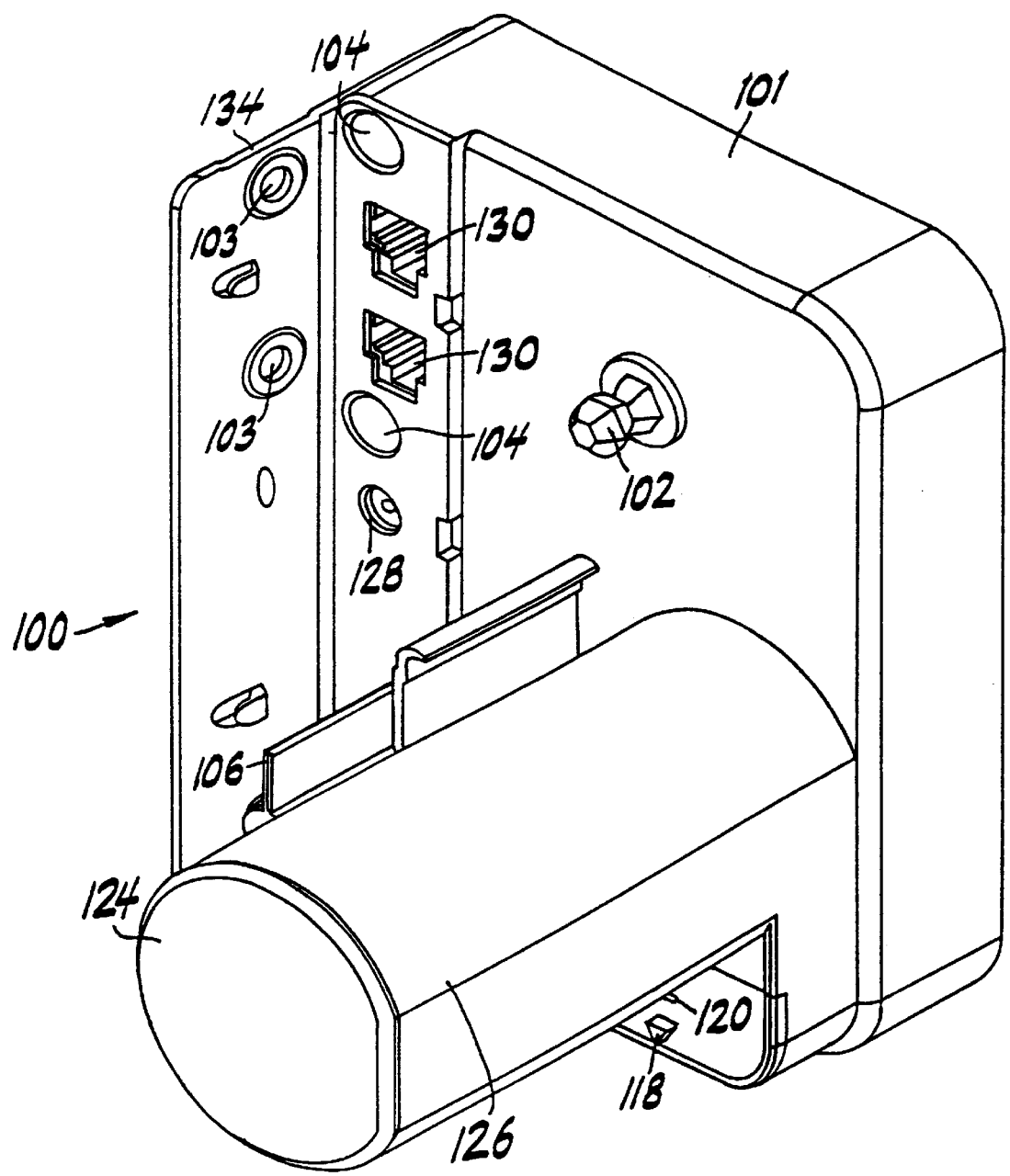
FIG. 15 is another isometric view of the assembly of FIG. 14 viewed from above and to the left of the assembly mounted in the upper right hand corner of a window opening as viewed from the interior of a room.
Figure 16:
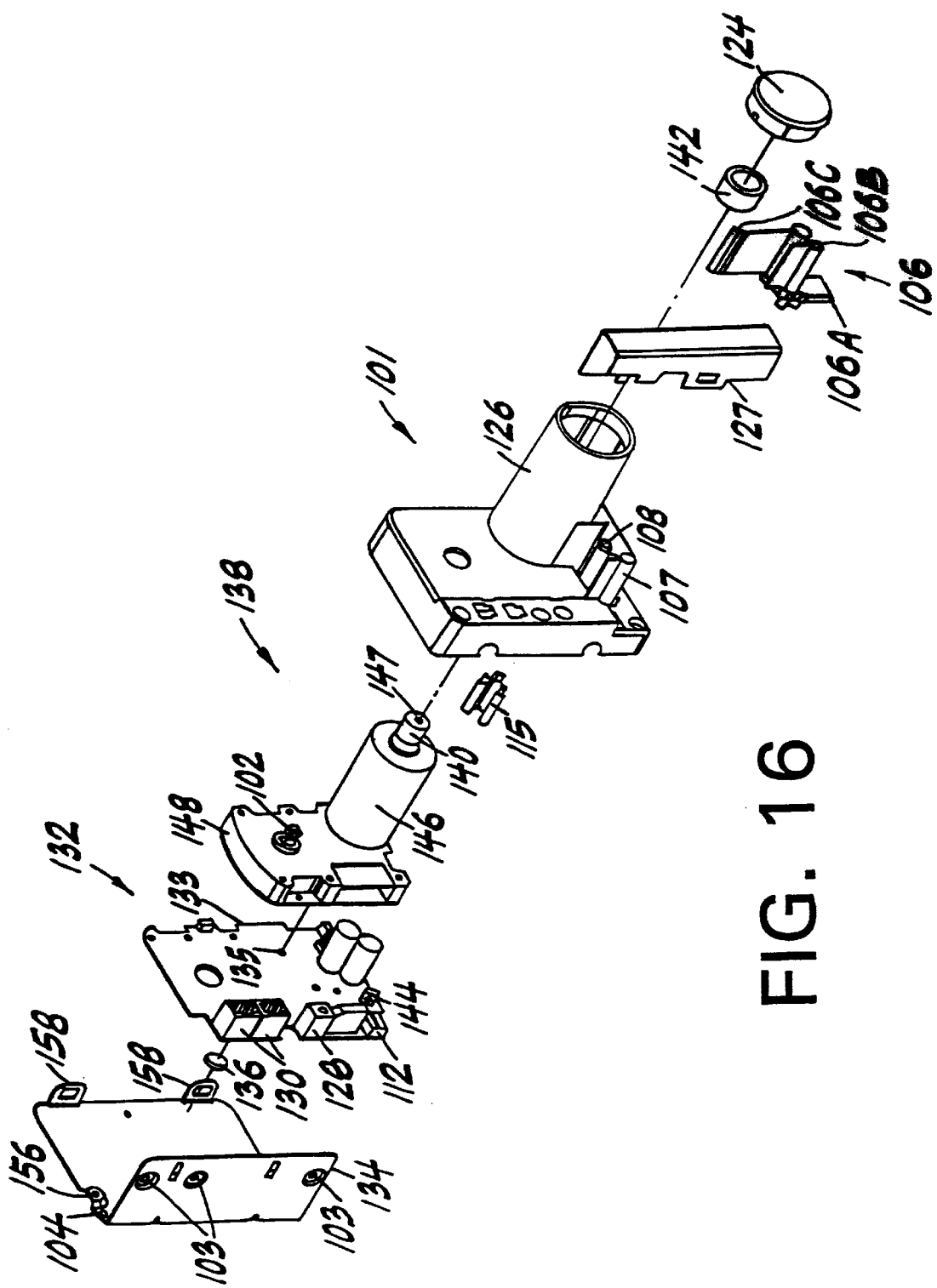
FIG. 16 is an exploded perspective view of the assembly of FIG. 14 and 15.
Figure 16A:
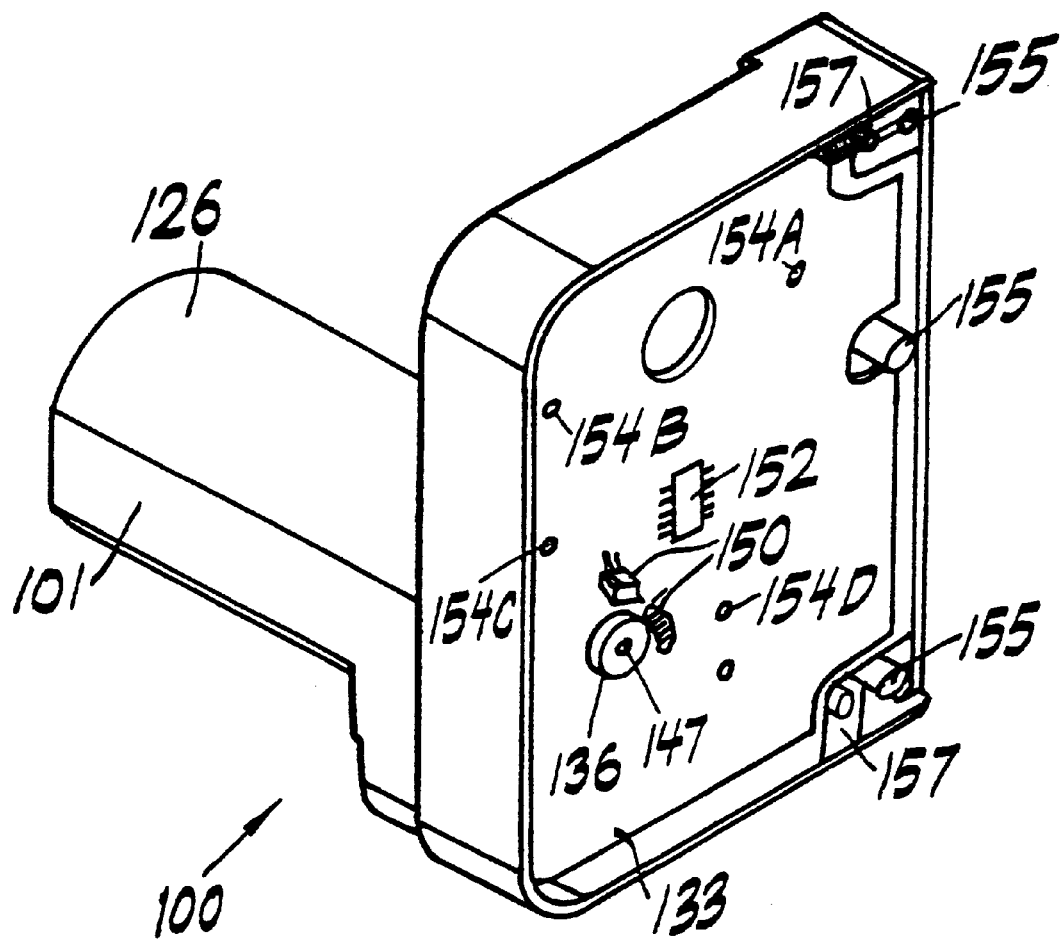
FIG. 16A is a rear isometric view of the motor assembly of FIGS. 14–16, which illustrates the mounting of Hall effect sensors on the printed circuit board (PCB) and in quadrature positions adjacent a permanent magnet on the end of the drove motor shaft, with the mounting bracket not shown for clarity.
Figure 26:
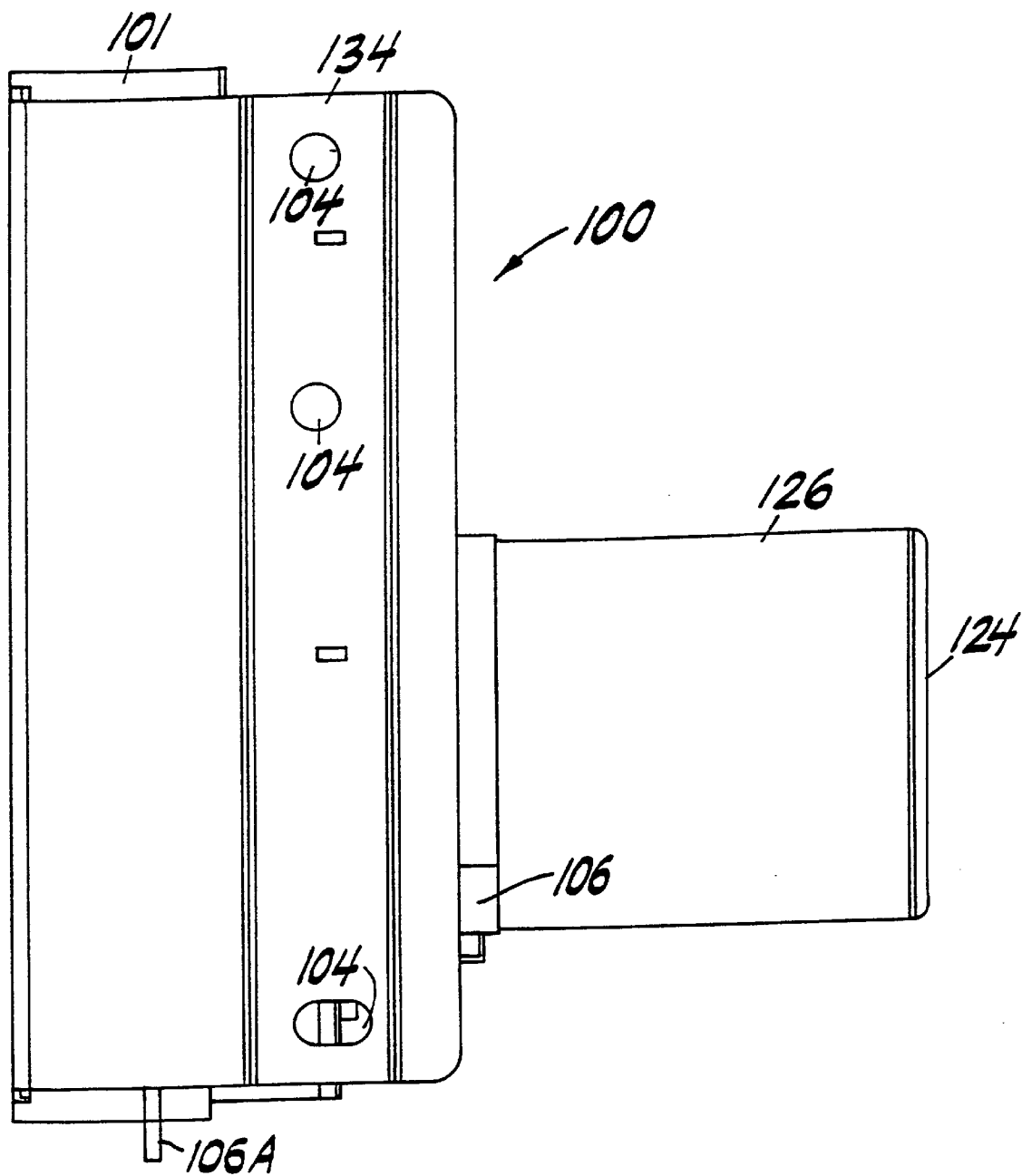
FIG. 26 is a left end view of FIG. 14.
Figure 27:
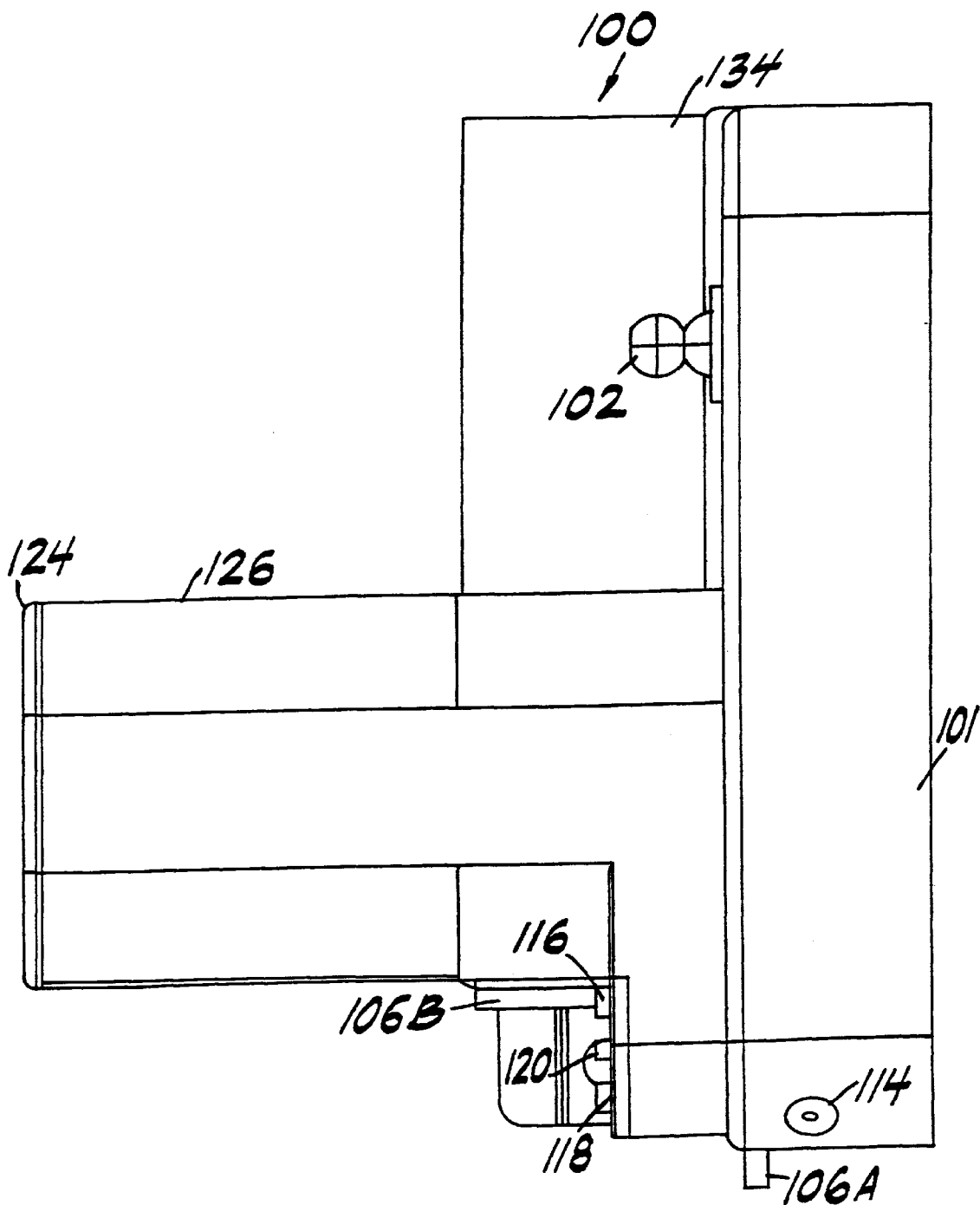
FIG. 27 is a right end view of FIG. 14.

FIGS. 14, 15, 16, 16A, 26 and 27 show the combined bracket and motor unit 100, also called herein a motor control unit. FIG. 16 is an exploded perspective view of assembly 100, while FIGS. 14 and 15 show assembly 100 from different angles. FIG. 16A is a rear isometric view of the unit 100 with the mounting bracket not shown and FIGS. 26 and 27 show left end and right end views of the assembly 100 of FIG. 14.

The motor control unit 100 comprises, as sub assemblies shown in FIG. 16, mounting bracket 134, printed circuit board (PCB) assembly 132, motor drive unit 138, housing or enclosure 101 and end cap 124, home position and limit paddle 106 and outer brake magnet 142. Also shown is a sensor magnet 136 that mounts on the drive shaft 147 of drive motor 146. A cover 127, to be described later, may optionally be provided to cover a portion of housing 101. Also provided are actuator buttons 115 for actuating control switches on PCB 133.

The motor control unit 100 can either be mounted to the wall or woodwork surrounding the window or other surface to be covered or uncovered with screws or other fasteners inserted through outside jamb mounting holes 103 or inside jamb mounting holes 104 in the mounting bracket 134.

In order to mount the shade 10, 78, assembly 100 and bracket 70 (FIGS. 12, 13 and 13A) are mounted appropriately adjacent the window opening. Viewed from inside the room, unit 100 is mounted in the upper right window corner and bracket 70 is mounted in the upper left window corner. The shade is first placed in position so that plug 64 receives the hex ball output shaft 102, to be described in detail later, of motor assembly 100. The left side of the shade 10, 78 is then inserted in bracket 70 so that idler plug 60, 68 is received in slot 76. Thus, shade 10, 78 is suspended between bracket 70 (FIGS. 12 and 13) and assembly 100, as shown in FIG. 13A.

The PCB assembly 132 contains a printed circuit board 133 having disposed thereon communication jacks 130, power jack 128, address switches 112, home position paddle microswitch 144 as well as a control circuit including a microprocessor 152, to be described later. Also located on the PCB 133 are control switches for raising and lowering the shade and a program set actuator. These will be described later.

The power jack 128 receives a low A-C voltage, e.g., 24 volts AC, from a plug-in transformer (not shown) that plugs into a standard 120 VAC receptacle. The plug in transformer is remotely located and is connected to jack 128 by low voltage wiring.

The communication jacks 130 preferably are standard four-pin modular telephone jacks, e.g., RJ-11 jacks. These allow multiple motor control units 100 to be linked together, using standard four-wire telephone cables with connectors at each end. A circuit will be described below that allows use of conventional phone connection wires with either straight-through wiring or crossed wiring, either of which will work properly among multiple motor control units 100. In accordance with the invention, the two communication jacks 130 preferably are interchangeable; there is no dedicated input or output jack, so either jack can serve as input or as output.

A decorative cover 127 is optionally provided to cover jacks 130, jack 128, associated plug-in wiring therefor and address switches 112. The cover 127 also serves to keep the plug-in wiring from interfering with the movement of shade fabric 40.

The home position paddle microswitch 144, which is operated by actuator 110 (best seen in FIGS. 17B and 18A) of home position paddle 106, is used to prevent the shade fabric 40 from traveling beyond a shade rise limit when reeling up the shade fabric 40 and also to set a "home" position. In addition, it is used to prevent the shade from traveling past the fully extended position when unreeling the shade fabric 40. The home position switch can also be activated by fabric that bunches up on the roller. The function of this home position paddle 106 and microswitch 144 will be described in detail later.

The motor drive unit 138 of (FIG. 16) houses a drive motor 146 and a gear box 148. The motor 146 is preferably a 12-pole, 18 watt DC motor but can be any type of reversible motor. The gear box 148 is a relatively flat pancake style gear box with a spur gear train (not shown) with the hex ball output shaft 102 extending outward. The gear box 148 is of the flattened type often used in vending machines and adapts itself to compact mounting in the mounting bracket assembly. In a preferred embodiment, a gear reduction ratio of 119:1 is used. The desired output speed of the gear box output shaft is approximately 35 rpm, so the drive motor has a nominal rotational speed of approximately 4100 rpm.

As previously described, the hex ball output shaft 102 is received in the hex drive socket 66 of the shade 78 (FIG. 8) or retrofitted shade 10 of FIG. 5 during installation. The hex ball and socket construction permits a drive connection to the shade 78 even though there may be substantial misalignment of their respective axes of rotation, due to installation misalignment of bracket 70 and unit 100.

When the motor 146 operates, its output shaft 147 is coupled through the gear box 148 to cause the hex ball output shaft 102 to rotate and drive the hex drive socket 66. This causes the tube 11 to rotate, which in turns reels or unreels shade fabric 40 (FIG. 13A).

A 12-pole DC motor is preferably used to precisely control the rotation and rest position of the shade tube 11. The 12-pole motor has a "cogging" action which can act as a holding brake to prevent the shade fabric from unreeling under its weight after the motor 146 has been turned off. To stop a shade that is travelling upward or downward, preferably the motor is shorted by the control circuitry.

The driving shaft 147 of the motor 146 extends from both ends of the motor. One end of shaft 147 extends through a hole 135 in printed circuit board 133, and sensor magnet 136 (FIG. 16A) is press-fit or otherwise secured to the end of the shaft 147 and rotates therewith. Magnet 136 rotates with respect to two quadrature positioned Hall effect sensors 150 (FIG. 16A) which are mounted on the back side of the printed circuit board 133 and allow the microprocessor to keep track of the rotational position, speed and direction of the motor shaft 147, and thus of the hex ball output shaft 102 and shade itself. Details of this arrangement will be described below.

Preferably extending from the other end of the motor shaft 147 is an inner brake magnet 140. The inner brake magnet 140 rotates inside of stationary outer brake magnet 142 which provides the motor with a greater holding force when the motor is not energized. The outer brake magnet 142 is suitably secured in the stationary end cap 124 as with screws and washers or suitable adhesive to prevent it from rotating.

In some applications, the brake magnets 140 and 142 may be dispensed with, and all braking action to hold a shade in position will depend on the cogging action of motor 146.

FIG. 16A shows an isometric rear view of the assembly 100 and in particular shows the placement of two Hall effect sensors 150 in quadrature (at 90° to one another) which are mounted on the rear side of the printed circuit board 133. The motor shaft 147, is shown with the permanent magnet 136 which rotates with the angular velocity of the motor shaft and is positioned so that sensors 150 are adjacent the periphery of magnet 136. As a consequence, the output signal of each of Hall effect sensors 150 is a pulse train, in quadrature relationship with each other, in which the pulse frequency is a function of motor speed and the relative pulse spacing between the two pulse trains is a function of direction of rotation of shaft 147.

FIG. 16A also shows openings such as openings 154A, 154B, 154C and 154D which receive screws, preferably insulating plastic, to fasten the PCB 133 to enclosure 101; and bosses such as 155 aligned with mounting holes 104 (FIG. 15) which enable mounting of the 2245 housing 101 to a mounting surface. Finally, openings 157 permit mounting of the bracket 134 to enclosure 101.

With reference again to FIG. 16, pivot pin 108 is integral with housing 101, and stationary paddle 107 is also molded as part of the housing 101. The home position paddle 106 slips over and is rotatably mounted on the pivot pin 108.

Figure 18:
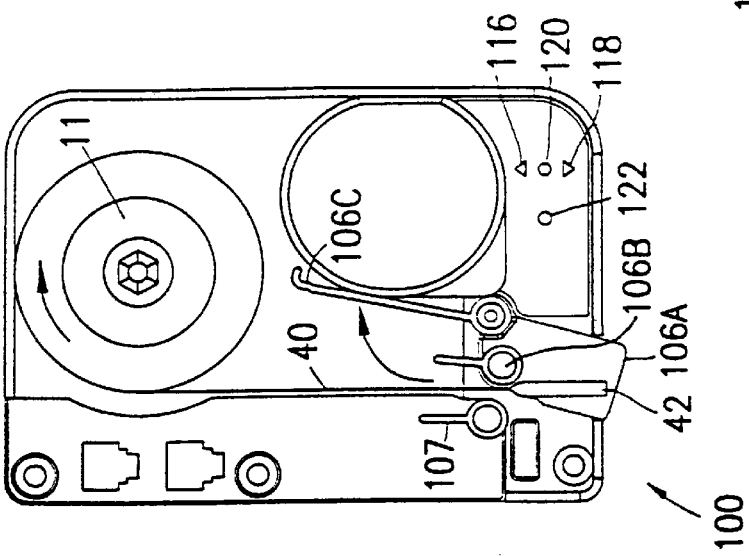
Figure 17:
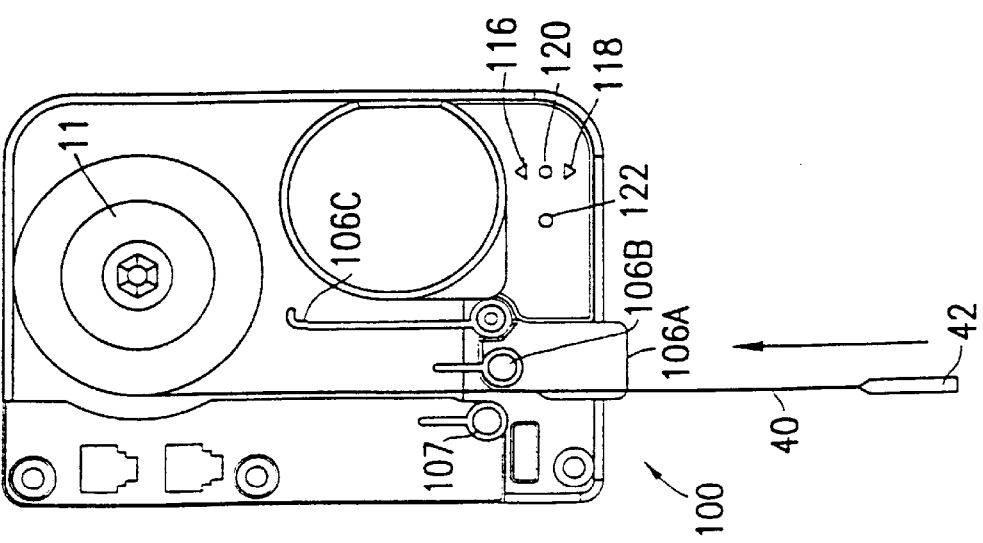
Figure 17B:
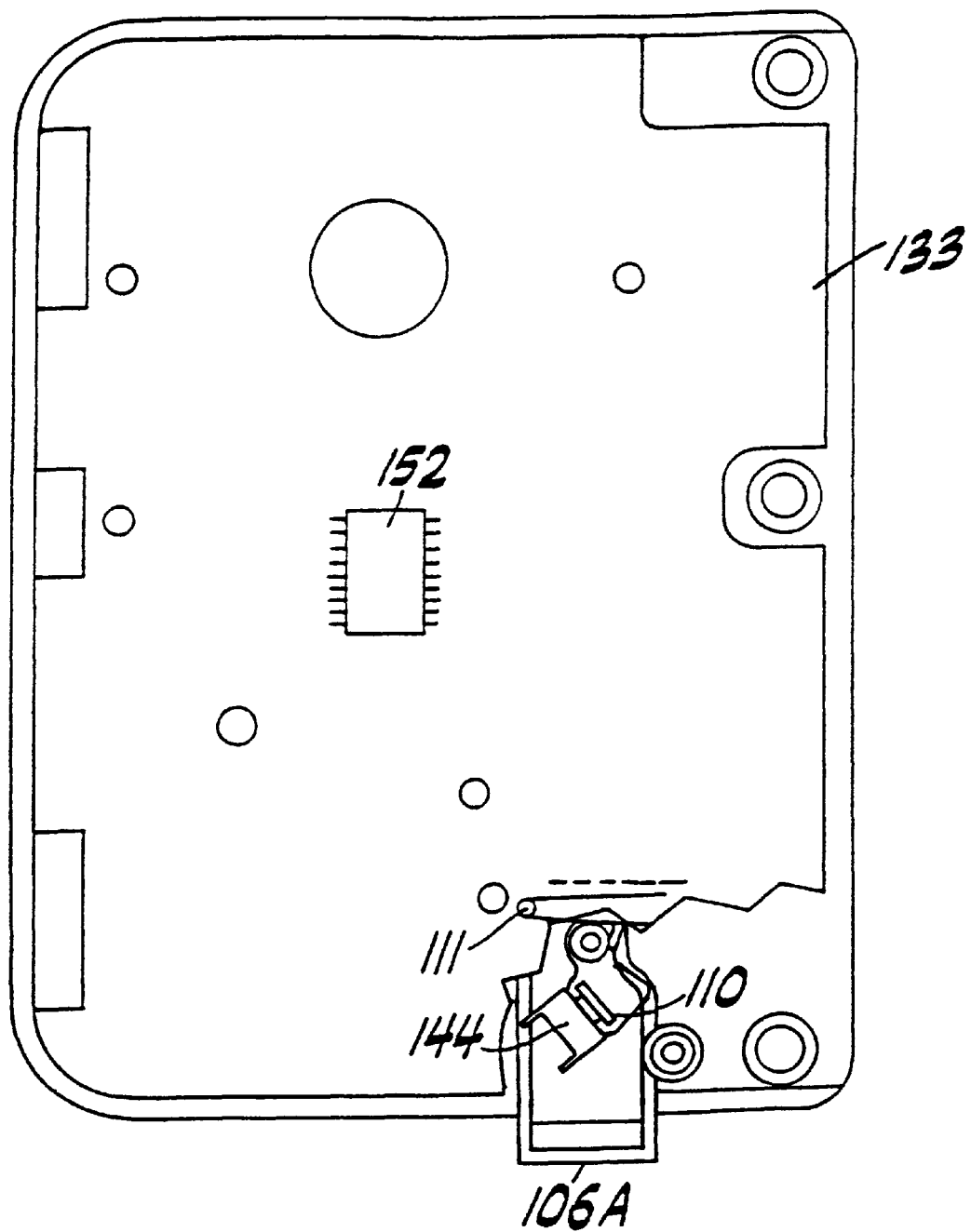
FIG. 17B is a view of the rear of the assembly of FIG. 17 with a portion of the PCB broken away to illustrate the limit paddle and its microswitch where the microswitch is in its depressed state.
Figure 18A:
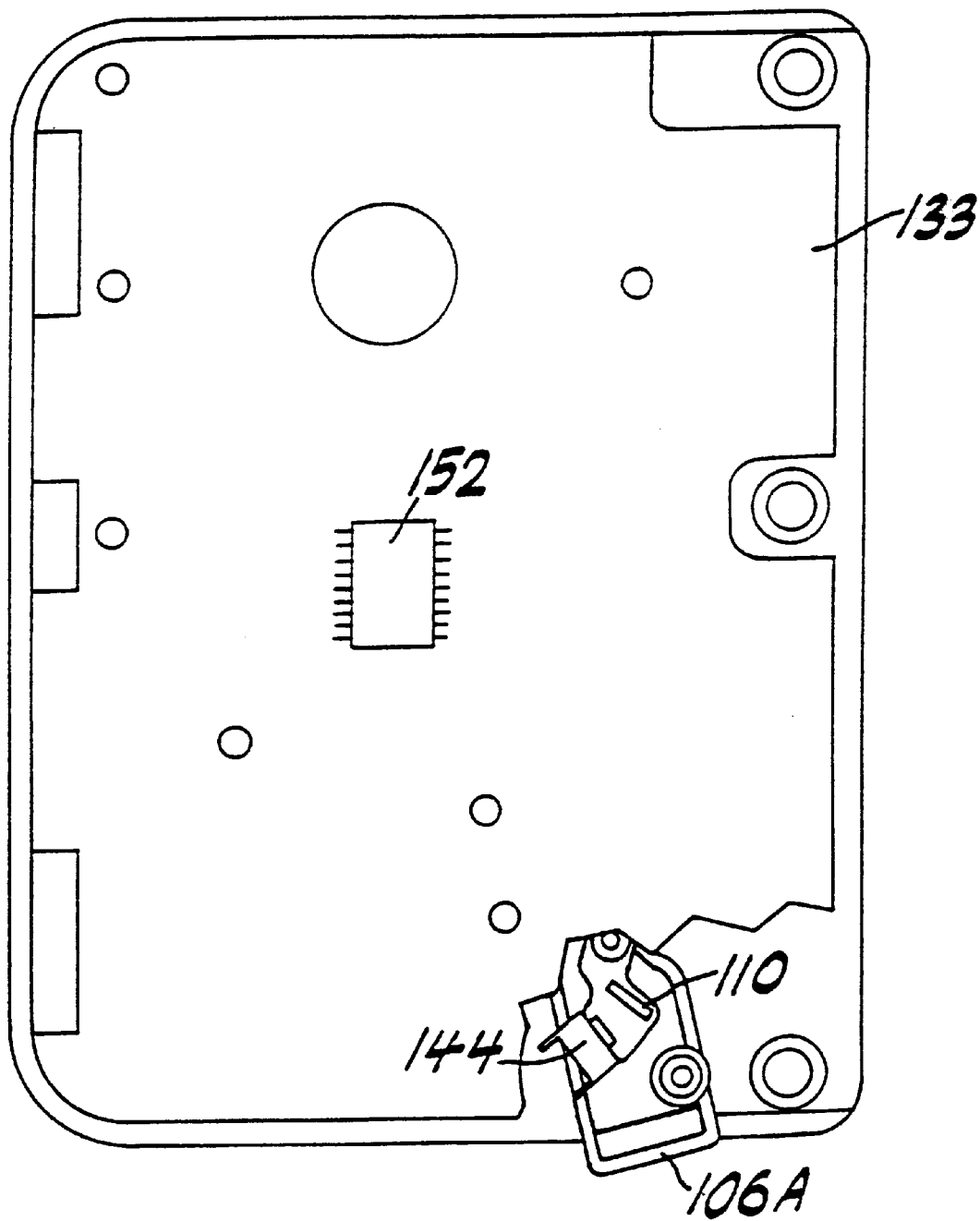
FIG. 18A is like FIG. 17B but shows the limit switch paddle rotated to allow the change of state of the microswitch.
Figure 22:
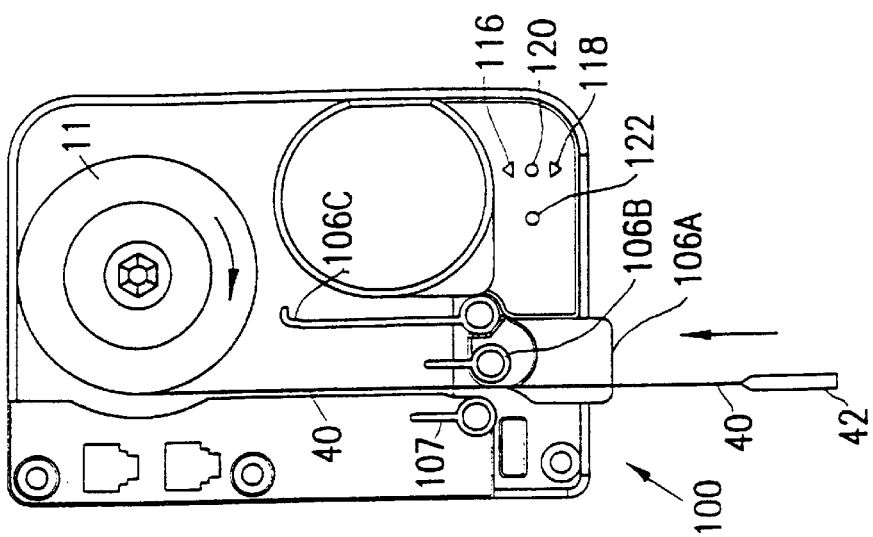

The home position paddle 106 can rotate through a limited arc as shown in FIGS. 17 and 18. The paddle is generally L-shaped, as shown, and comprises a portion 106A, 106B and a longer extending portion 106C. In the rest position of FIG. 17, actuator 110 of the paddle 106 depresses the operator of microswitch 144 in the embodiment illustrated. This is shown in FIG. 17B in a rear view. When the limit paddle 106 is rotated clockwise to the position of FIG. 18, the microswitch 144 is in a relaxed or undepressed position. This is shown in FIG. 18A. The limit paddle 106 will be described in greater detail below.

The housing 101 covers and houses the PCB assembly 132 and the motor unit 138. The tubular extension 126 encloses the DC drive motor 146. An infrared port 114 (FIG. 14) allows infrared signals from a hand held infrared transmitter to communicate with the motor control unit 100. Alternatively, an RF port or a port responsive to some other frequency radiation or ultrasonic energy can be used.

Address switches 112 are mounted on the PCB 133 and are exposed through opening 113 (FIGS. 14 and 17A) in housing 101 to allow the installer to assign the motor control unit 100 a unique address. A unique address may be required in multiple control unit systems so that the user can independently control each shade from a control station such as a hand-held infrared transmitter. According to the invention, a communications port, such as an RS485 serial port, can be provided to enable individual control of a plurality of shades using unique addresses. The invention also encompasses a "contact closure" port, to be described later, which is not used with addresses, and which only enables group control of multiple control unit systems.

With respect to IR port 114 in FIG. 14, it should be noted that a Fresnel lens and/or infrared filter (not shown) can be disposed in the opening of port 114 to make collection of infrared signals more efficient. Furthermore, it is possible to insert an IR conductive flexible tube or cylinder into opening 114 with its free end conveniently positioned for line of sight reception of infrared signals. For instance, such an infrared conductive tube is disclosed in commonly owned U.S. patent application Ser. No. 08/713,776 filed Sep. 13, 1996 entitled "Infrared Energy Transmissive Member and Radiation Receiver", which is incorporated herein by reference in its entirety Note that other radiation signals could be used in place of infrared radiation, including RF signals, sonic signals and light in various bandwidths.

An "up" or "raise" actuator 116 and "down" or "lower" actuator 118 on housing 101 actuate switches on the PCB board 133 to control rotation of the motor 146 so that the shade 78 either reels or unreels its shade fabric. A status LED 120 (FIGS. 14 and 15) flashes at different rates if desired, to signal the user that the motor control unit is performing particular functions. Such functions may include setting the upper and lower limits and setting preset shade positions. Program set actuator 122 (FIG. 14) puts the motor control unit 100 into and out of a program mode. The program mode will be described in more detail later. "Raise" actuator 116, "lower" actuator 118 and program set actuator 122 comprise actuator buttons 115 of FIG. 16.

A "home" position is provided. The home position is the relative position from which the upper and lower limits are measured and will be later described. The "home" position corresponds to a zero count in a position memory of microprocessor 152, described in detail below. This enables microprocessor 152 to keep track of the shade position.

Figure 17A:
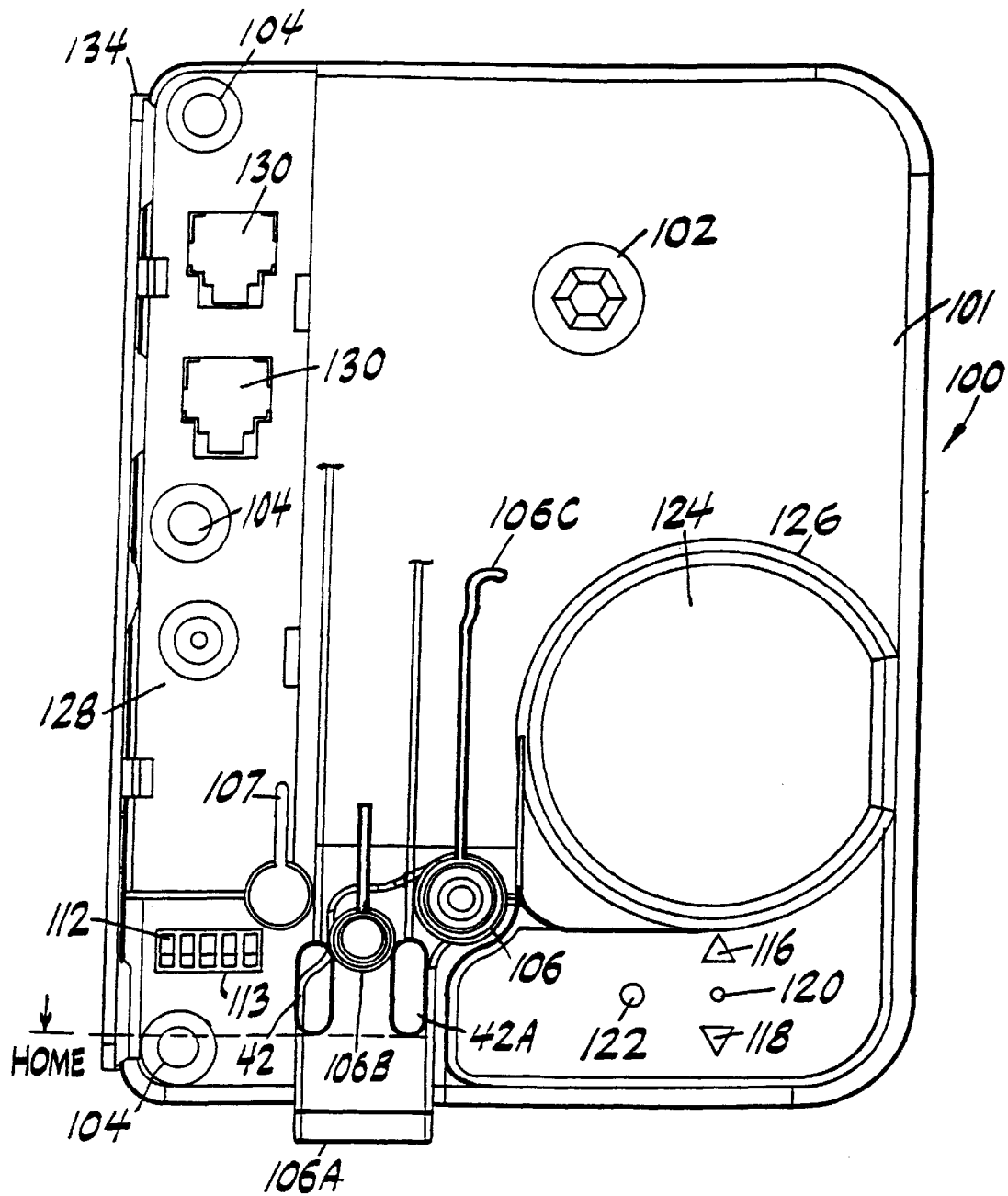
FIG. 17A is a similar view to FIGS. 17 to 22 but shows the shade in its "home" position and showing a preferred "reset" and misaligned/extending hem bar sensor according to the invention.

The installer can manually set the "home" position as shown in FIG. 17A. This is the first action the installer should perform when installing a new shade according to the present invention. The home position is the position where the hem bar 42 is just touching the limit paddle 106, but the limit microswitch 144 is not actuated. FIG. 17A shows two hem bars 42 and 42A for two alternative shades. The hem bar 42 is the hem bar of a longer shade than hem bar 42A. For a shorter shade, and consequently one that winds into a smaller volume on tube 11, the shade can be disposed between members 106B and 106C, as shown. In contrast, a longer shade, due to its greater winding volume on tube 11, will be threaded between members 107 and 106B. If a new shade is installed to replace another shade, the user can reestablish the home position. This saves the installer time because the installer will not have to reset the upper and lower limits which are defined in the microprocessor relative to the home position.

Figure 24:
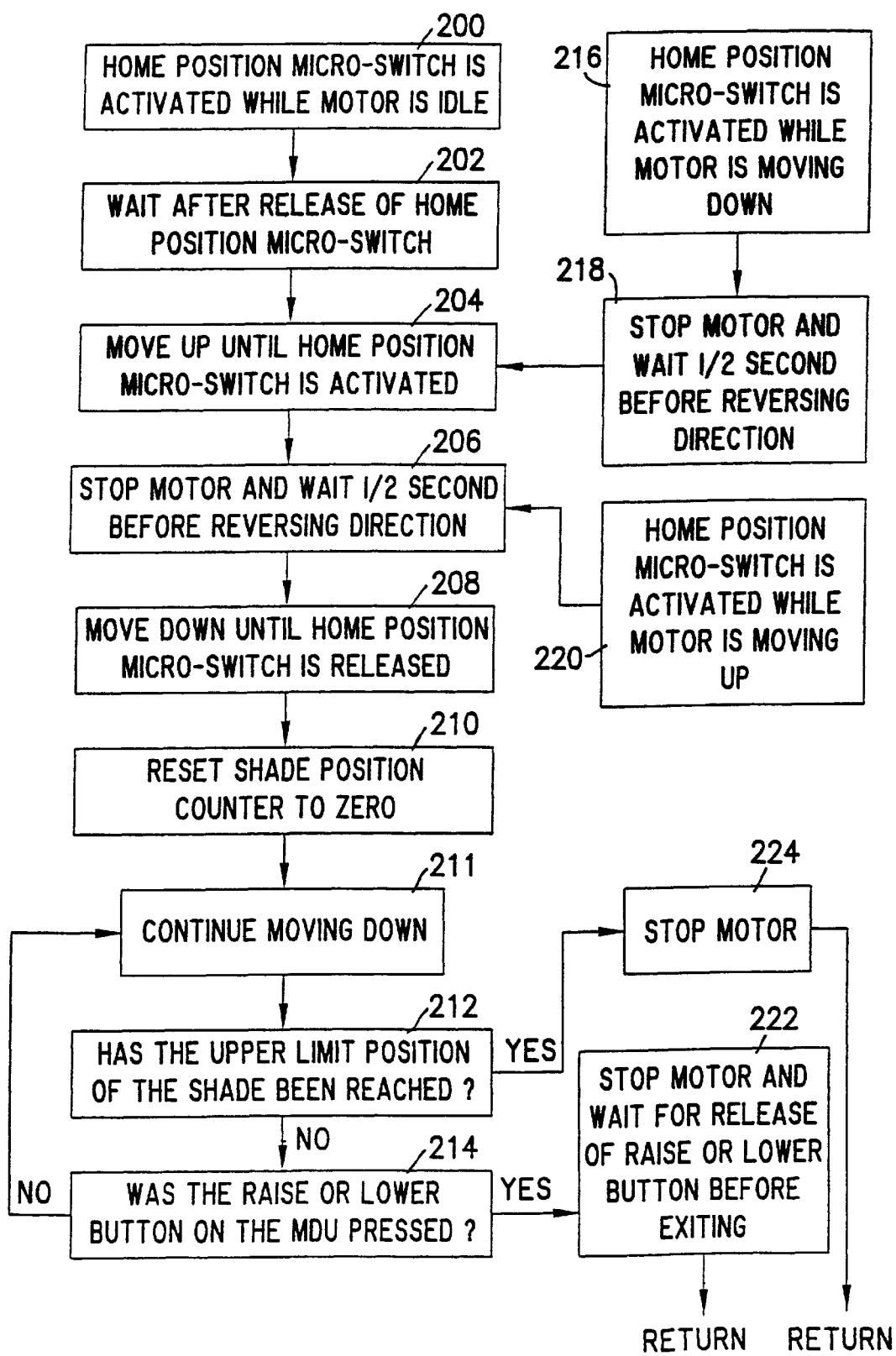
FIG. 24 is a flow chart which illustrates the home position reset function.

To set the home position, the installer rotates the limit paddle 106 or actuates actuator 106A manually to actuate microswitch 144 to start the home position reset function. Alternatively the home position reset function could be initiated by a certain sequence of operation of the switches of a wall control 5001 of FIG. 40 or 6001 of FIG. 41 or by commands received by the infrared receiver. This operation is shown in FIG. 24 starting at the block 200 "Home position microswitch is activated while motor is idle". The reset function waits after the release of the home position microswitch 144 (see FIG. 17B) to allow the user time to move his hand away from the shade fabric at block 202. The motor 146 then moves the shade fabric 40 upward until the home position microswitch 144 is activated by hem bar 42 at block 204 (see FIGS. 18 and 18A). The motor then waits one half second before reversing the motor direction at block 206. The motor 146 then rotates to move the shade fabric 40 downward until the home position microswitch 144 is released at block 208 (see FIG. 17A). In the embodiment illustrated, the actuator of microswitch 144 is depressed, as shown in FIG. 17B. This corresponds to the hem bar just touching paddle 16, as shown in FIG. 17A. This is the "home position. The shade position counter of the microprocessor 152 is reset to zero at block 210 and the motor continues to unreel shade fabric 40 at block 211 until the upper limit position is reached (see FIG. 19). If the upper limit position is reached at block 212, the motor is stopped at block 224 and the routine returns to normal operation. If the upper limit position is not reached at block 212, the motor control unit continues to unreel the shade fabric. If the "raise" actuator 116 or the "lower" actuator 118 is actuated during this time, the motor 146 is stopped and the motor control unit waits until the "raise" or "lower" actuator is released at block 222. The routine then returns to normal operation. If neither the "raise" actuator 116 nor the "lower" actuator 118 are actuated, the routine returns to block 211 until the upper limit is reached.

In order to prevent the system from hanging up in the loop 211–214 if no upper limit has been programmed, the system preferably is provided with a default upper limit programmed into memory, e.g. +5 rotations. In addition, a default lower limit is also preprogrammed, e.g. +48 rotations.

Figure 19:
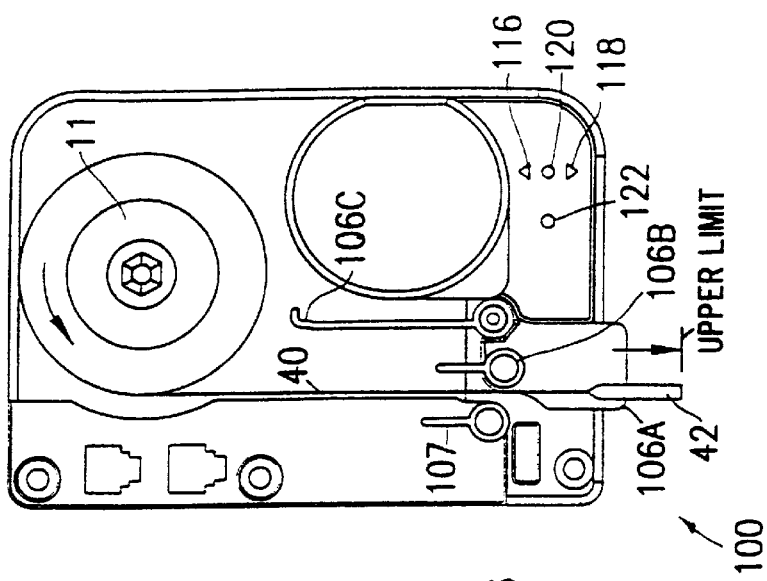
FIGS. 17 to 22 show the operation of the limit paddle of the assemblies of FIGS. 14 to 16 for controlling the limits of shade movement; specifically.
Figure 25:
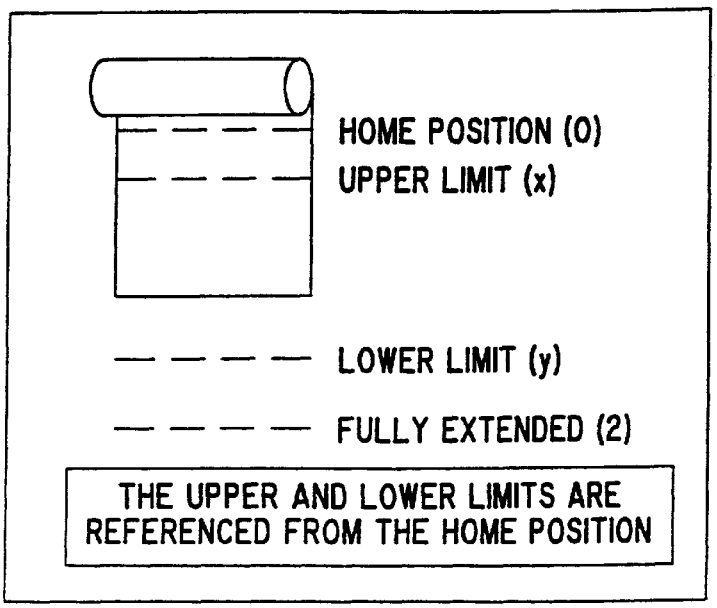
FIG. 25 shows the relationship between upper limit, lower limit, "home" position and fully extended positions.

The upper and lower limits (See FIG. 25) are set by the user. The upper limit is the position where the desired least amount of the shade fabric is showing, as is shown in FIG. 19. This is not to be confused with the "home" position of FIG. 17A, which is typically above the upper limit. The lower limit is the position where the desired most amount of shade fabric is showing. Most often, this is the position where the hem bar 42 is slightly above the window sill. This is not to be confused with the fully extended position (FIG. 25), which typically is below the lower limit.

When a reelable shade according to the present invention is set up, the second action the installer should perform is to establish its upper and lower limits, in accordance with the window opening size.

To set the upper limit, the installer actuates the "up" or "raise" actuator 116 or the "down" or "lower" actuator 118 to move the shade fabric to the desired upper limit position. The installer then actuates the program set actuator 122 and then the "up" actuator 116 to store the present shade position as an upper limit in a microprocessor memory on PCB 133. To set the lower limit, the installer actuates the "up" or "raise" actuator 116 or the "down" or "lower" actuator 118 to move the shade fabric to the desired lower limit position. The installer then actuates the program set actuator 122 and then the "down" actuator 118. The upper and lower limits are now stored in microprocessor mmory corresponding to pulse counts of Hall effect sensors 150, to be described in detail below.

Figure 23:
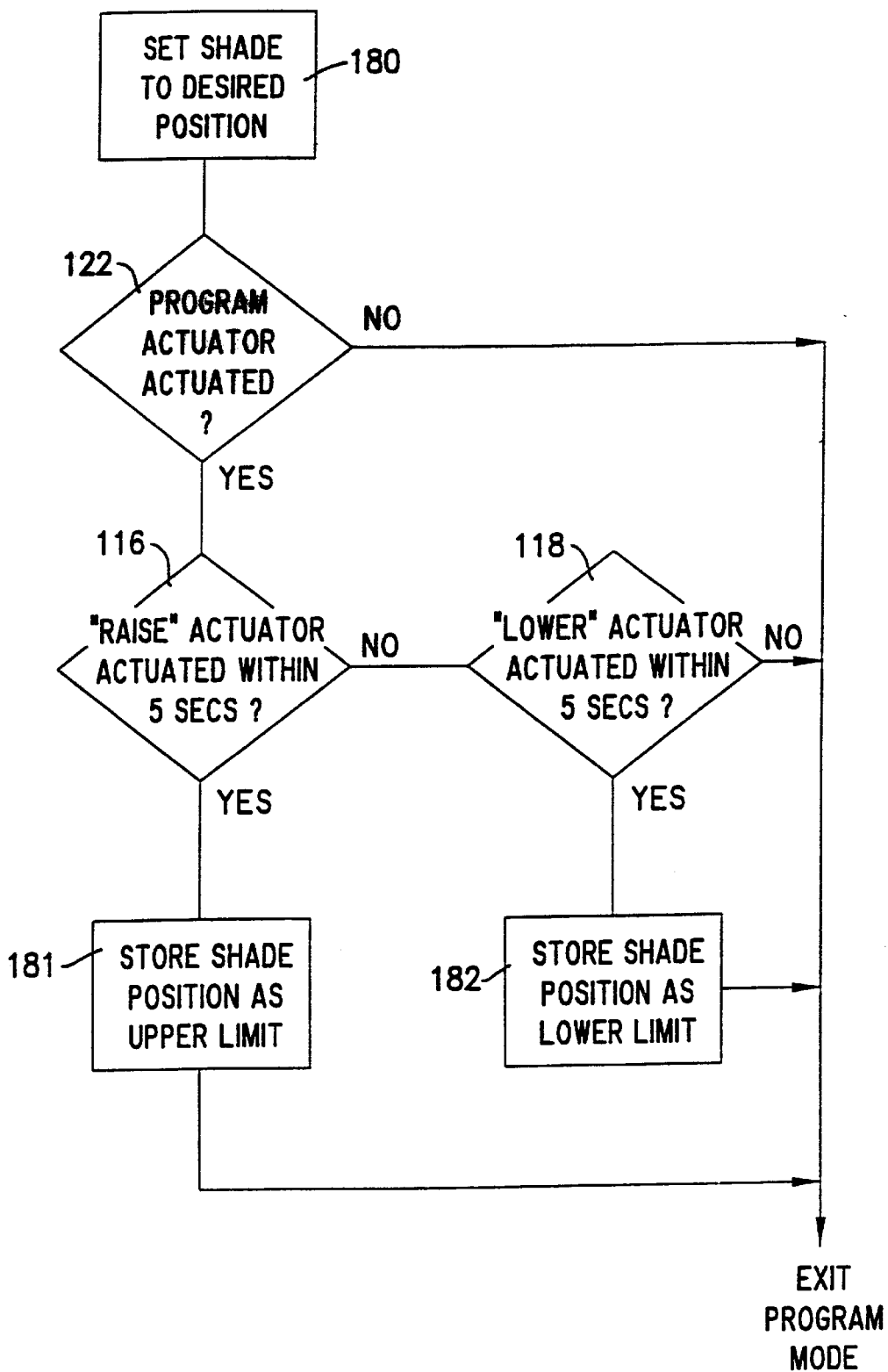
FIG. 23 is a flow chart illustrating the process of setting upper and lower shade limit positions implemented by a program operated by the micro-processor controller of the invention in response to operator inputs.

The above process is better understood by reference to the flow chart of FIG. 23. Thus, in FIG. 23, the shade limit position is manually set at block 180. When the desired position is reached, the program actuator button 122 is actuated momentarily, thus entering the program mode. If the "raise" actuator button 116 is actuated within the next 5 seconds, the upper shade limit position information is stored in the microprocessor as shown in block 181. For the shade lower limit calibration, "lower" actuator button 118 is actuated within 5 seconds after program actuator button 122 to store the lower limit position at block 182. If neither the raise nor the lower actuator is actuated within 5 seconds the system exits program mode.

Alternatively, the upper and lower limits can be set with commands received through the RS485 serial communication port or through the infrared receiver.

The paddle 106 may also preferably have a downwardly extending arm 106A, which projects beyond the periphery of the housing 101. The end of such a downwardly extending arm is shown in FIGS. 17A, 17B and 18A as the portion 106A. The arm 106A serves two functions. A first function is to serve as an extending hem bar 42 (FIG. 11) sensor. The extension 106A is located in the path of a loose hem bar 42 which may extend beyond the edge of the shade. This prevents the loose extending hem bar from contacting the unit 100 as the shade is wound up. However, the extending loose hem bar 42 will now engage end portion 106A to operate microswitch 144 and prevent damage to the shade or unit 100.

The second function is that it allows ease in resetting the unit 100 to the "home" position.

FIGS. 17, 17A, 18, 19 and 24 show the resetting sequence of events when the reelable shade exceeds the home position while the shade is travelling upward. The reelable shade could exceed its home position if, for some reason, the microprocessor gets lost in a routine, if a reelable shade is removed and another shade is installed with a lesser amount of shade fabric 40 unreeled, or if the amount of shade fabric unreeled is reduced manually during a power outage and the motor control unit is subsequently turned on. As the shade fabric 40 is being reeled onto the shade tube 11, the shade fabric 40 passes between the stationary paddle 107 and the limit paddle 106, particularly portion 106B, as shown in FIG. 17. The distance between the stationary paddle 107 and the limit paddle 106 is enough to let the shade fabric 40 pass through, but not the hem bar 42. If the reelable shade exceeds the home position shown in FIG. 17A, the hem bar 42 forces the limit paddle 106 to rotate clockwise as shown in FIG. 18. This changes the state of the limit microswitch 144 from being depressed as shown in FIGS. 17, 17A and 17B to the relaxed position shown in FIGS. 18 and 18A. The changing of the state of the limit microswitch 144 is detected by microprocessor 152 (FIG. 17B) located on the backside of the PCB 133. The microprocessor 152 follows the routine shown in FIG. 24 starting at block 220 "Home position micro switch is activated while the motor is moving up". The routine continues to block 206, as previously described, reverses the motor direction and moves past the home position (microswitch 144 changes state again) and stops at or seeks the upper limit position in accordance with blocks 210-214 of FIG. 24. See also FIG. 19.

Figure 21:
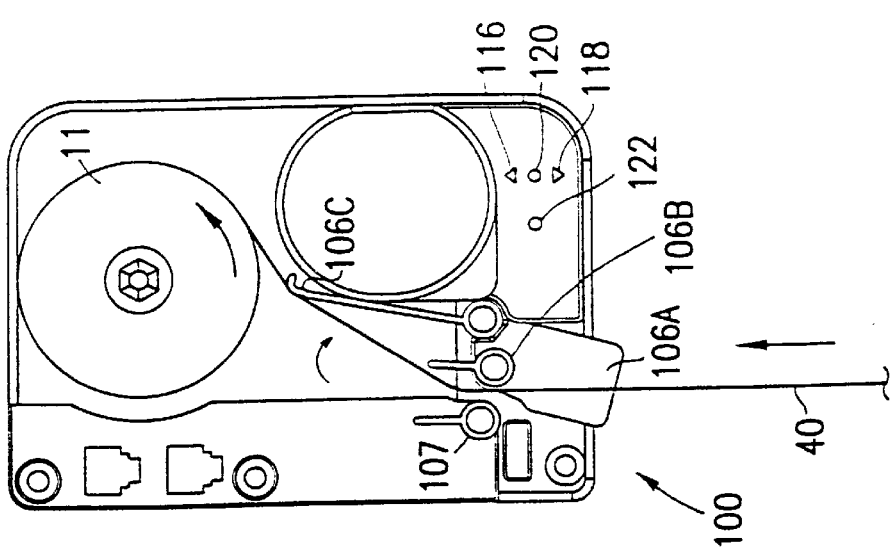
Figure 20:
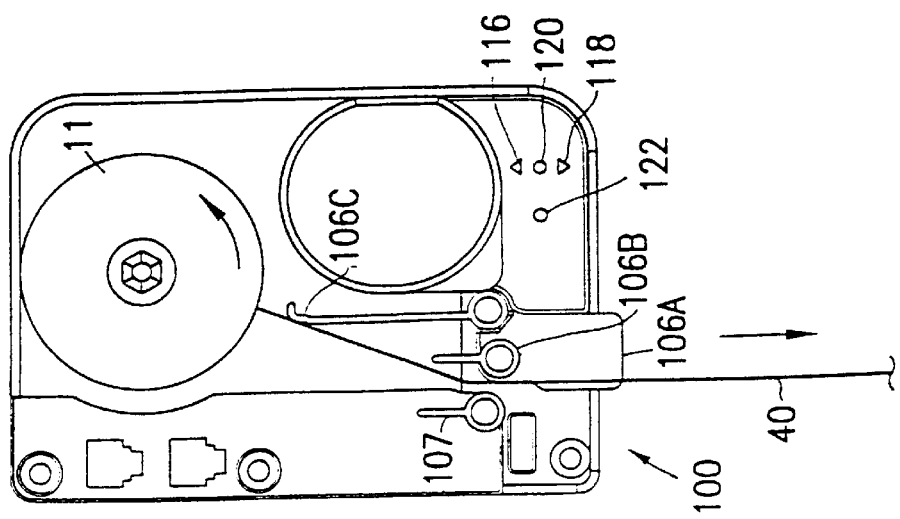

FIGS. 20, 21, 22 and 24 show the resetting sequence of events when the reelable shade 78 unreels the fabric 40 fully and the motor 146 continues in the same direction, causing the fabric 40 to begin to reverse roll (FIG. 21). FIG. 20 shows the motor control unit with the shade fabric 40 fully extended. FIG. 21 shows that if the motor continues in the same direction, the shade fabric 40 will reverse in rotation on the roller and engage with the limit paddle 106, in particular with the extending portion 106C, to cause the limit paddle 106 to rotate clockwise, changing the state of the limit microswitch 144. The changing of the state of the limit microswitch 144 is detected by the microprocessor 152. The microprocessor 152 then follows the routine shown in FIG. 24 starting at block 216 "Home position micro switch is activated while the motor is moving down". Thus, the microprocessor 152 will determine that a reversal of wrap direction has occurred and will initiate corrective action. According to FIG. 24, the motor 146 is then stopped and the routine waits one half second before reversing the motor direction (218), as shown in FIG. 24. The microswitch then returns to the depressed (normal) state again. The routine then continues to block 204, the shade moves upwardly until the home position microswitch changes state when hem bar 42 hits the limit paddle 106, reverses direction again, goes past the home position and seeks the upper limit, as shown at step 204–212. It then follows the flow chart as described before, as shown in steps 204–214. Accordingly, if a wrap reversal occurs as shown in FIG. 21, the end result will be that the system returns the shade to the upper limit. Alternatively, the system could be programmed, if desired, to return the shade to the lower limit if a wrap reversal occurs.

Figure 28:
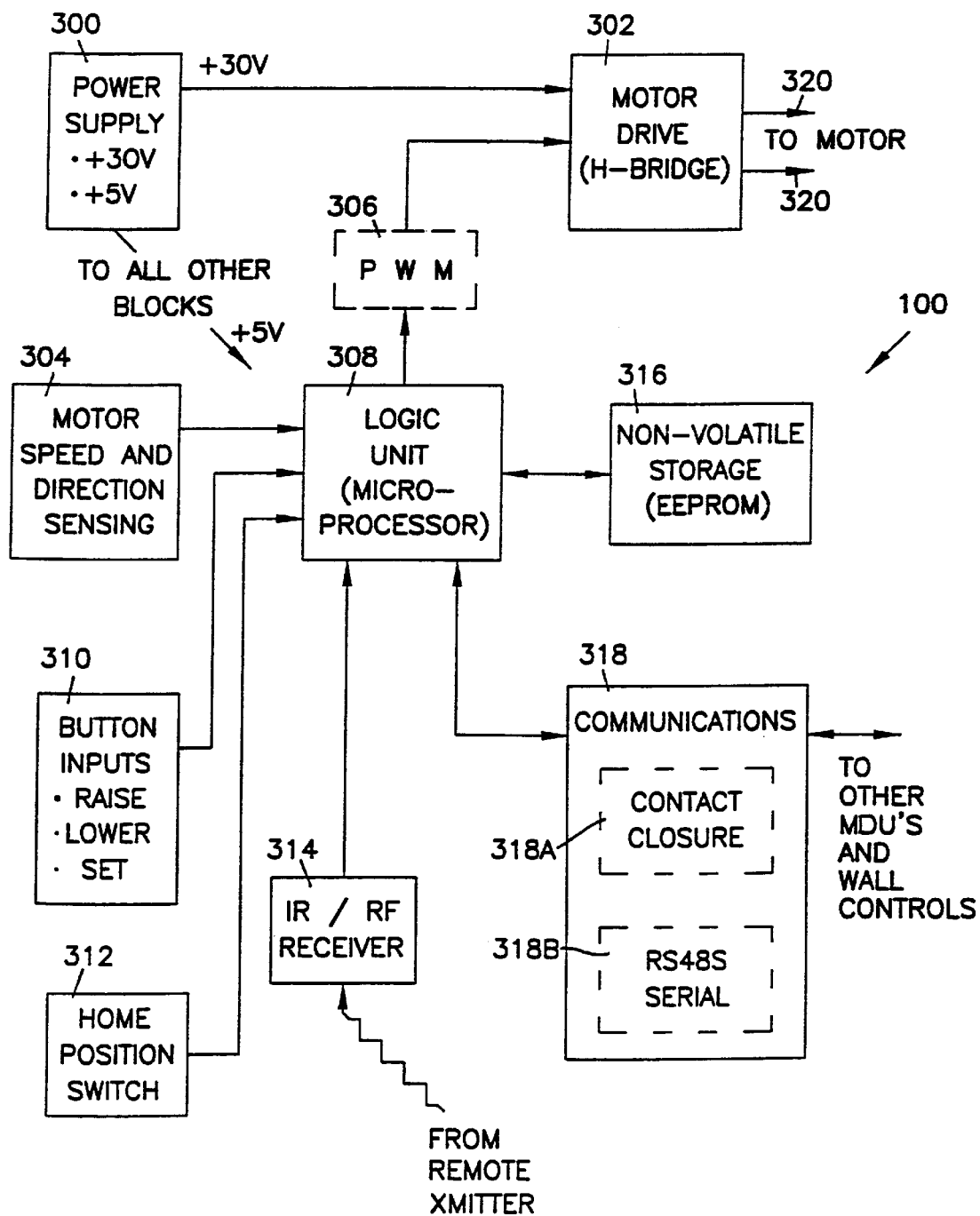
FIG. 28 is a block diagram of the control system of the motor drive unit of FIGS. 14 to 16.

FIG. 28 is a block diagram of the circuit of the motor control unit 100.

The circuit of control unit 100 comprises a power supply 300 which supplies two voltages, 30 volts for motor drive 302 and 5 volts for logic control supplied to all of the other circuits which comprise the motor control unit 100. The 30 volt output from the power supply 300 is provided to the motor drive circuit 302 which preferably comprises an H-bridge circuit. An output is provided from the motor drive 302 to the motor 146. The output is indicated at 320.

The main logic unit of the control circuit comprises a logic unit 308 comprising a microprocessor 152. The logic control unit 308 has a plurality of inputs and a plurality of outputs. The inputs include an input from a motor speed and direction sensing circuit 304 which is provided with inputs from the Hall effect sensors 150 mounted on the printed circuit board 133. Also provided to the logic unit 308 are inputs from the various actuators 116, 118 and 122 which are indicated in the block diagram at 310. These buttons include the "raise", "lower" and "program set" buttons previously described. An additional input to the logic unit 308 comprises the home position switch 144, indicated as block 312 in FIG. 28.

Also provided to the logic unit 308 is an input from an IR/RF receiver 314. By way of the receiver 314, a user may control the operation of a window shade or plurality of window shades, each of which is controlled by a unit 100 from a remote location.

Logic unit 308 also communicates with a non-volatile storage 316, preferably an EEPROM, in which program control is stored. The logic unit 308 also communicates with a communications port 318, the purpose of which is to allow a plurality of motor control units 100 to be interconnected and communicate with each other and with control devices, such as wall mounted controls. Via the communications module 318, each motor control unit can communicate with other motor control units, sending information for the control of other units and receive necessary information from the other units for its control. The communications port 318 has a portion 318A that preferably communicates with other control modules via telephone type connectors, and is polarity insensitive, as will be described below in further detail.

The communications port 318A preferably is a contact closure transceiver which communicates contact closure information to the microprocessor to control raise and lower and preset functions. Also, the portion 318A allows contact closure information to be transmitted to other units 100 that are connected to the controlled unit 100. For example, a particular unit 100 may receive control information from an infrared transmitter via receiver 314. This control information must also be passed to other units 100 not within range of the infrared transmitter that are to be controlled simultaneously with the motor control unit 100 and that are wired to the motor control unit 100 that receives the infrared signal via its receiver 314.

In the preferred embodiment, when IR receiver 314 receives control information, it is provided to microprocessor 152 of logic unit 308. Microprocessor 152 issues command signals to communications circuit 318A which are transmitted to other modules 100 operating other shades. Additionally, microprocessor 152 of the motor control unit 100 then detects the command signals at the communications jacks 130 of circuit 318A to command the original unit 100 also to the desired shade position. So, according to the illustrated embodiment, before the unit 100 actually responds to the IR receiver, it sends the control information to the communication circuit 318A. The microprocessor then receives this same control information from communication circuit 318A to effect the desired shade repositioning. This is done in this manner only because it is necessary to put the control information on the communication link for receipt by all connected modules 100.

Communication port 318 also includes a portion 318B that may comprise a serial port for the communication of control information among remote computers, controllers, timers, etc. and the units 100. It may comprise, e.g., a type RS485 port. Use of a serial port such as an R5485 port also enables the communication of commands other than "raise", "lower", "home position reset", etc., such as "All the way up" or "All the way down" or "Go to a preset shade position".

Address switches are necessary in order to control shades independently. Individual motor control units can be selected for control from an infrared or radio frequency transmitter with an address selector switch on the transmitter. Individual shades or groups of shades can be controlled from a wall control or infrared or radio frequency transmitter. The motor control units can be linked together through wiring (not shown). The units may communicate using an RS485 protocol. The RS485 link allows the motor control unit or units to be interfaced with motion sensors, occupancy sensors, time clocks and similar devices. The RS485 link also allows multiple preset shade positions to be stored into memory for recall later.

The logic unit 308 controls the motor drive 302 via a pulse width modulator 306. The pulse width modulator 306 modulates the duty cycle of pulses supplied to the motor drive 302 to control the speed and direction of the drive motor. Preferably, as will be described below, the pulse width modulator 306 seeks to maintain a constant rotational speed of roller 11 of about 35 rpm. Other rotational speeds can be used as required.

Figure 30A:
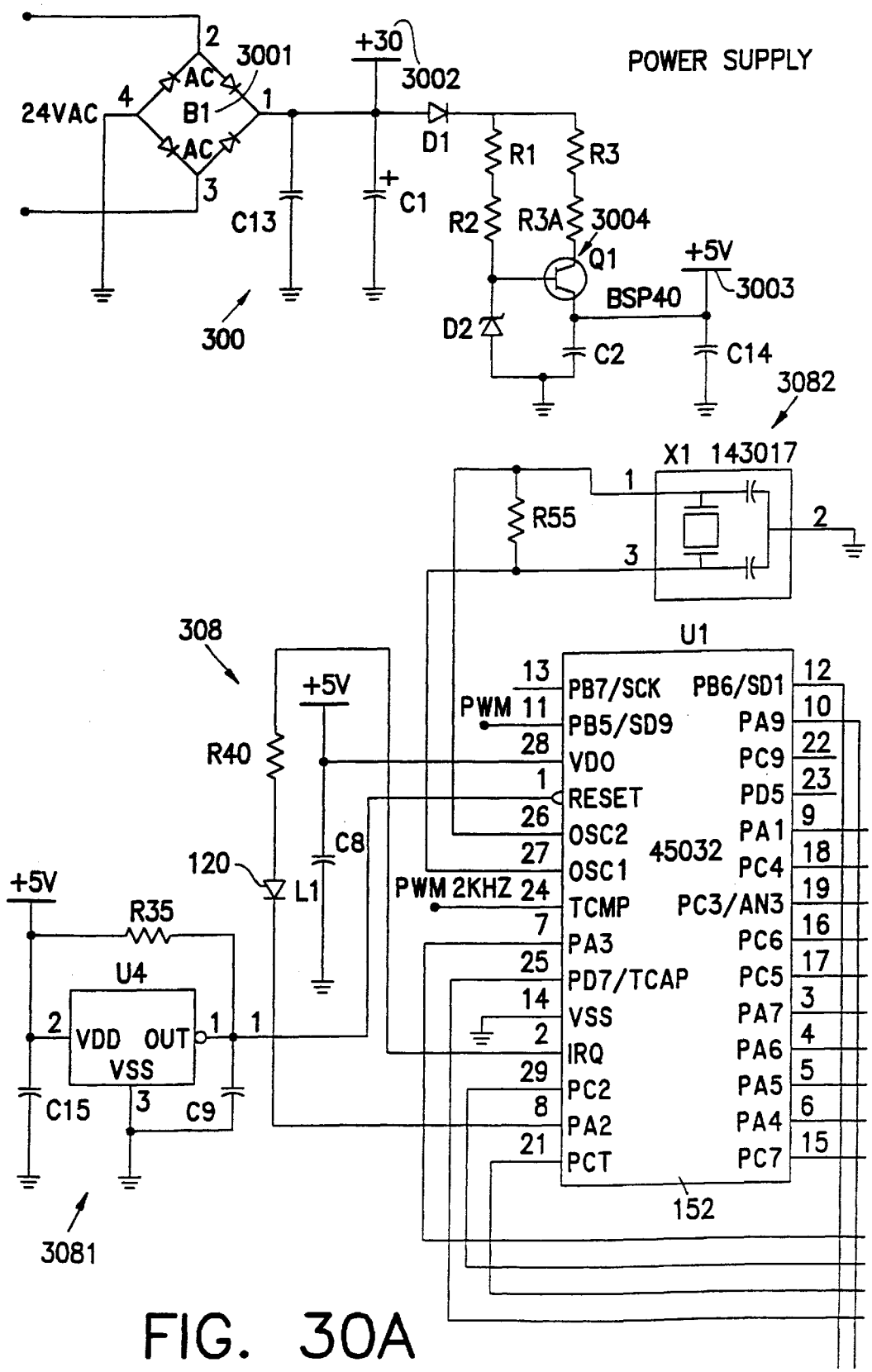
FIG. 30 is a schematic circuit diagram for the circuit of the block diagram of FIG. 28 of the present invention.
Figure 30C:
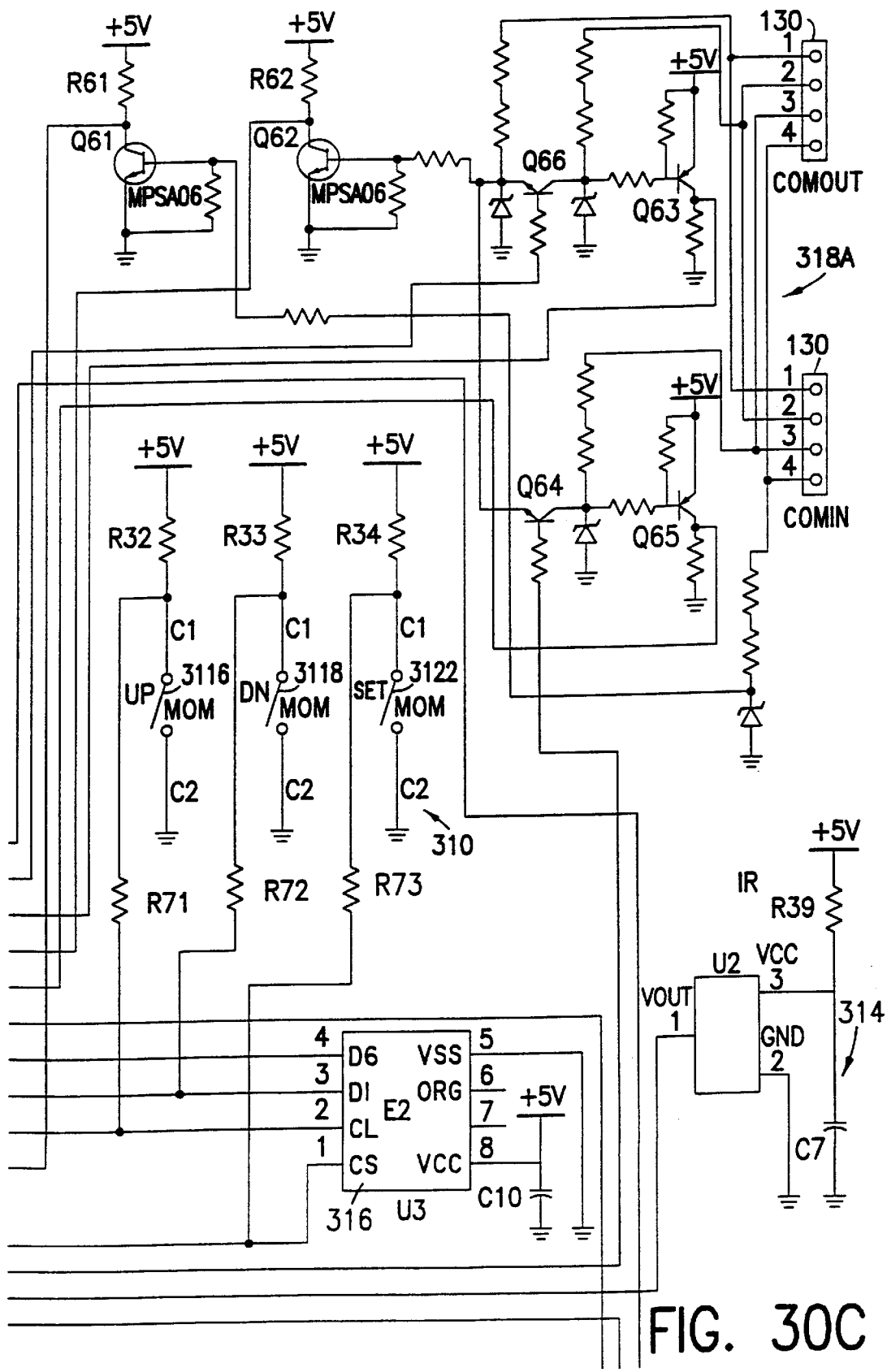
Figure 30D:
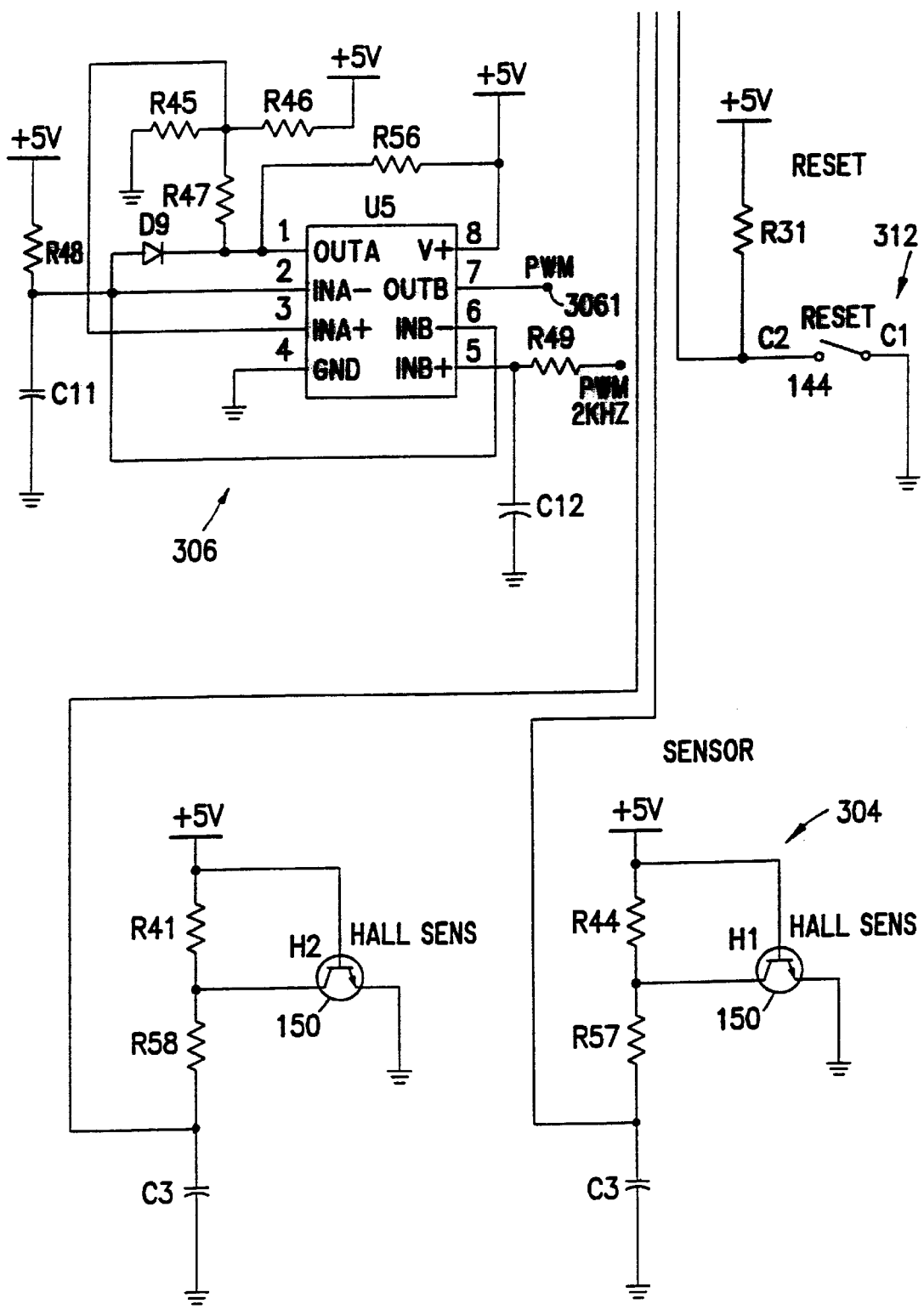

FIG. 30 is a schematic circuit diagram of each of the blocks described with reference to FIG. 28, but does not show details of block 318B which are conventional. The power supply is indicated at 300 and includes a bridge rectifier 3001 for providing a 30 volt DC power level 3002 for the motor drive 302. The 30 volt level is supplied to a regulator 3004 for providing a 5 volt logic level 3003.

The logic unit 308 comprises microprocessor 152, for example, a Motorola HC6805P4 microprocessor. The microprocessor is coupled to a non-volatile memory 316 comprising an EEPROM. A reset circuit 3081 of known design is coupled to the microprocessor 152. A clock circuit 3082 operating at a frequency of 4 MHz is provided for controlling the program cycle time.

A plurality of switches labeled UP 3116, DN 3118 and SET 3122 comprise the button inputs 310. These switches serve, respectively, as the "raise", "lower" and "program set" switches, previously described. The switches are coupled to pull-up resistors and the connections of the pull-up resistors and the switches are provided to appropriate input ports of the microprocessor 152 for control purposes.

The "raise" and "lower" switches on the motor control unit 100 indicated at 310 in FIG. 30 can allow the shade to exceed the upper and lower limits, as previously described. In contrast, like switches contained on remote and/or wall mounted controls (see FIGS. 40, 41, and 41A) only allow movement between the upper and lower limits.

The infrared receiver 314 is provided as shown and coupled to an input of the microprocessor 152 for providing remote control of the window shade. The home position switch 144 is indicated at 312 and is coupled to a pull-up resistor with the connection between the switch and the pull-up resistor being provided to an appropriate input terminal of the microprocessor 152. Hall effect sensors 150 comprising a part of motor speed and direction sensing circuit 304 are coupled to terminals of the microprocessor 152 for determining the position of the shade and for monitoring the speed and direction of the shade.

The motor drive circuit 302 is controlled by a pulse width modulator circuit 306. In the preferred embodiment, the pulse width modulator circuit 306 receives an approximately 2 KHz duty cycle modulated signal from the microprocessor 152. The PWM circuit 306 reads the duty cycle modulated signal as an average DC level and uses it to set the pulse width for a pulse width modulated 20 KHZ signal which is provided to the motor drive circuit 302. The PWM circuit outputs this signal on line 3061. The motor drive 302 receives the signal on lines 3023 and 3024 through diodes D7 and D6. The PWM circuit 306 outputs the signal at 20 KHz so that audible noise is not generated. The outputs of the microprocessor 152 are provided directly to the motor drive circuit 302 on lines 3021 and 3022. The microprocessor 152 signals the motor drive 302 to brake, rotate the motor in a forward direction or rotate the motor in a reverse direction on lines 3021 and 3022. The pulse width modulator output 3061 is coupled to diodes D6 and D7 via lines 3023 and 3024. The output 3061 of the pulse width modulator modulates the signals on lines 3021 and 3022 from the microprocessor 152 by the operation of diodes D6 and D7.

The pulse width modulated signal is applied to transistors Q10 and Q11 and Q3 and Q4. The motor 146 is connected to power transistors Q5, Q6, Q7 and Q8, e.g. power MOSFETS, connected in an H-bridge arrangement.

Figure 35:
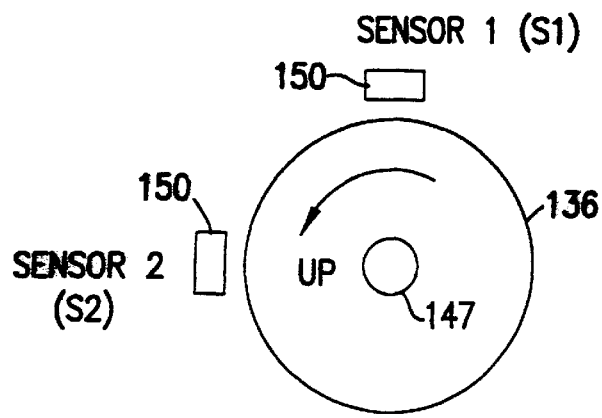
FIG. 35 schematically shows the motor drive shaft and sensor magnet affixed thereto with the direction and speed sensing quadrature sensors adjacent the sensor magnet during upward shade movement.
Figure 36:
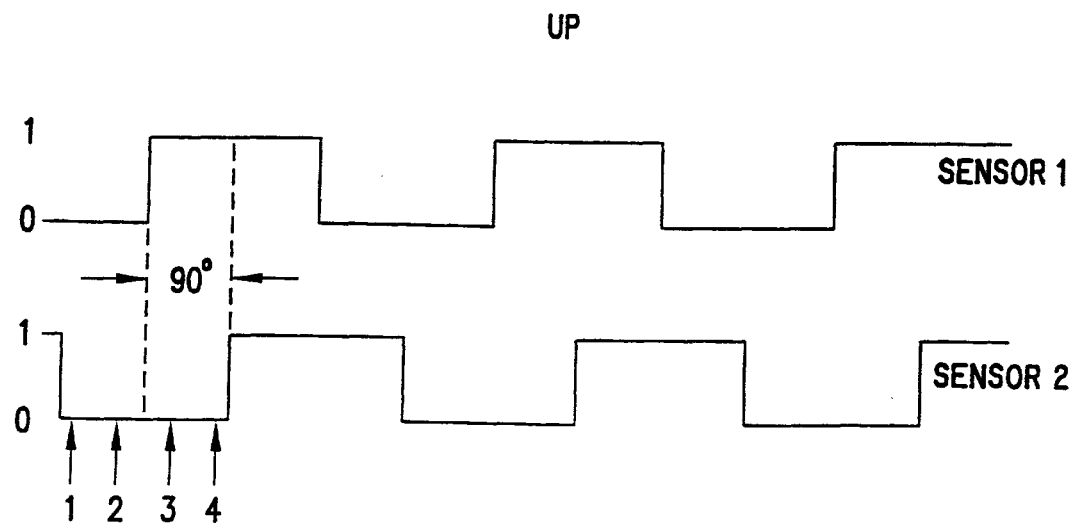
FIG. 36 is a timing diagram showing the pulse trains from the sensors of FIG. 35 during upward movement of the window shade.

FIG. 35 shows the output shaft 147 of the drive motor 146 and sensor magnet 136 fastened to the shaft 147. Also shown are the Hall effect sensors 150 identified as sensor 1 (S1) and sensor 2 (S2). These sensors are in quadrature relationship, meaning they are 90° apart. If the window shade is moving in an up direction, corresponding to the motor direction indicated by the arrow in FIG. 35, the pulse trains from sensors 1 and 2 are in the relative position shown in FIG. 36, that is, they are 90° out of phase with sensor 1 leading sensor 2. As will be discussed hereinbelow, the microprocessor detects the speed based upon the change in number of revolutions over time, the microprocessor counts the number of revolutions in a ½ second period. The microprocessor samples the output from each of the sensors, for example, four samples, as shown in FIG. 36. The microprocessor samples both the outputs from sensor 1 and sensor 2 and compiles a table of the samples, as shown in FIG. 37 for the up pulse trains.

At 35 RPM with a gear ratio of 119:1, the time for a ½ cycle of the pulse train is approximately 0.007 sec. The microprocessor 152 samples the hall effect sensors 150 every 572 $\mu$ second. Therefore, the microprocessor will receive approximately 12 samples per ½ cycle. The microprocessor samples every 572 $\mu$ sec. regardless of motor speed.

FIG. 38 shows the motor shaft 147, magnet 146 and Hall effect sensors 150 while the shade is being moved down. FIG. 39 shows the relationship between the sensor 1 and sensor 2 signals while the shade is moving down. Again, the signals are in quadrature relationship. However, the sensor 1 signal now trails the sensor 2 signal by 90°. Again, in the example shown, four samples are taken of the sensor 1 and sensor 2 signals. The samples for the down pulse trains of FIG. 39 are also compiled as shown in FIG. 37.

As shown in FIG. 37, for the up pulse trains of FIG. 36, for sample 1, the outputs of sensor 1 and sensor 2 are 0. For sample 2, the outputs of sensor 1 and sensor 2 remain 0. For sample 3, the output of sensor 1 is now 1 and the output of sensor 2 is 0. For sample 4, the output of sensor 1 is 1 and the output of sensor 2 is 0. Similarly, for the down pulse trains of FIG. 39, the sensor 1 and sensor 2 outputs for the four samples are as shown. The microprocessor can determine the direction of rotation based upon finding the changes in the up and down sequences indicated in FIG. 37.

The microprocessor 152 keeps track of the position of the shade. This can be performed by incrementing/decrementing a 16 bit position memory by subtracting one from the total for each "up" revolution of a motor and by adding one to the memory total for each revolution of a motor that is proceeding down. Position is determined from the "home" position which is 0. The direction is determined by looking for the changes in the sequences of FIG. 37. Thus, when the motor travels one revolution downwardly from the home position, the position memory it will have a total of +1. When the motor has traveled, for example, 48 revolutions, the memory count will be +48. When the shade then proceeds upwardly it will be decremented for each motor revolution until reaching the home position again.

The aim of the pulse width modulator 306 is to control the motor speed so that it is nearly constant. If the speed is not within the desired range, which is illustratively 34 to 36 rpm of the shade reel, the duty cycle is changed according to the attached table, to give the desired changes in duty cycle, Adc, applied to the motor.

TABLE I

| Relative Speed | RPM | Δdc = | change in duty cycle to PWM 306 circuit |
|---|---|---|---|
| | • | | |
| | • | | |
| | • | | |
| Very High | 43 | −8 = | decrease by 16 μsec |
| | 42 | | |
| | 41 | | |
| Hi | 40 | −1 = | decrease by 2 μsec |
| | 39 | | |
| | 38 | | |
| | 37 | | |
| Ok | 36 | 0 | |
| | 35 | | |
| | 34 | | |
| Low | 33 | +1 = | increase by 2 μsec |
| | 32 | | |
| | 31 | | |
| | 30 | | |
| Very Low | 29 | +8 = | increase by 16 μsec |
| | 28 | | |
| | 27 | | |

A "unit" change in the duty cycle corresponds to a 2 μsecond change.

In the preferred embodiment of the invention, the period pulse width modulated reference signal is 572 microseconds corresponding to a frequency of 1.748 kHz. The duty cycle can be changed between a minimum pulse width of 64 microseconds and a maximum pulse width of 416 microseconds.

Further details concerning the pulse width modulator circuit 306 will be described later.

Details of the communication circuit 318 will now be described.

The system of the invention preferably uses simple contact closures to communicate "raise", "lower", and "toggle" commands to motor control units 100 that are connected together or to communicate between a control unit 100 receiving a command and other connected control units. Preferably, the wiring connections are made using standard telephone cables because they are readily available and make installation easy. For example, standard RJ-11 jacks and wiring connected to such jacks may be used.

A typical installation is shown in FIG. 29. As shown in FIG. 29, a wall control unit 5001 (also see FIGS. 40 and 41) which has "raise" and "lower" buttons is plugged into a communications port 130 of a motor control unit 100 via a telephone type cable 5004. The wall control, indicated at 5001, thereby can communicate and control the plurality of motor control units 100. A splitter 1002 for interconnecting telephone cables such as RJ-11 type connections, may be provided to couple a number of units from the same telephone connector. In this manner, a single wall control 5001 can control a number of motor control units 100.

Also shown in FIG. 29 is an IR transmitter 7001, whose output can be received by the IR port 114 of at least one of the modules 100 for controlling one or more the connected modules 100.

A problem is that it cannot be insured that motor control units 100 and wall controls 5001 will be wired in parallel, i.e., so that conductors of a telephone cable correspond between each unit. This is because standard telephone cables typically comprise 4 lines and usually reverse the pin-out so that pin 1 becomes pin 4 on the other end of the cable. Pin 2 becomes pin 3. This is so-called cross-pinning and is shown in FIG. 32. There are also telephone cables that have "straight-through pinning" that are used for data communications. This is shown in FIG. 31. Installers of telephone cables may or may not reverse the pin-out. Additionally, the use of splitters 1002 complicates matters even more since using two telephone cables could introduce two reversals. Accordingly, to make installation simple, and in order to use the modular RJ-11 type connections, it is preferable that a flexible arrangement that can tolerate either configuration be used.

According to the invention, a communication circuit 318A is provided that can handle both cross-pinned and straight-through pinned cables. Further, there are no dedicated input and output jacks on the motor control units 100, according to the invention. The installer can plug the modular telephone cable into either one of the two jacks 130. In this way, both jacks serve as either inputs or outputs. Also, the installer will not have to worry about what type of cable he has, i.e., whether cross-pinned or straight-through pinned. Circuit 318A insures that there are no restrictions on how the motor control units 100 and wall controls are wired together. Additionally, splitter 1002, as shown in FIG. 29, can be used as needed without having to be concerned about whether crossed or straight-through pinning is used.

The theory of operation of the communications circuit 318A is as follows. "Raise" and "lower" signals are defined as follows: A "raise" signal is a closure between one of the two inner conductors, either 2 or 3 and the adjacent outer conductor, 1 or 4 respectively. This is shown in FIG. 33. Similarly, a "lower" signal is defined as a closure between an inner conductor and the outer conductor which is not adjacent.

Accordingly, closures between 1 and 2 or 3 and 4 are "raise" signals, as shown in FIG. 33. Closures between 1 and 3 or 2 and 4, which are not adjacent, are "lower" signals. FIG. 34 shows examples of "lower" signals.

Circuit 318A thus operates as follows: With reference to FIG. 30, transistor Q61 has its collector coupled to an input of the microprocessor 152. Its base is coupled to pin 4 of the two communication ports 130 which are wired in parallel. Transistor Q62 has its collector coupled to an input port of microprocessor 152 and has its base coupled to pin 1 of ports 130 and to the emitters of transistors Q64 and Q66. Transistor Q64 is the "lower output transistor". Transistor Q66 is the "raise output transistor". Transistor Q63 has its base coupled to lines 2 of the communications ports 130 and transistor Q65 has its base coupled to lines 3 of the communication ports 130. The collector of transistor Q63 is coupled to an input port of the microprocessor 152 and the collector of transistor Q65 is coupled to another input port of the microprocessor 152. The base of transistor Q63 is connected to the collector of transistor Q66 and the base of transistor Q65 is connected to the collector of transistor Q64. The respective bases of transistors Q66 and Q64 are coupled to respective output ports of the microprocessor 152. As shown, in the embodiment illustrated transistor Q61, Q62, Q64 and Q66 are NPN transistors and transistors Q63 and Q65 are PNP transistors.

The circuit operates as follows. If a raise signal is received, i.e., a closure between pins 1 and 2, the bases of transistors Q62 and Q63 are coupled together at jacks 130. The collector of transistor Q63 goes high and the collector of transistor Q62 goes low, informing microprocessor 152 that a closure has occurred on lines 1 and 2 and that the raise signal should be issued to the motor drive circuit. If the raise signal is instead received due to closure of contacts 3 and 4, transistor Q65 is turned on and transistor Q61 is also turned on, providing high levels to respective input ports of the microprocessor 152. Accordingly, a "raise" signal is issued to the motor drive circuit.

In contrast, if contacts 1 and 3 are closed, i.e., a "lower" signal is received, the transistor Q62 is turned on and transistor Q65 is turned on, thereby providing an indication to the microprocessor 152 that a "lower" signal has been received. Similarly, if contacts 2 and 4 are closed, transistor Q63 is turned on and transistor Q61 is turned on, also providing appropriate inputs to the microprocessor 152 so that a "lower" signal can be issued to the motor drive circuit.

If the microprocessor 152 receives a "raise", "lower" or "toggle" signal from another control device, for example, the infrared transmitter, those signals will be received from IR circuit 314 by the microprocessor. The microprocessor will then issue outputs to the appropriate transistor Q66 or Q64, or both. In the case of a "raise" output signal, transistor Q66 will be turned on, thereby shorting pins 1 and 2 to provide the "raise" output signal on the port 130. Similarly, If a "lower" output signal is issued by the microprocessor, transistor Q64 will be turned on, thereby shorting pins 1 and 3, providing a "lower" signal on the ports 130. Because other units 100 have the same circuit 318A, they will detect the closure of lines 1 and 2 as a "raise" signal, despite straight-through or crossed pinning and the closure of lines 1 and 3 as a "lower signal", despite straight-through or crossed pinning. Also, as described above, the unit 100 issuing the "raise" or "lower" command responds to the command based upon detection thereof by the communication circuit 318A.

The following table of possible contact closures verses signals to the microprocessor is implemented by the circuit 318A of FIG. 30.

TABLE 2

Tables of Possible Contact Closures vs. Signals to the Microcontroller

Raise output transistor is OFF
Lower output transistor is OFF

| | | External Closures | | | | | |
|---|---|---|---|---|---|---|---|
| | None | 1 & 2 | 1 & 3 | 2 & 4 | 3 & 4 | 1 & 4 | 2 & 3 |
| Pin 1 transistor | | * | * | | | | |
| Pin 2 transistor | | * | | * | | | |
| Pin 3 transistor | | | * | | * | | |
| Pin 4 transistor | | | | * | * | | |
| Interpretation | | raise | lower | lower | raise | | |

Raise output transistor is ON
Lower output transistor is OFF

| | | External Closures | | | | | |
|---|---|---|---|---|---|---|---|
| | None | 1 & 2 | 1 & 3 | 2 & 4 | 3 & 4 | 1 & 4 | 2 & 3 |
| Pin 1 transistor | | * | * | | * | | |
| Pin 2 transistor | | * | | * | | | * |
| Pin 3 transistor | * | * | * | * | * | * | * |
| Pin 4 transistor | * | * | * | * | * | * | * |
| Interpretation | raise | both | both | both | raise | both | both |

Raise output transistor is OFF
Lower output transistor is ON

| | | External Closures | | | | | |
|---|---|---|---|---|---|---|---|
| | None | 1 & 2 | 1 & 3 | 2 & 4 | 3 & 4 | 1 & 4 | 2 & 3 |
| Pin 1 transistor | | * | * | | * | | |
| Pin 2 transistor | * | * | * | * | * | * | * |

TABLE 2-continued

Tables of Possible Contact Closures vs. Signals to the Microcontroller

| | | | | | | | |
|---|---|---|---|---|---|---|---|
| Pin 3 transistor | | | * | | * | | * |
| Pin 4 transistor | * | * | * | * | * | * | * |
| Interpretation | | lower | both | both | lower | both | both | both |

Raise output transistor is ON
Lower output transistor is ON

| | | External Closures | | | | | |
|---|---|---|---|---|---|---|---|
| | None | 1 & 2 | 1 & 3 | 2 & 4 | 3 & 4 | 1 & 4 | 2 & 3 |
| Pin 1 transistor | | * | * | | | * | |
| Pin 2 transistor | | * | * | * | * | | * |
| Pin 3 transistor | | * | * | * | * | * | * |
| Pin 4 transistor | | * | * | * | * | * | * |
| Interpretation | | both | both | both | both | both | both |

"Pin 1 transistor" refers to Q62 in the circuit diagram of FIG. 30. Pin 1 transistor is normally OFF
"Pin 2 transistor" refers to Q63 in the circuit diagram of FIG. 30. Pin 2 transistor is normally OFF
"Pin 3 transistor" refers to Q65 in the circuit diagram of FIG. 30. Pin 3 transistor is normally OFF
"Pin 4 transistor" refers to Q61 in the circuit diagram of FIG. 30. Pin 4 transistor is normally OFF
"Raise output transistor" refers to Q66 in the circuit diagram of FIG. 30.
"Lower output transistor" refers to Q64 in the circuit diagram of FIG. 30.
*An asterisk means that the state of the transistor has switched from its normal state.

Figure 40:
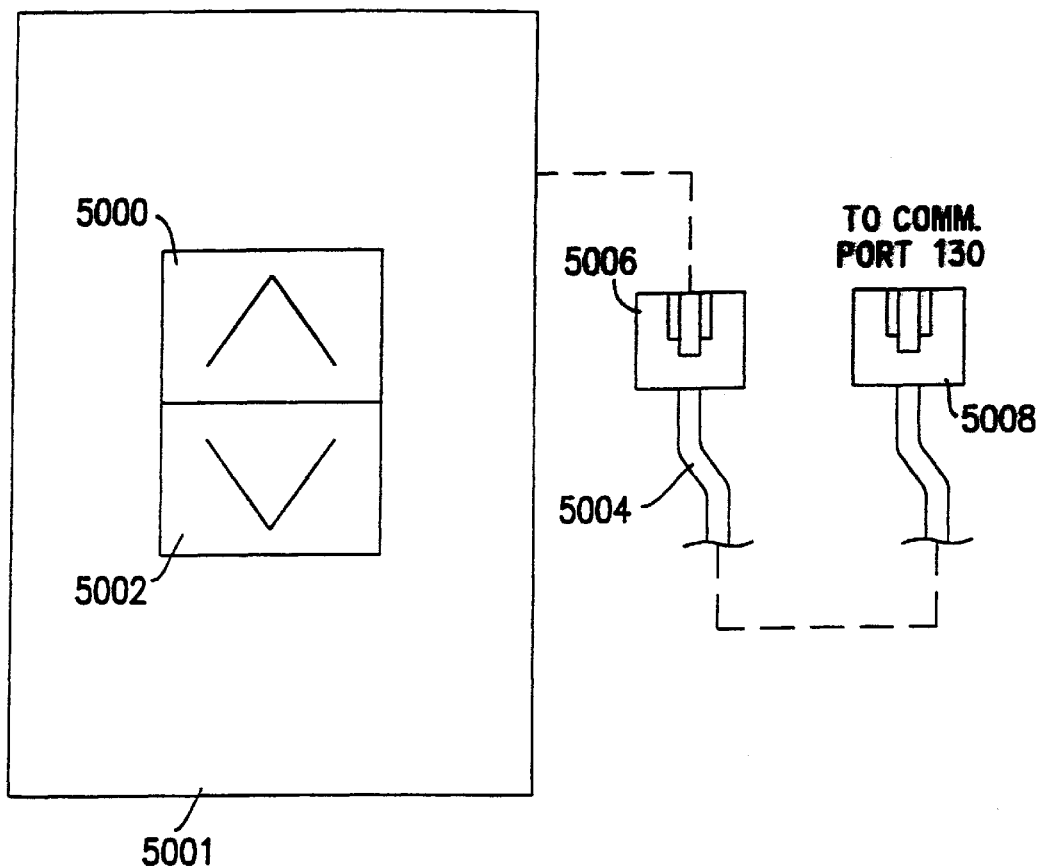
FIG. 40 shows a flush mount or wall box mountable wall control according to the invention.
Figure 41:
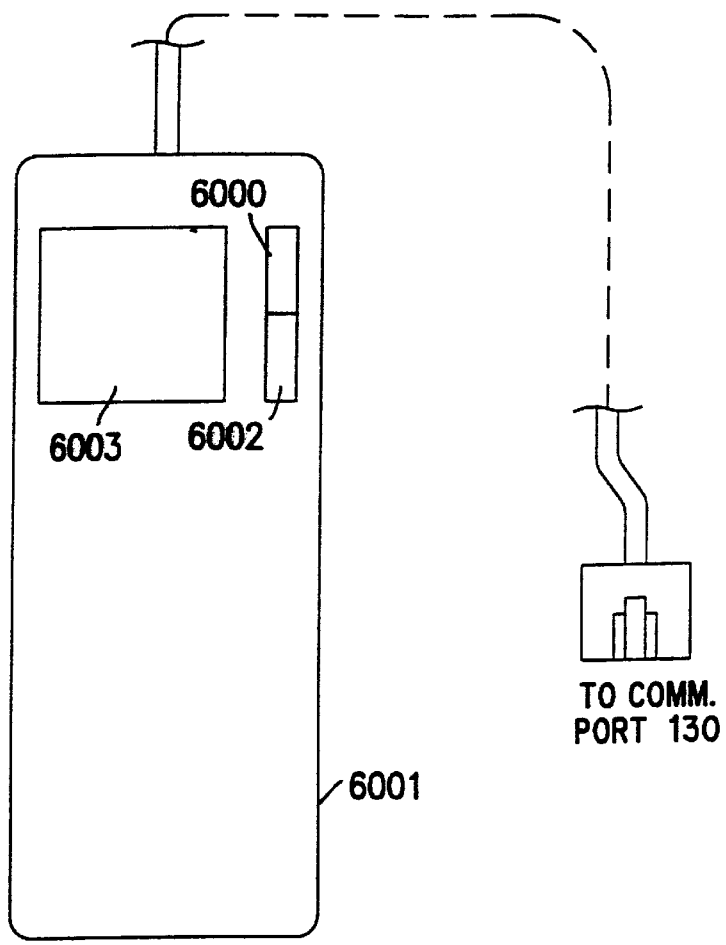
FIG. 41 shows a surface mount wall control.
Figure 41A:
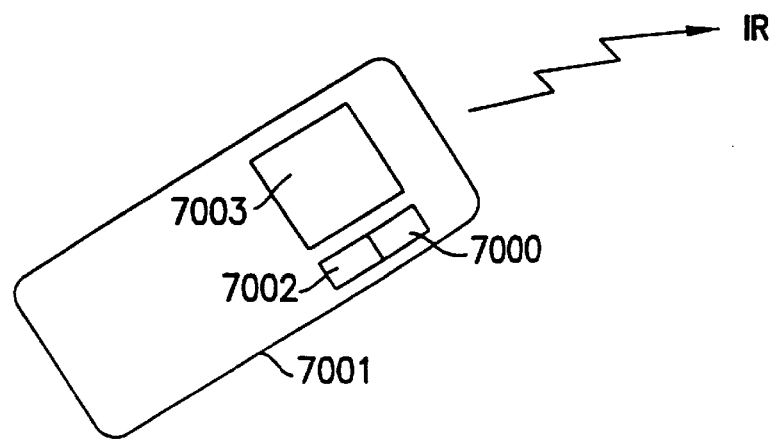
FIG. 41A shows an infrared transmitter according to the invention.
Figure 42:
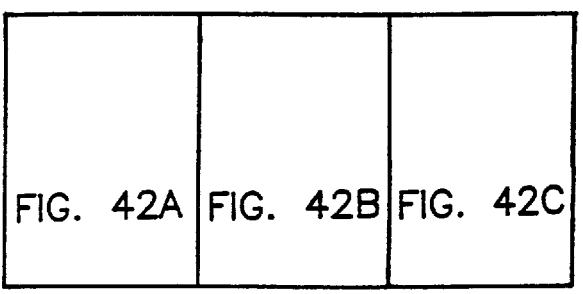
FIG. 42 shows how the control circuit responds to control signals received from the controls to operate the shade.
Figure 42B:
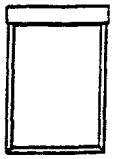
Figure 42C:
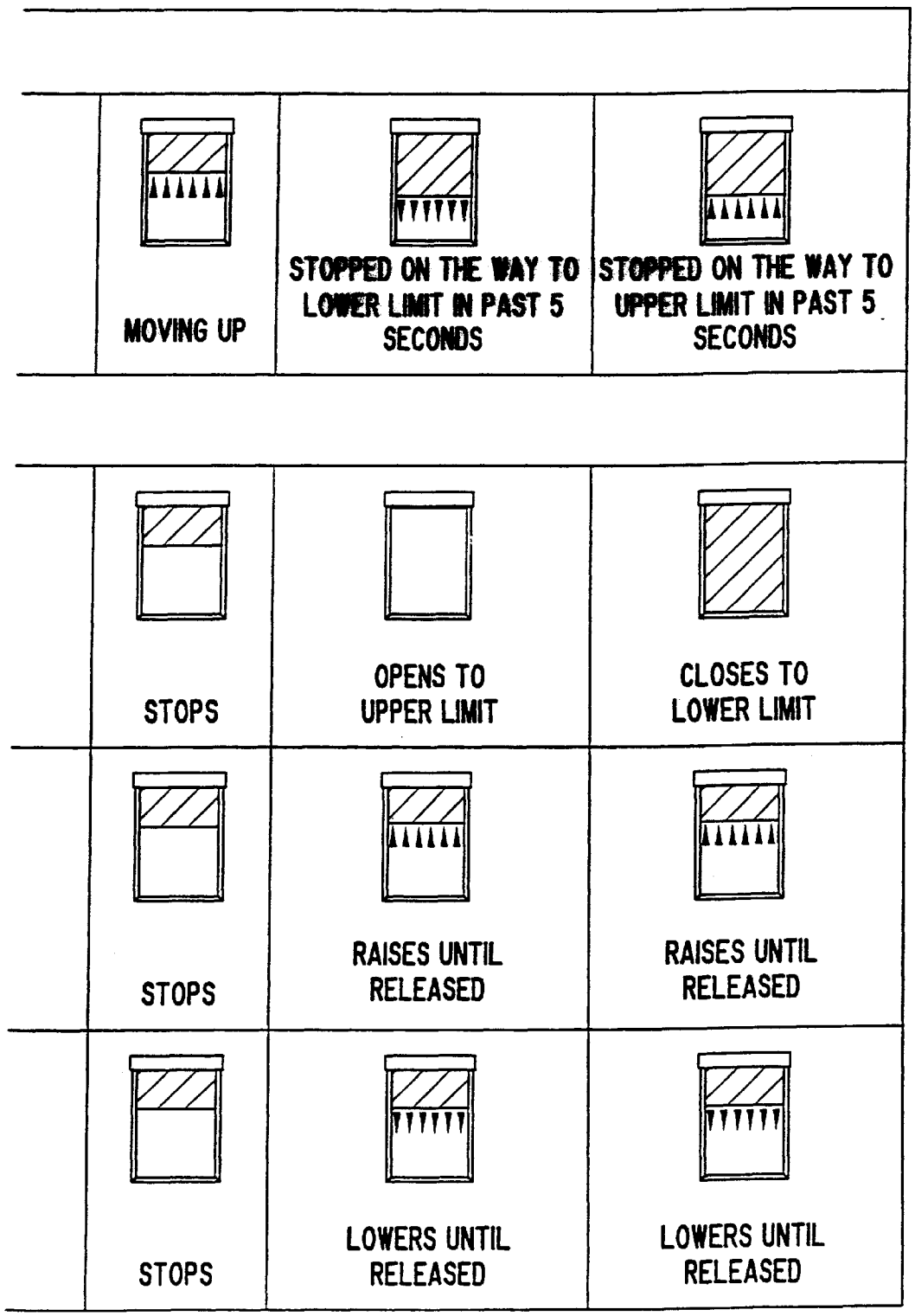

In the above Table 2, "both" means that both the "raise" and "lower" buttons have been actuated at the same time on a control device, e.g., the flush wall mount control of FIG. 40, or that the toggle switch 7003 of the remote transmitter shown in FIG. 41A or the toggle switch 6003 of the surface wall mountable control of FIG. 41 has been activated. The reaction of the window shade is shown in FIG. 42, based on the control inputs and the present state of the shade. In a preferred embodiment of the invention, the flush wall mount control 5001 has raise button 5000 and lower button 5002 which operate raise and lower switches (not shown). It communicates with modules 100 via the telephone style cable 5004 having modular telephone plugs 5006 and 5008 at each end. Plug 5006 plugs into a modular jack on control 5001 and plug 5008 plugs into a jack 130 on a motor unit 100. See FIG. 40.

In contrast, in a preferred embodiment of a surface mount control 6001, shown in FIG. 41, a toggle button 6003 is provided which operates in the same way as when both buttons on control 5001 are depressed, i.e., as shown in FIG. 42. This control also has raise and lower buttons 6000 and 6002. Buttons 6000, 6002 and 6003 operate switches (not shown). The infrared control 7001 (FIG. 41A) also has a toggle button 7003 and raise and lower buttons 7000 and 7002 which operate respective switches (not shown) which operate to produce the desired commands.

Figure 43:
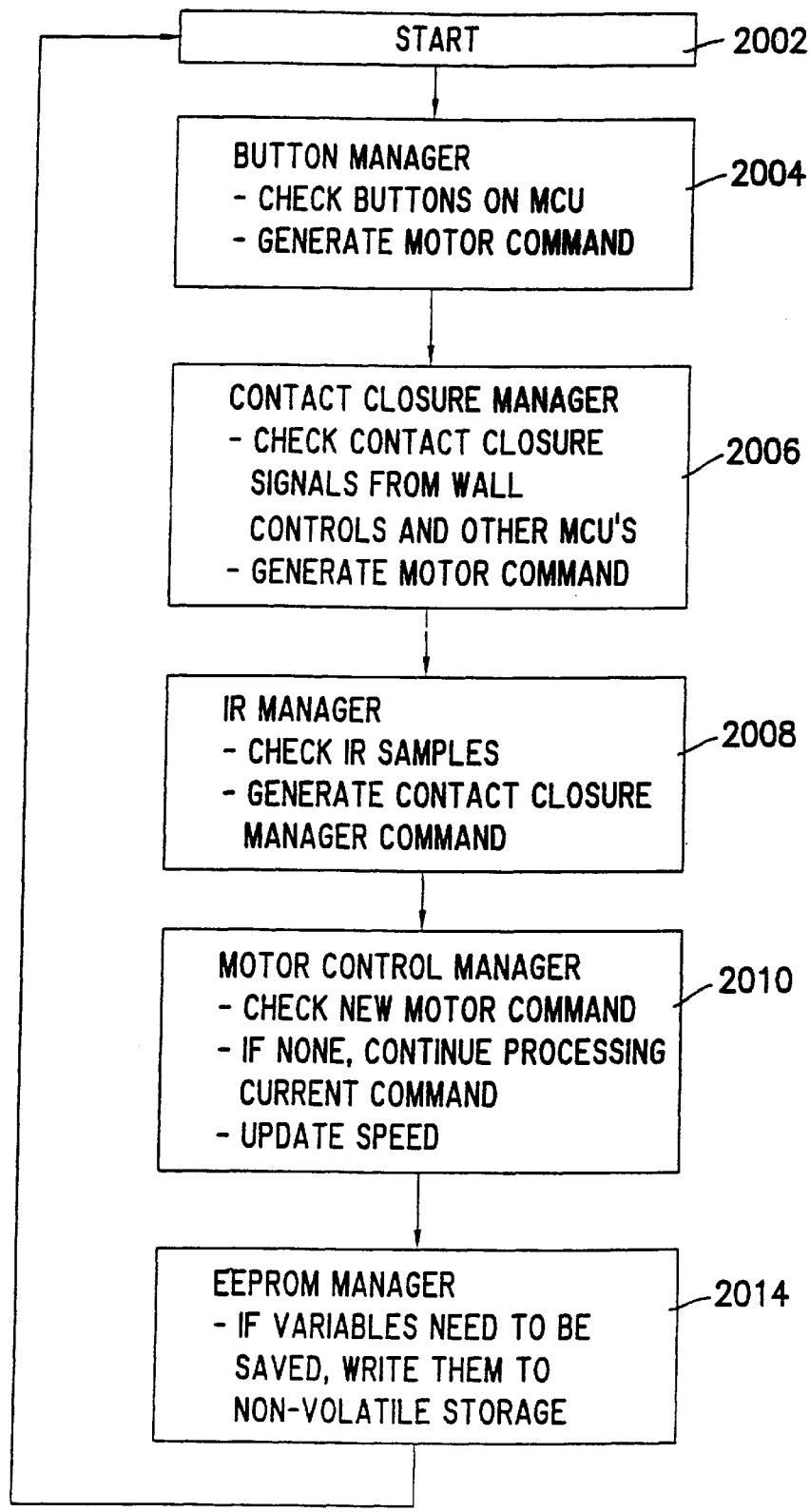
FIG. 43 shows the flow chart for normal operation of the program of the control circuit according to the invention.

FIGS. 43, 44A, 44B, 44C and 45 are flow charts for normal operation of the motor control unit and a flow chart for the interrupt routine which sets the duty cycle, respectively. These flow charts are implemented by microprocessor 152. With reference now to FIG. 43, this figure shows the flow chart for normal operation of the motor control unit 100.

Normal program operation starts at step 2002. Next the status of the home position switch and the raise, lower and program set actuators is checked at 2004 and a corresponding motor command is generated. If the home position switch has been activated (i.e. released) a Home Position Switch Activation Command is generated. If the raise actuator has been operated a "Raise without Limits" command is generated. If the lower actuator has been actuated a "Lower without Limits" command is generated. If the program set actuator is actuated for less than one second and then the raise actuator is operated within 5 seconds, a "set Upper Limit" command is generated. If the program set actuator is actuated for less than one second and then the lower actuator is operated within 5 seconds a "Set Lower Limit" command is generated. At 2006 the status of contact closures at the communications ports 130 are checked via circuit 318A to receive commands from wall controls and other control units or other devices such as occupancy sensors etc. A corresponding motor command signal is generated in response. If contacts 1 and 2 or 3 and 4 are changed from their normal states, i.e., they are shorted together, then a "raise" command is generated. If contacts 1 and 3 or 2 and 4 are changed from their normal states, i.e., they are shorted together, then a "lower" command is generated. If contacts 1, 2 and 3 or contacts 2, 3 and 4 are changed from their normal states, i.e., they are shorted together, then a "Toggle" command is generated.

Also at step 2006 any contact closure commands previously generated in response to a received Infrared signal are implemented. If the contact closure command is "Raise" then contacts 1 and 2 are activated. If the contact closure command is "Lower" then contact 1 and 3 are activated. If the contact closure command is "Toggle" then contacts 1, 2 and 3 are activated.

Further at step 2006 optional RS 485 communications circuit 318B can be checked for any received command. At step 2008, the infrared input from receiver 314 is checked and a contact closure command is generated as appropriate. The possible received infrared commands are "Raise, "Lower", and "Toggle", which generate corresponding contact closure commands. These contact closure commands are implemented by the microprocessor 152 at step 2006 the next time through the program cycle. At 2010, a determination is made if a new motor command has been received.

Figure 44A:
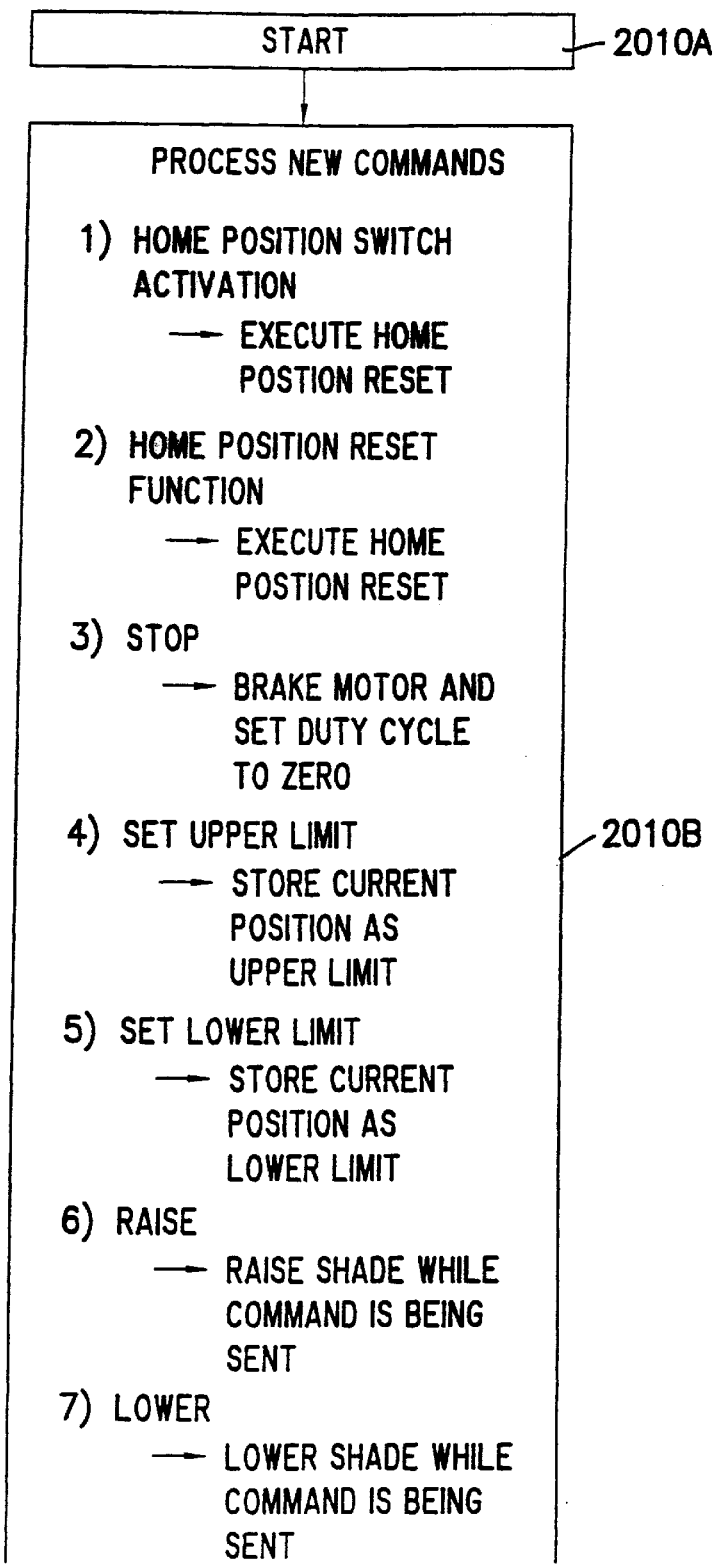
Figure 44B:
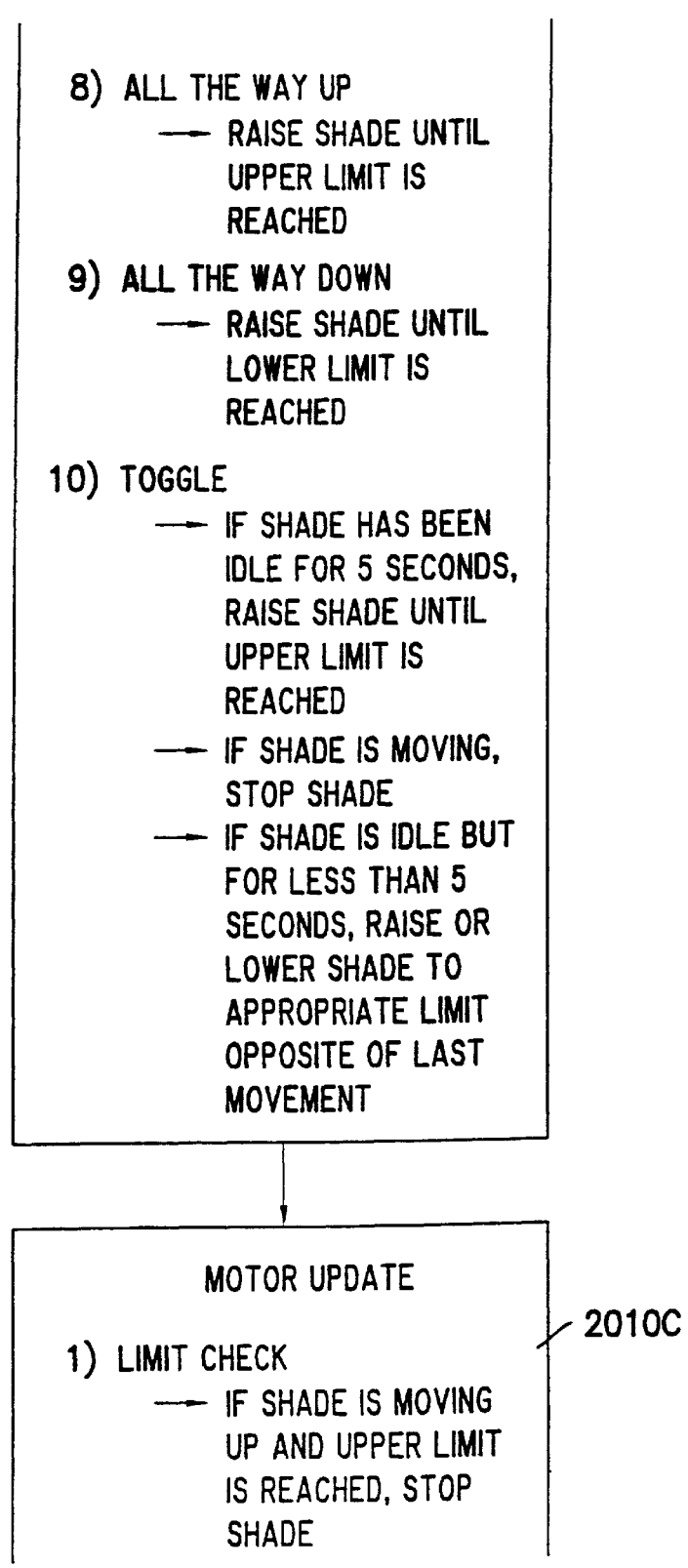

If a new motor command has been received then it is processed as illustrated in more detail in FIGS. 44A, 44B and 44C. The program enters block 2010A from block 2008 and then proceeds to block 2010B where newly received commands are processed. If a "Home Position Switch Activation" command has been received or a "Home Position Reset Function" command has been received (This could have been received through the optional RS485 circuit 318B or, alternatively, the microprocessor 152 could automatically generate a "Home Position Reset Function" command after the shade has been moved to the Upper Limit a certain number of times. This enables the system to automatically recalibrate itself and ensure that the shade position at the upper and the lower limits is accurate.) then the Home position reset function is executed as shown in more detail in FIG. 24.

If a "Stop" command has been received (through the optional RS485 circuit or otherwise) then the motor is braked and the duty cycle of PWM circuit 306 is set to zero. If a "Set Upper Limit" command has been received then the current shade position is stored as the Upper Limit. If a "Set Lower Limit" command has been received then the current shade position is stored as the lower limit.

If a "Raise" command has been received then the shade is raised while the command is being sent. If the "Raise" commands is a "Raise Without Limits" command, then the shade can be raised past any previously set upper limit. Similarly if a "Lower" command has been received then the shade is lowered while the command is being sent. If the "Lower" command is a "Lower Without Limits" command then the shade can be lowered past any previously set lower limit.

If an "All the Way Up" command or an "All the Way down" command is received, then the shade is raised all the way up until the upper limit is reached or lowered all the way until the lower limit is reached respectively. These commands could be received through the optional RS485 circuit or otherwise.

If a "Toggle" command has been received this is interpreted in one of three ways. If the shade has been idle for 5 seconds the shade is raised until the upper limit is reached. If the shade is currently moving then the shade is stopped. If the shade is currently idle but for less then 5 seconds then the shade is raised to the upper limit or lowered to the lower limit whichever is the opposite of the last movement of the shade.

The program then proceeds to block 2010C where the specific commands being sent to the motor through PWM circuit 306 and motor drive circuit 302 are updated.

The first thing that is done is a limit check. If the shade is moving up, and the position counter indicates that the upper limit has been reached, the motor is stopped. Similarly if the shade is moving down and the position counter indicates that the lower limit has been reached the motor is stopped. However, if the motor is moving in response to a "Raise Without Limits" or a "Lower Without Limits" command then the motor would continue moving the shade past the upper or the lower limit.

Next the direction set outputs 3021 and 3022 are adjusted. If the current motor command indicates that the motor is to be moved in a raise direction, then output 3021 will be high and output 3022 will be low. If the current motor command indicates that the motor is to be moved in a lower direction, then output 3021 will be low and output 3022 will be high. If the motor is to be stopped or braked both outputs 3021 and 3022 will be high or both outputs 3021 and 3022 will be low.

Finally, the speed of the motor is updated. The current speed of the motor is determined by comparing the current position of the shade with the previous position of the shade. These positions are read from the registers where they were stored after reading the Hall Effect sensors.

As described in more detail with reference to Table 1 above, if the speed of the shade reel is less than 29 RPM then the duty cycle is incremented by 8, if the speed of the shade reel is between 30 and 33 RPM the duty cycle is incremented by 1. If the speed of the shade reel is between 34 and 36 RPM no change is made to the duty cycle. If the speed of the shade reel is between 37 and 40 RPM then the duty cycle is decremented by 1 and finally if the speed of the shade reel is greater than 41 RPM the duty cycle is decremented by 8. Each unit increment or decrement of the duty cycle is equal to a change of 2 $\mu$ seconds.

The program exists block 2010C and returns to block 2014 at FIG. 43. At 2014, the changed motor direction and duty cycle signals are written to the EEPROM non-volatile storage. A return is then made to the start of the main loop 2002 at which the cycle repeats.

Figure 45:
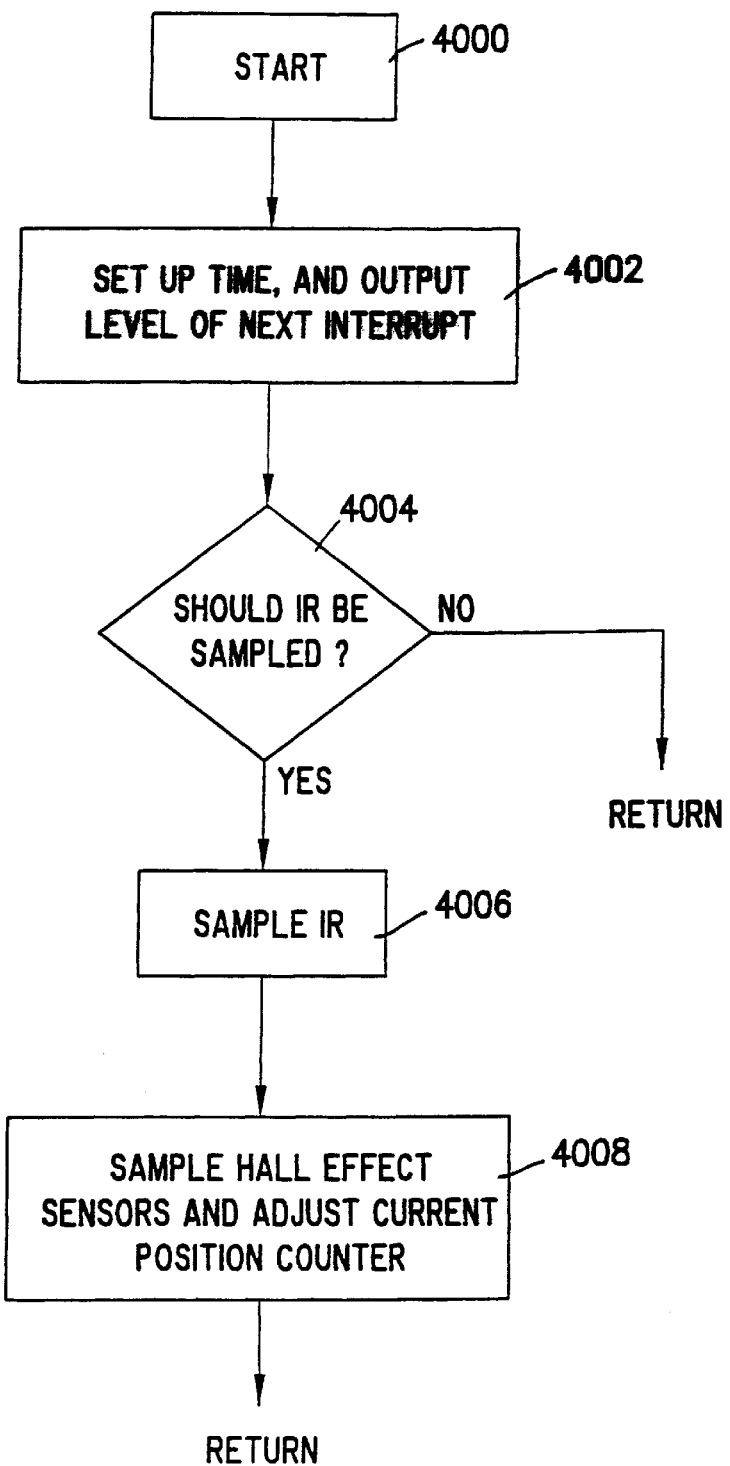
FIG. 45 shows the flow chart for the interrupt routine which sets the duty cycle.
Figure 46:
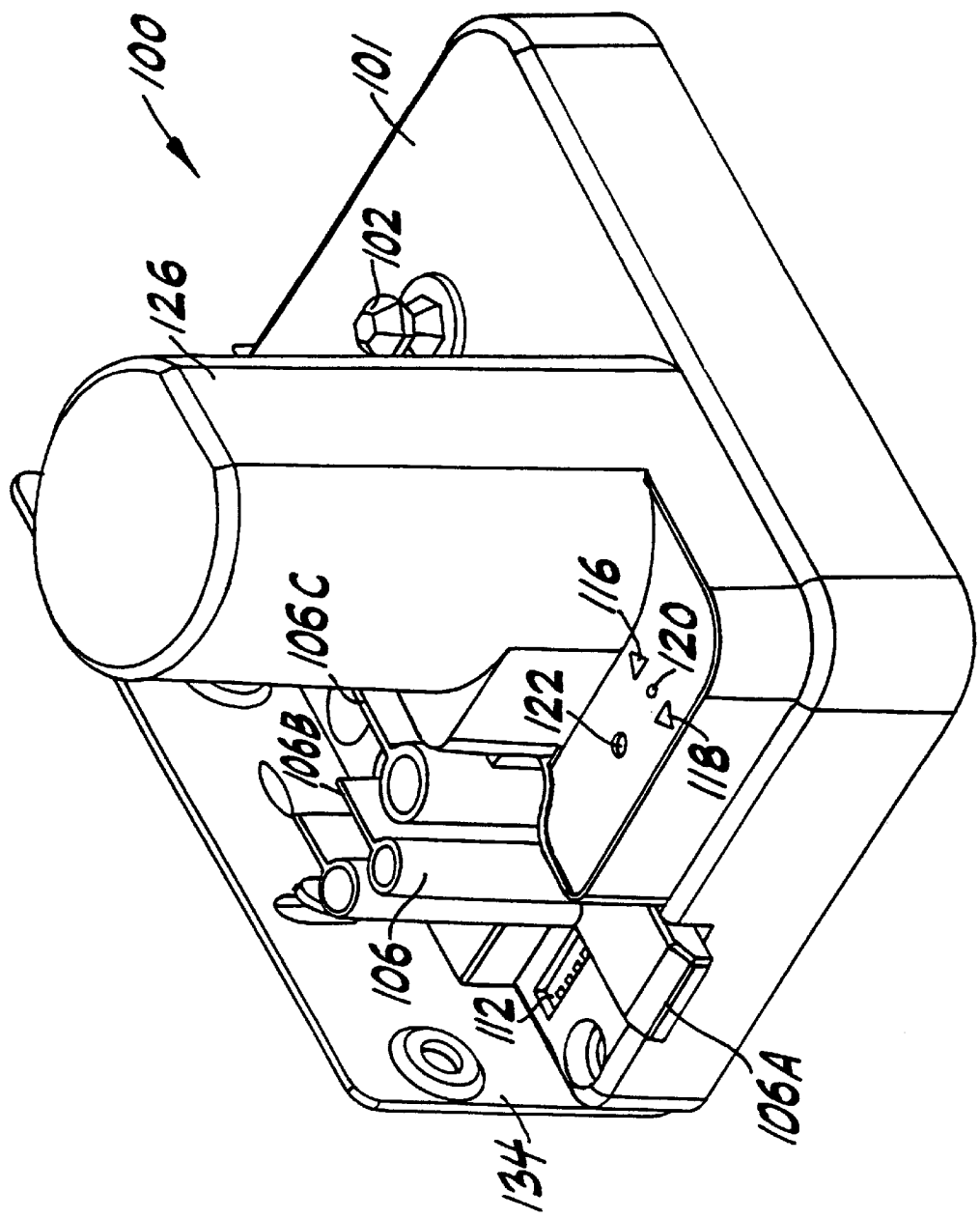
FIG. 46 is a perspective view of the motor drive unit showing the "reset" and misaligned/loose hem bar sensor according to the invention.

FIG. 45 shows the flow chart for the duty cycle interrupt routine which sets the duty cycle. The interrupt routine begins at step 4000 as a result of the PWM output changing state from high to low or low to high and proceeds to step 4002. At step 4002 the time and output level of the next interrupt is set. If the interrupt routine is entered as a result of the output from the PWM circuit going low then a determination is made as to whether the duty cycle is set to zero. If it is, the output is set to go low again in 572 μ seconds. If the duty cycle is not equal to zero, the output is set to go high at a time in the future determined by the desired duty cycle as determined at block 2010C of the main program flow.

If the interrupt routine is entered as a result of the output from the PWM circuit going high then the output is set to go low at a time in the future determined by the desired duty cycle as determined at block 2010C of the main program flow. Hence the interrupt routine will be entered once every 572μ seconds if the duty cycle is zero and twice every 572 μ seconds if the duty cycle is not equal to zero (once when the PWM output goes from low to high and once when the PWM output goes from high to low).

At block 4004 a determination is made as to whether to sample the IR receiver and Hall Effect sensors. If less than 572 μ seconds have elapsed since the last samples were taken then the interrupt routine is ended and control of the microprocessor 152 returns to the main program illustrated in FIG. 43.

If 572 μ seconds have elapsed, the IR receiver is sampled at block 4006 and any received signals are stored for later interpretation at block 2008 of the main program. The interrupt routine then continues at block 4008 where the Hall Effect sensors are sampled as described in more detail above with reference to FIGS. 35, 36, 37, 38 and 39 and the current position of the shade is stored in memory for later use by block 2010C of the main program.

The interrupt routine is ended and control of the microprocessor returns to the main program illustrated in FIG. 43.

Figure 47:
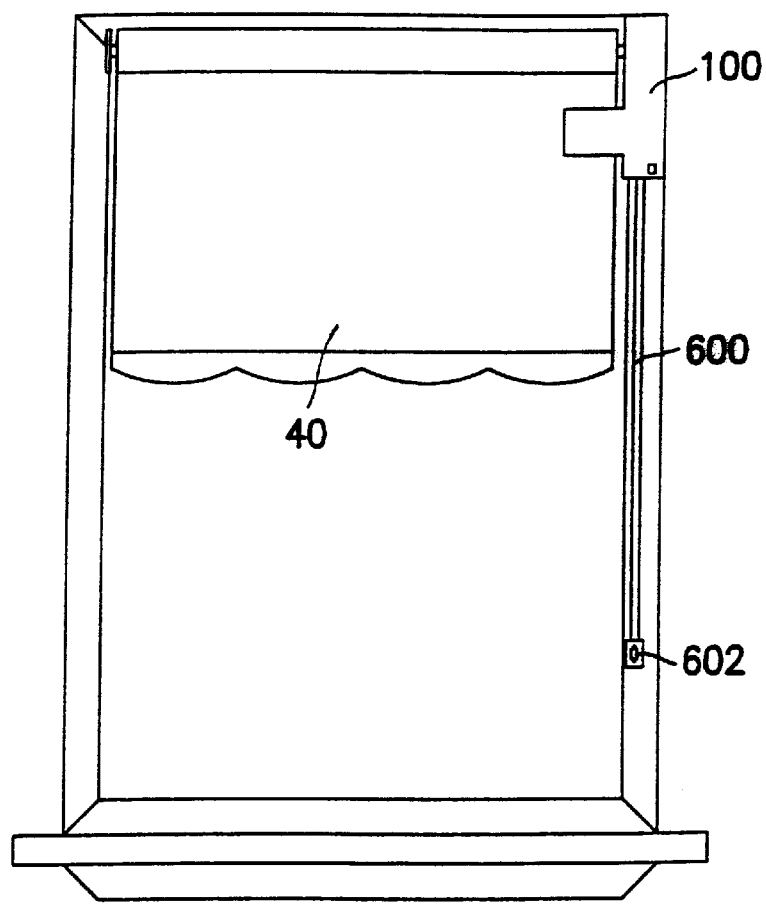
FIG. 47 shows an alternative embodiment of the invention.

FIG. 47 shows a further embodiment of the invention. In this embodiment, motor drive unit 100 has coupled thereto a free hanging Raise/Lower switch wand 600 which comprises a rod or conduit for control wires. The control wires are preferably coupled electrically to the communication ports 130. In particular, they may plug into a port 130 or be wired in parallel to the communication port connectors. The Raise/Lower/toggle switches are disposed at the lower end 602 of the rod or conduit 600 and control the motor drive unit 100 in the same way as the remote controls, e.g. 5001, 6001, 7001, to raise and lower the shade. The wires in the rod conduit 600 can couple to the communication jacks 130 using a modular telephone plug. The rod/conduit 600 may be coupled to the unit 100 using a hook which can be disposed in different locations to accommodate the particular installation.

Figure 48:
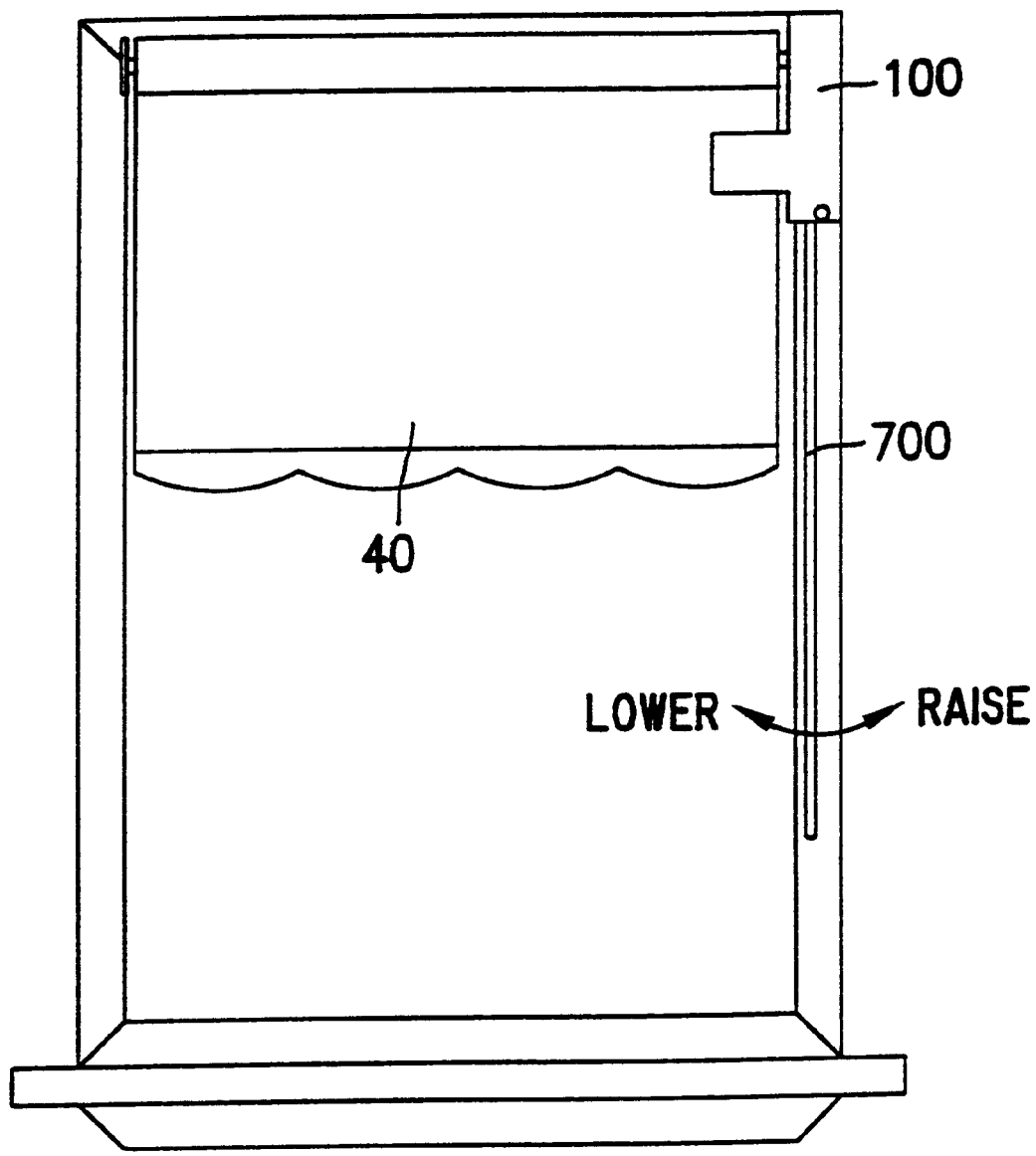
FIG. 48 shows still yet another alternative embodiment of the invention.

FIG. 48 shows another embodiment having a wand 700 that is turned clock wise/counter clockwise to, e.g., lower or raise, respectively, the shade. The wand 700 is similar to the wand employed on conventional slatted window blinds. It can be attached to the unit 100 via a hook which operates a raise/lower switch provided on unit 100. Alternatively, it can be coupled to unit 100 in some other way to actuate a raise/lower switch. A twist to the right (counter clockwise) actuates a switch in the unit 100 that raises the shade and a twist to the left (clock wise) actuates a switch in the unit 100 that lowers the shade. The switches may be coupled in parallel to the communication jacks 130.

In the embodiments of FIGS. 47 and 48, the switches at 602 or operated by wand 700 can be in addition to switches 116 and 118 or can be provided instead of switches 116 and 118.

Although the present invention has been described in relation to particular embodiments thereof, many other variations and modifications and other uses will become apparent to those skilled in the art. Therefore, the present invention be limited not by the specific disclosure herein, but only by the appended claims.

What is claimed is:

1. A control switch for determining at least one of the reeling end limits of a reelable shade by being operated when an end limit is reached; said control switch including a switch, a pivotally mounted shade rise limit lever arm; said shade rise limit lever arm having end disposed adjacent the path of movement of said shade; a free end of said shade having an enlarged hem liner along its edge whereby, when said hem liner at the free end of said shade reaches and contacts said end of said rise limit lever arm, said rise limit lever arm is rotated to operate said switch to indicate that said shade has been fully reeled to an end limit.

2. A control switch for determining at least one of the end limits of a reelable shade by being operated when an end limit is reached; said control switch including a switch, a pivotally mounted shade lower limit lever arm; said shade lower limit lever arm having an end disposed adjacent to but spaced from the outer periphery of said reelable shade and being removed from the path of said shade when said shade is being unreeled from over one side of the shade reel, but being disposed in the path of said shade-after said shade has been fully unreeled and when continuous unreeling causes said shade to reel in an opposite direction over the shade reel, thereby to activate said switch to indicate that a fully unreeled position of said shade has been reached.

3. The control switch of claim 2, which further includes a pivotably mounted shade rise limit lever arm; said shade rise limit lever arm having an end disposed adjacent the path of movement of said shade; a free end of said shade having an enlarged hem liner along its edge whereby, when said hem liner at the free end of said shade reaches and contacts said end of said rise limit lever arm, said rise limit lever arm is rotated to operate said control switch to indicate that said shade has been fully reeled to an end limit.

4. The combination of claim 3, wherein said first and second arms are disposed at an approximate right angle to one another.

5. The combination of claim 3, wherein said pivotally mounted shade rise limit and shade lower limit lever arms comprise the first and second arms of a single pivotally mounted lever.

6. The combination of claim 3, further comprising a stationary arm disposed adjacent the end of the rise limit lever arm, whereby said shade can move between the stationary arm and the rise limit lever arm, but the hem liner can not pass therebetween.

\* \* \* \* \*